US005299135A

United States Patent [19]

Lieto et al.

[11] Patent Number: 5,299,135

[45] Date of Patent: Mar. 29, 1994

[54] DIRECT INTERFACE BETWEEN FUEL PUMP AND COMPUTER CASH/REGISTER

[75] Inventors: Gregory S. Lieto, Muskegon; William O. Richardson, Grand Haven; Thomas A. Kyle, Rothbury, all of Mich.; Craig L. Hockman, North Canton, Ohio

[73] Assignee: Bennett Pump Company, Muskegon, Mich.

[21] Appl. No.: 80,460

[22] Filed: Jun. 18, 1993

Related U.S. Application Data

[63] Continuation of Ser. No. 624,420, Dec. 7, 1990, abandoned.

[51] Int. Cl.[5] .......... G06F 15/20; B67D 5/08

[52] U.S. Cl. .......... 364/479; 222/52

[58] Field of Search .......... 364/479, 465; 222/14, 222/144.5, 52; 395/425

[56] References Cited

U.S. PATENT DOCUMENTS

| | | | |
|---|---|---|---|
| 3,765,567 | 10/1973 | Maiocco et al. | 222/30 |
| 3,782,597 | 1/1974 | Hansen et al. | 222/23 |
| 3,786,421 | 1/1974 | Wostl et al. | 340/149 A |
| 4,107,777 | 8/1978 | Pearson et al. | 364/479 |
| 4,247,899 | 1/1981 | Schiller et al. | 364/479 |
| 4,335,448 | 6/1982 | VanNess | 364/465 |
| 4,360,877 | 11/1982 | Langston et al. | 364/465 |
| 4,412,292 | 10/1983 | Sedam et al. | 364/479 |
| 4,550,859 | 11/1985 | Dow, Jr. et al. | 222/26 |
| 4,853,850 | 8/1989 | Krass, Jr. et al. | 364/200 |
| 4,872,541 | 10/1989 | Hayashi | 194/217 |
| 4,876,653 | 10/1989 | McSpadden et al. | 364/479 |
| 4,896,270 | 1/1990 | Kalmakis et al. | 364/479 |
| 5,208,742 | 5/1993 | Warn | 364/131 |

OTHER PUBLICATIONS

Options and Listings sheet entitled "Bennett PC-300 Electronic Pump Controller," published by Bennett Pump Company in the U.S., 1985, (no month).

Installation, Service Manual and Parts List entitled "PC-300 Electronic Pump Controller 1 to 32 Hoses," published by Bennett Pump Company in the U.S., 1985 (no month).

(List continued on next page.)

*Primary Examiner*—Jerry Smith
*Assistant Examiner*—Paul Gordon
*Attorney, Agent, or Firm*—Price, Heneveld, Cooper, DeWitt & Litton

[57] ABSTRACT

An interface unit for interfacing a peripheral bus of a computer system with a dispensing system for dispensing a material, such as gasoline, and which includes a plurality of dispensers for controlling the dispensing of the material. The interface unit includes a controller and a first communication link for providing bidirectional communication between the controller and the material dispensers. A second communication link is connected with an internal bus on the interface unit and the peripheral bus of the computer system to provide bidirectional communication between the controller and the computer system. The second communication link includes a window memory for storing code and a bus interface. The bus interface includes an access control port for communicating access codes between the peripheral bus and the controller and a memory control for selectively connecting either the internal bus or the peripheral bus with the window memory in a manner that only one of the controllers and the peripheral bus may access the window memory at a time. A database of dispensing data collected from the plurality of dispensers is defined in a controller memory. Polling commands are sent from the controller to the dispensers and responses are collected over the first communication link. The controller is programmed to repetitively generate polling commands for the dispensers and to update the database with resulting responses. Inquiry commands are served from the computer system to the database for retrieving from the database data that is responsive to the inquiry commands.

68 Claims, 20 Drawing Sheets

OTHER PUBLICATIONS

Operator's Manual entitled "Access 410/430 System," published by Bennett Pump Company in the U.S., 1988 (no month).

Manager's Manual entitled "Access 410/430 System," published by Bennett Pump Company in the U.S., 1988, (no month).

Service Manual entitled "Access 410/430 System," published by Bennett Pump Company in the U.S., 1988, (no month).

Installation Manual entitled "OMNI Series Operator's Terminal and Resource Manager," published by Bennett Pump Company in the U.S., no later than Jan. 1, 1990.

Operator's Manual entitled "OMNI Series Operator's Terminal and Resource Manager," published by Bennett Pump Company in the U.S., no later than Jan. 1, 1990.

IEEE Standard 796-1983 entitled "Microcomputer System Bus," published by the Institute of Electrical and Electronic Engineers, Inc. in the U.S., Dec. 29, 1983.

DIRECT INTERFACE BETWEEN FUEL PUMP AND COMPUTER CASH/REGISTER

This is a continuation of co-pending application Ser. No. 07/624,420 filed on Dec. 7, 1990, now abandoned on Jun. 18, 1993.

BACKGROUND OF THE INVENTION

This invention relates generally to fuel dispensing pumps, and more particularly to a control system for such pumps, especially to such a control system which utilizes a personal computer to exchange information with a smart fuel pump, including a dispenser and/or a user debit or credit card accepter device. More particularly, the invention relates to an interface unit to regulate the exchange of information between the personal computer and the smart fuel pump.

Smart fuel pumps have been developed which are capable of receiving commands from a remote control device, such as a computer. Such commands may include a limit on the amount of gas that may be dispensed, the limit relating to the prepaying of that amount by the customer, a price per unit volume of gasoline, and the like. Such fuel pump may additionally provide status information to the computer such as the amount of fuel dispensed, whether the pump is active or "down", or the like. In addition, to having a dispenser, such smart fuel pump may additionally include a card accepter which reads a magnetic strip on a user debit card, or credit card, to allow the user to prepay for the gasoline purchase from the location of the fuel pump, remote from the computer/cash register.

An interface unit is required to handle the communication from the computer/cash register to the fuel pumps. Because of the physical separation, a universal asynchronous receiver/transmitter (UART) is typically provided to transmit and receive information to/from the remote fuel pumps which are arranged in a current-loop with each fuel pump assigned a unique address. Data exchange between the computer and adaptor box is typically in serial fashion using a standard interface format, such as an RS-232 format. This arrangement has proved to be extremely slow because all data must be converted to serial format and communicated one word at a time. Furthermore, the multiple fuel pumps on the current loop may only be addressed one device at a time from the computer to the interface unit which, in turn processes the information prior to sending it to the fuel pumps, and visa versa. This arrangement is not only exceptionally slow, but is also unreliable. A fault in any one dispenser or card reader can shut down the entire current loop, which typically is the entire system. Furthermore, it is inflexible in that any modifications to the system must be installed by a field-service representative who must physically gain access to the adapter box.

One form of computer that is gaining universal acceptance is the personal computer, or PC. A PC is especially adapted to controlling a fuel dispensing terminal because the PC may additionally handle the cash register function, payroll and inventory for the associated convenience store. A PC typically includes an expansion bus and a plurality of edge card connecters for allowing peripheral devices to directly interface with the PC. Interface circuits engaging the PC bus typically utilize a dual-ported direct memory access (DMA) in which a single memory device is accessible from the PC through the first port or a microprocessor, residing on the interface board through the second port. The direct memory access (DMA) occupies a location in the memory map of the PC and is under the control of the PC, with access granted to the on-board microprocessor by the PC through interrupts generated by the on-board microprocessor. This arrangement has many drawbacks. Not only does the DMA occupy space in the PC memory map, but the supervision of the DMA by the PC is a considerable task, which slows multi-tasking functions within the PC. Furthermore, the on-board microprocessor is required to operate at the same clock speed as the PC, whether or not this is most efficient for the functions being performed by the microprocessor. On a practical level, the DMA chip-set is expensive. Furthermore, there is only a defacto standard for PC bus format. Because there are no true industry standards, there are risks that the caveats required for the DMA may not be completely satisfied by all PCs. Therefore, it cannot be ensured that a DMA-based interface unit is truly universally compatible with all PC's.

SUMMARY OF THE INVENTION

The present invention provides a direct interface between a computer, such as a personal computer, and one or more material dispensers, such as fuel pumps. The interface includes an on-board controller means for communicating with the dispensers and means for providing communication between the controller and the computer. This latter means includes a memory means and access means for allowing the controller and the computer to each access the memory means such that the controller and the computer can write data to, and retrieve data from, the memory means.

According to one aspect of the invention, the interface unit includes a window memory means having an access port and access control means for selectively connecting the access port with either the interface controller or the computer peripheral bus, such that either the controller or the computer may access the memory means at a time. Because of this controlled access, it can readily be ensured that complete messages will be transferred without interruption. Furthermore, the requirement for a common clock cycle between the computer and the controller means is eliminated. Therefore, the controller means can operate at a slower, or if desirable, a faster clock rate than the computer system. In one embodiment, the access control means includes a control port to pass requests for access to the window memory between the computer and the controller.

According to another aspect of the invention, the access control means for the window memory means is substantially controlled by the on-board interface controller. This frees up the computer system for other tasks. Furthermore, in one embodiment of the invention, the controller is not multi-tasked. Accordingly, the controller is dedicated to its interface function to provide a greater level of confidence in data integrating. Because its interface function includes control of the window memory means, the opportunity for other errors is also significantly reduced.

According to yet another aspect of the invention, the interface unit includes a database memory which is repetitively updated by data received from the fuel pumps. Messages from the computer are applied to the database rather than to the fuel pumps. In this manner, communication speeds are increased. Normal polling communication between: the interface unit and the computer does not get processed through the dispenser communication loop. Communications with the fuel pump is ongoing and not initiated upon request from the computer. However, certain specific commands initiated by the computer will cause the interface unit to initiate priority communications with the fuel pumps. The database may include an internal database accessed only by the on-board controller and a mirror image of the internal database residing in the window memory shared between the PC and the interface unit. The internal database is periodically written to the shared memory to keep the shared memory current.

In one embodiment of the invention, a plurality of UARTs are provided for simultaneous operation by the controller. Each UART is further multiplexed to sequentially operate a plurality of control loops, each control loop including a single fuel pump, which may include a dispenser and a card reader. This allows multiple fuel pumps to be addressed concurrently and prevents a fault in any fuel pump from degrading the entire system.

The present invention is exceptionally fast because it eliminates the serial interface between the computer and the interface circuitry. Additionally, the ability to address multiple fuel pumps at a time increases system speed. An interface unit, according to the invention, is not format-specific to any personal computer and doesn't require a significant amount of the computer's processing time, which frees the computer for faster response to other tasks. In fact, the PC is freed of any supervisory tasks for the interface and may treat this dispensing system as a peripheral device. The invention allows updates of the operating code for the interface controller to be down-loaded from the computer through the window memory means. The modified operating code may be down-loaded to internal memory through the window memory, a portion at a time, in a bucket-brigade fashion. This allows updates to the system to be implemented through any means of communication with the computer, including down-loading through a MODEM over telephone lines, avoiding the necessity of field-service technicians accessing the interface unit for upgrade modification.

These and other objects, advantages and features of this invention will become apparent upon review of the following specification in conjunction with the drawings.

DESCRIPTION OF THE PREFERRED EMBODIMENT

I. Hardware

Figure 1:
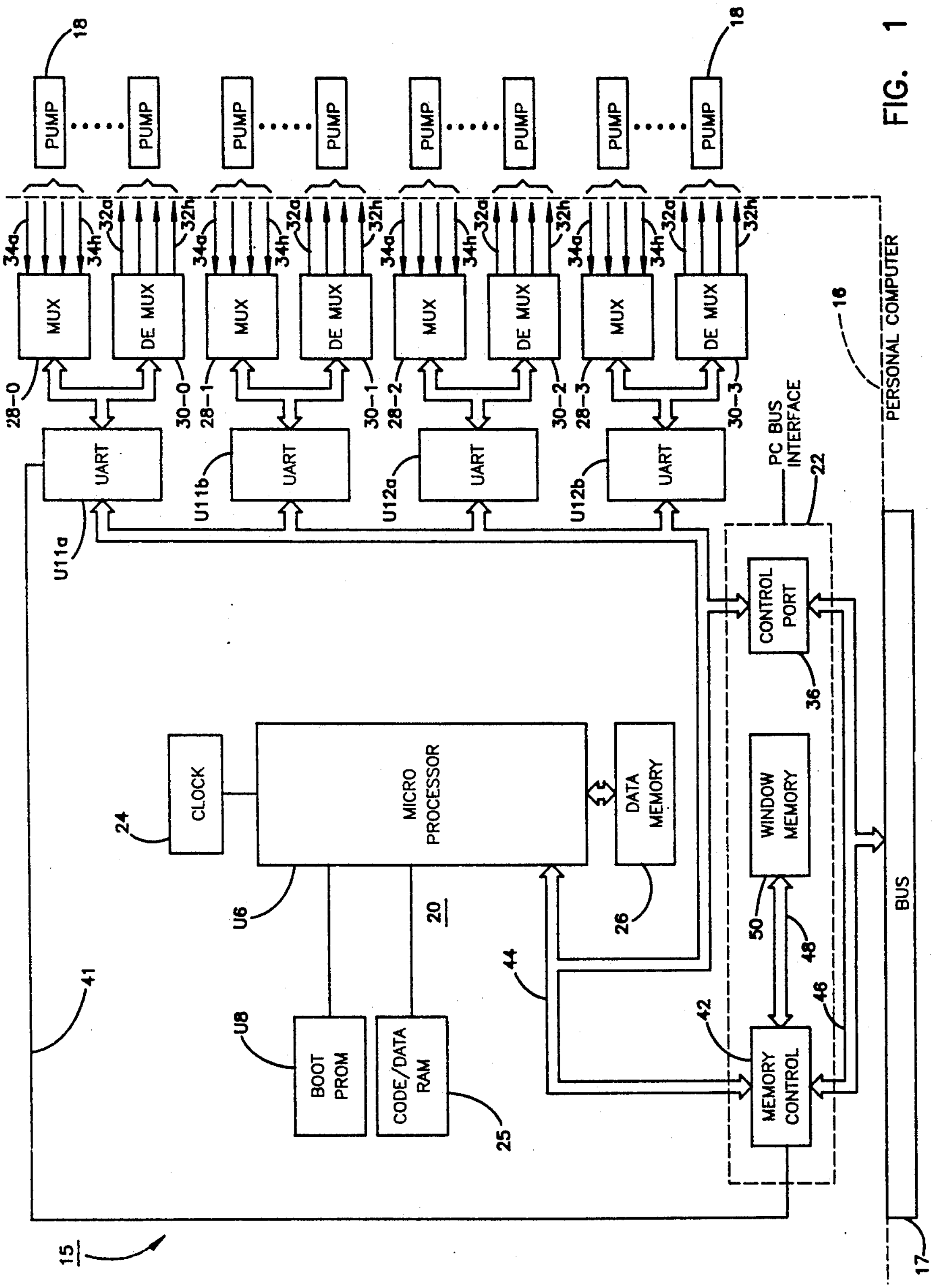
FIG. 1 is a block diagram of a dispensing system according to the invention.
Figure 16:
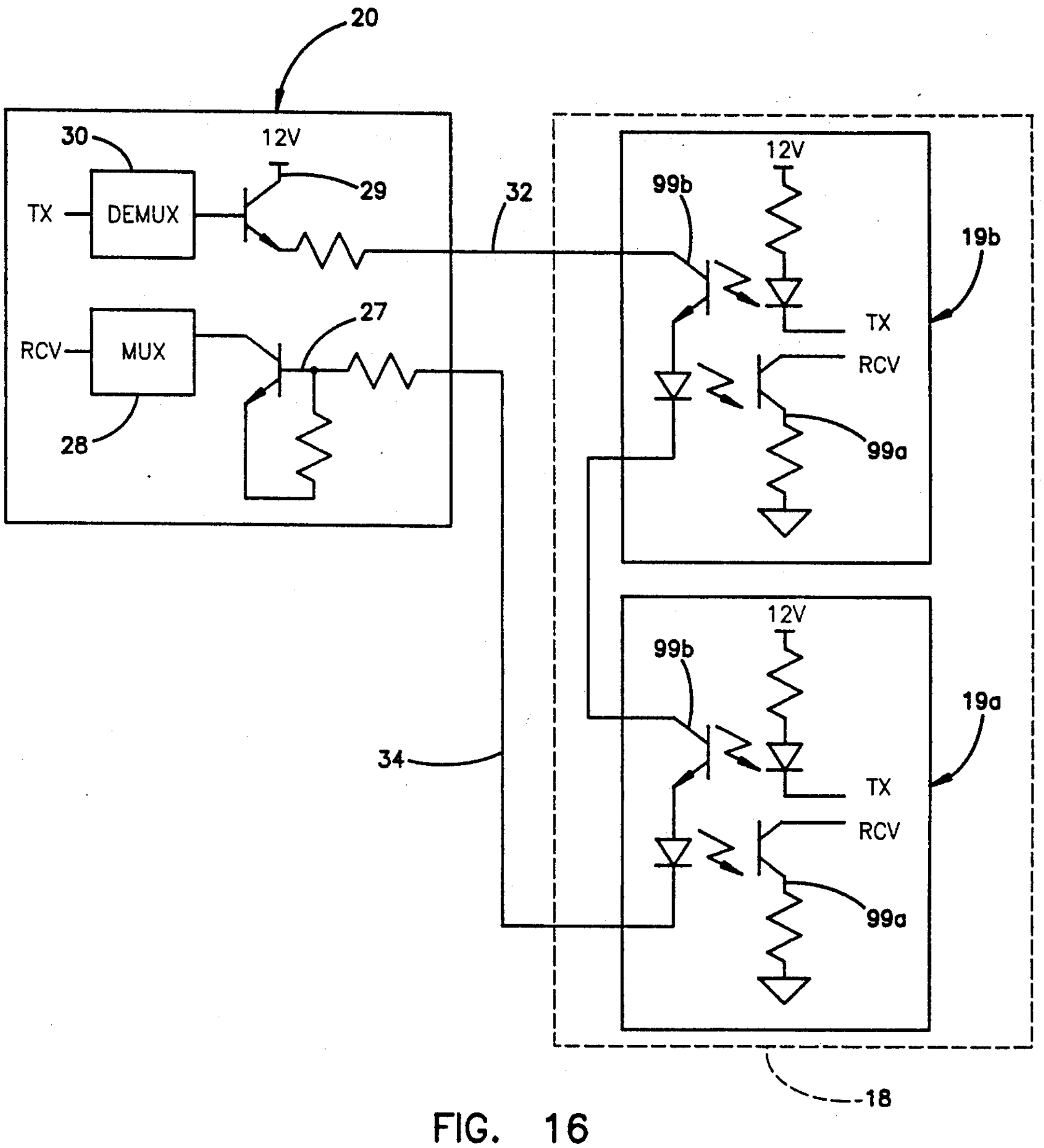
FIG. 16 is a schematic diagram of a current loop interface with a fuel pump.

Referring now specifically to the drawings, and the illustrative embodiments depicted therein, dispensing system 15 includes a personal computer, or PC, 16, a plurality of fuel dispensing pumps 18 and an interface unit 20 between personal computer 16 and pumps 18 (FIG. 1). Each pump 18 is a "smart" pump having input/output circuitry which may be polled by interface unit 20 and will accept data downloaded from unit 20. Pump 18 includes a dispenser unit 19*a* to control the dispensing of fuel and may include an optional card accepter unit 19*b* to read the magnetic data contained on a personal debit card or credit card (FIG. 16). Computer 16 includes a peripheral bus 17 for communication with peripheral devices, such as printers, MODEMS and the like. Interface unit 20 includes a PC bus interface 22 having circuitry for exchanging data between PC bus 17 and a controller such as microprocessor U6 on-board the interface unit. Microprocessor U6 receives timing signals from a 20 megahertz (MHz) clock 24 and initialization routines from a boot prom U8. A nonvolatile or volatile memory 25 stores operating code and a static RAM memory 26 stores data for use by microprocessor U6. Microprocessor U6 drives four universal asynchronous receiver/transmitters (UARTs) U11A, U11B, U12A and U12B. Each UART, in turn, is interconnected with a multiplexer 28 and a de-multiplexer 30. Each de-multiplexer 30 has eight associated output lines 32*a*, 32*b*, 32*c*, 32*d*, 32*e*, 32*f*, 32*g* and 32*h* and each multiplexer 28 has eight associated input lines 34*a*, 34*b*, 34*c*, 34*d*, 34*e*, 34*f*, 34*g* and 34*h*. Each de-multiplexer output line 32*a*–32*h* is in a current loop with an individual fuel pump 18 and an input line 34*a*–34*h* of an associated multiplexer 28. Communications with the dispenser unit 19*a* and card acceptor unit 19*b* for a particular fuel pump 18 are on the same communication loop, as illustrated in FIG. 16. In this manner, each UART interfaces with eight pumps, which are addressed one at a time. With four UARTs, microprocessor U6 is capable of addressing four pumps at a time and all thirty-two pumps in eight address cycles.

PC bus interface 22 includes a control port 36 which receives signals on an external bus 46 extending to personal computer bus 17, buffers the signals received from the personal computer bus and provides signals to microprocessor U6 on an internal bus 44 extending from microprocessor U6. Control port 36 additionally buffers signals from microprocessor U6 and provides such signals to the personal computer on external bus 46 extending to bus 17. A memory control device 42 is interconnected with internal bus 44 of interface unit 20, external bus 46 extending to personal computer bus 17 and a window bus 48 extending between memory control 42 and a window memory 50. Memory control 42 is under the control of microprocessor U6 by way of a control line 41 extending from UART U11A to memory control 42. When microprocessor U6 instructs UART U11A to cause line 41 to be in a first state, memory control 42 actively interfaces window bus 48 with external bus 46 such that personal computer 16 can write data to window memory 50 and retrieve data from window memory 50. When microprocessor U6 instructs UART U11A to cause control line 41 to be in an alternate state, memory control 42 actively interfaces window bus 48 with internal bus 44 such that microprocessor U6 can write data to and retrieve data from window memory 50. However, isolation is always maintained between internal bus 44 and external bus 46 and only one of the internal and external buses is allowed access to window memory 50 at a time.

Memory control 42 interfaces window bus 48 with either internal bus 44 or external bus 46 under the control of microprocessor U6. When personal computer 16 has a command to write to window memory 50 or wishes to retrieve data from window memory 50, access must be requested by PC 16 through control port 36. An interrupt may be generated to the microprocessor U6 at the instruction of the PC by writing to a specific control port address. Additionally, the interface unit 20 may be reset independent of the rest of system 15 by the PC writing to the control port at a specific sequence of addresses which generates at non-maskable interrupt (NMI). Microprocessor U6 additionally supervises and repetitively updates a database partially residing in data memory 26 by polling pumps 18 and writing the retrieved data to the database. This database is periodically copied to window memory 50 shared with computer 16. When personal computer 16 issues a command, it does so by requesting access to window memory 50 for placement of the command, which is then implemented by microprocessor U6. When personal computer 16 wishes to retrieve the status of a particular pump, it requests access to window memory 50 and retrieves the data that had been loaded to the shared memory. Dispenser status is always available in shared memory.

PC bus interface 22 additionally provides the capability for down-loading operating code to an operating code memory 25. This occurs in a "bucket-brigade" fashion by a portion of the code being loaded into window memory 50 through external bus 46 and retrieved by microprocessor U6 over internal bus 44 and written to memory 25. When this cycle is complete, the next batch of code is written to window memory 50 through external bus 46 and retrieved by microprocessor U6 over internal bus 44. This process is repeated until the entire module or modules are down-loaded to memory 25. In this manner, software updates may be provided without gaining physical access to interface unit 20 to replace PROMs or the like. Rather, software updates may be inputted to personal computer 16 through magnetic medium, or down-loaded from a remote database through a MODEM interface, or the like.

Interface unit 20 "looks" like any peripheral device to personal computer 16. Commands may be issued to interface 20 and data read using conventional operating systems, such as UNIX, and commercially available application software developed for the purpose of supervising the operation of a convenience store. A personal computer 16 having such application software combined in a convenience store system is commercially available and is marketed by Retail Automation, Inc. located in Atlanta, Ga. Intelligent pumps, such as fuel pumps 18 are commercially available and are marketed by Bennett Pump Company, the present assignee, under Model Series 6000, 7000, 8000 and 9000.

Figure 2A:
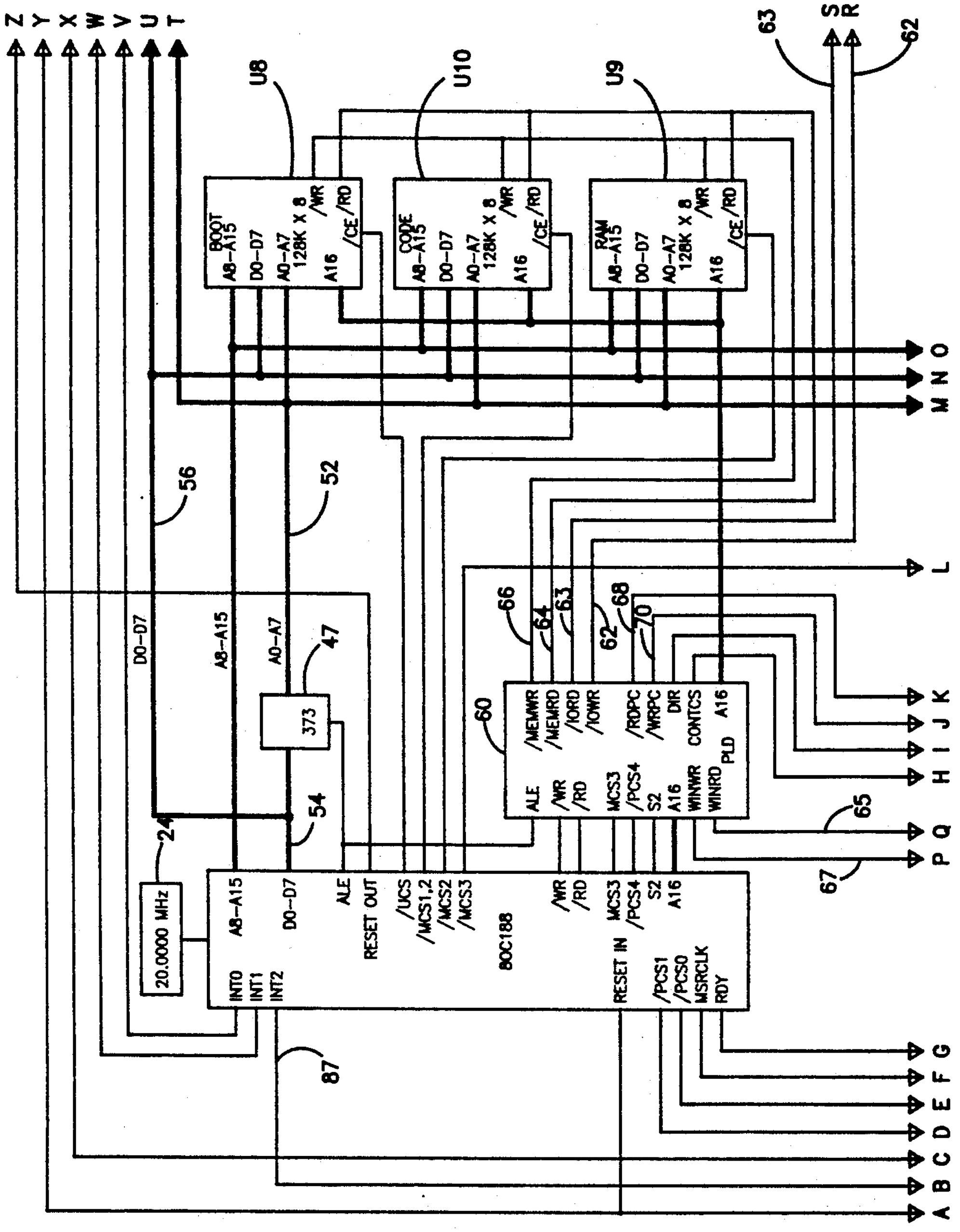
FIGS. 2A, 2B and 2C are block diagrams of an electrical control circuit of an interface unit according to the invention.

Microprocessor U6 is preferably Model 80C188 microprocessor, marketed by Intel, which is capable of accessing 384K of code space and up to 128K of data storage space, in addition to 8K of window memory (FIG. 2A). Microprocesser U6 operates on a system clock rate of 10 MHz developed from a 20 MHz clock 24. A latch circuit U7 is actuated by an address-latch-enable signal ALE to drive a low order address bus 52 with address bytes A0–A7. After the address is latched from bus 54, the bus operates as a bi-directional data bus 56. A high order address bus 58 does not require latching.

Boot memory device U8, which stores the initialization routine for microprocessor U6 in the illustrated embodiment, is between a type 2764A and a type 27010, EPROM. Memory device U10, which is a nonvolitile RAM, may be configured to accept between a 32K×8 and a 128K×8 flash memory device or CMOS static RAM and is provided for the purpose of storing the system operating code for the interface unit. An auxiliary flash memory or CMOS static RAM (not shown) may additionally be provided to augment U10. Memory device U9, which is a nonvolitile RAM, may be configured to accept between a 32K×8 and a 128K×8 CMOS flash memory device or static RAM and is provided for the purpose of storing system data. Boot EPROM U8 resides at the upper chip-select (UCS), the operating code memory device U10, and its auxiliary, if provided, device reside at middle chip-select 1 and 2 (MCS1, MCS2) respectively, and the data storage device U9 resides at middle chip-select 0 (MC 0) of microprocessor U6.

A programmable logic device (PLD) 60 decodes the memory I/O, control register and data window WR (WRITE) and RD (READ) control lines. Latch enable signal ALE is inverted and supplies the clock input of PLD 60. An S2 signal from microprocessor U6 signifies whether the RD/WR signals eminating from the microprocessor are for a memory cycle or an I/O cycle. PLD 60 produces an IOWR signal 62 which is the I/O WRITE command for the interface unit 20 and an IORD signal 63 which is the I/O read command. These signals are produced by "anding" the microprocessor WR and RD signals respectively with the latched S2 signal. A MEMRD signal 64 is the memory read command for the interface unit 20. This signal is produced by "anding" the microprocessors RD signal with the latched S2 signal. A MEMWR signal 66 is the memory WRITE command for the dispenser interface unit 20. This signal is produced by "anding" the microprocessor's WR signal with the latched S2 signal.

An RDPC signal 68 is the control port read command for the dispenser interface unit 20. The control port resides in the peripheral chip-select area 4 (PCS4). This signal is produced by "anding" the IORD signal with the microprocessor's PCS4 signal. The WRPC signal 70 is the control port write for the dispenser interface unit. This signal is produced by "anding" the IOWR signal and the microprocessor's PCS4 signal. The WINRD signal 65 is the data window read for the dispenser interface unit. The data window resides in the middle chip-select 3 area (MCS3). This signal is produced by "anding" the MEMRD signal with the microprocessor's MCS3 signal. A WINWR signal 67 is the data window WRITE for the dispenser interface unit. This signal is produced by "anding" the MEMWR signal with the microprocessor's MCS3 signal. PLD unit 60 is a generic programmable logic device which is commercially available and is marketed by numerous manufacturers, under Model No. 22V10.

Figure 2B:
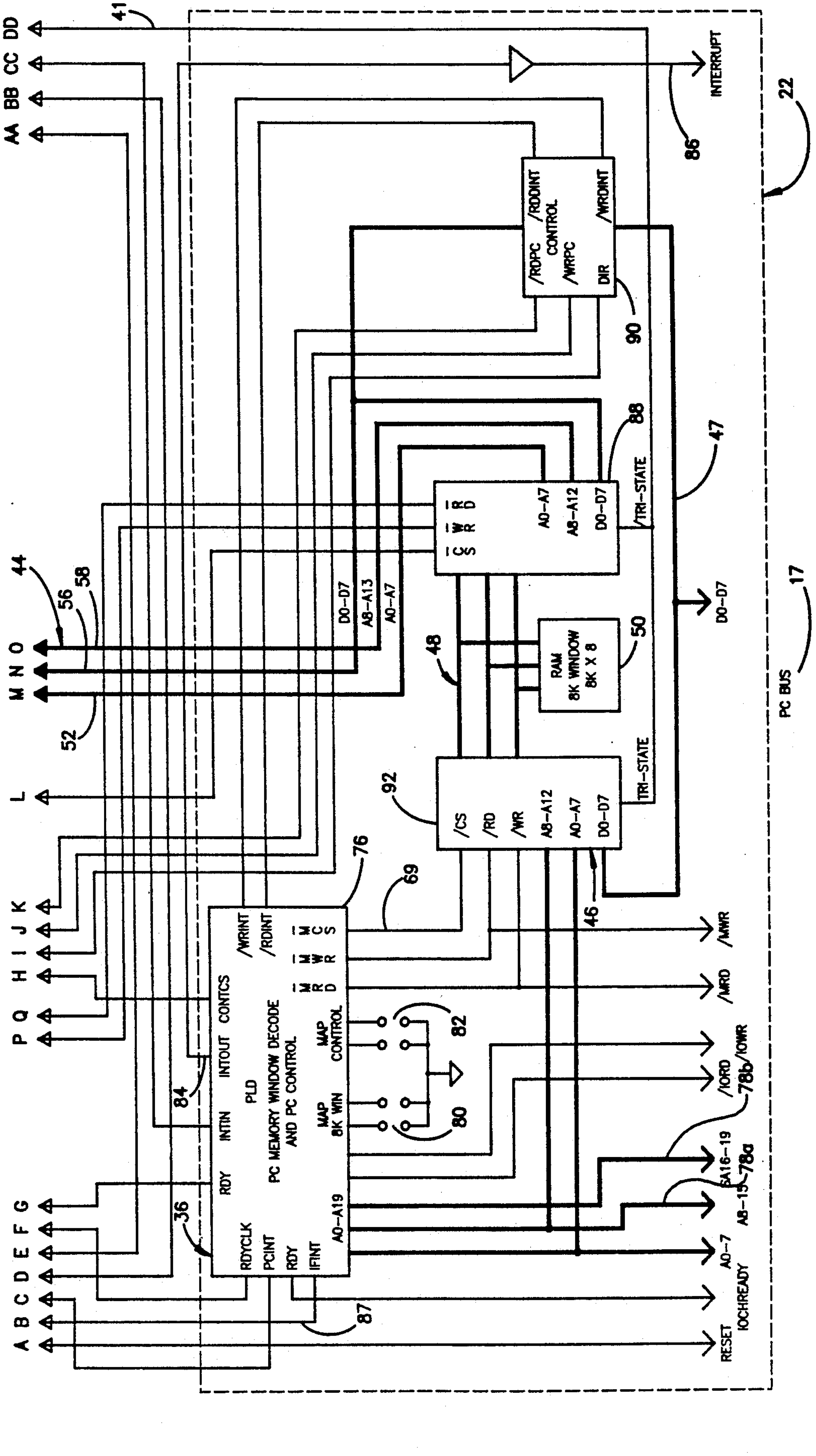

PC bus interface 22 provides an 8-bit edge card connector interface to PC bus 17 (FIG. 2B). An array of programmable logic devices (PLD) 76 decodes the PC bus address bytes on lines 78*a*, 78*b* and produces a window chip-select signal WINCS on line 69 during a valid base address range. A valid base address may be jumper-selected at inputs 80 and a control port base address may be jumper-selected at inputs 82. PLD 76 additionally generates various system interrupts including interrupt signal INTOUT on line 84 from the interface unit to the PC at terminal 86. Signal INTOUT is also jumper-selectable to a variety of PC interrupts. PLD 76 additionally generates an interrupt from the PC to the interface unit (IFINT) on line 87. Other signals generated by programmable logic device 76 are outlined in APPENDIX A which sets forth the logic sequence of their generation. PLD circuit 76 is a generic programmable logic device supplied by various manufacturers, under Model No. 22V10.

PC bus interface 22 includes an internal bus access control circuit 88 for selectively coupling or isolating internal data buses 52, 56 and 58 with window memory device 50 by isolating or driving the data window's address bus and control lines with internal bus control busses 52 and 58. A bus access control circuit 90 isolates and buffers the internal data bus 56 with the external data bus 47 to process requests by computer 16 for access to window memory 50. Interface 22 further includes external bus access control circuit 92 for selectively coupling or isolating external bus 46 with window memory 50. External bus access control circuit 92 isolates or enables the PC data bus to the window memory data window. The data window and control port of window memory 50 are connected between internal bus 44 and external bus 46 under the control of microprocessor U6. This is accomplished by the toggling of line 41 extending from output bit OP6 of DUART U11. A logic high-out on this line directs the data window to external bus 46 and a logic low directs the data window to internal bus 44. The bus that is selected is allowed to drive the data window memory through standard bus drivers. In the illustrated embodiment, window memory 50 is a conventional 8K3×8 RAM memory device. In the illustrated embodiment, circuit 90 is a standard model 74ALS646 integrated circuit; circuits 88 and 92 each include standard models 74HC244 and 74HC245 integrated circuits.

Figure 2C:
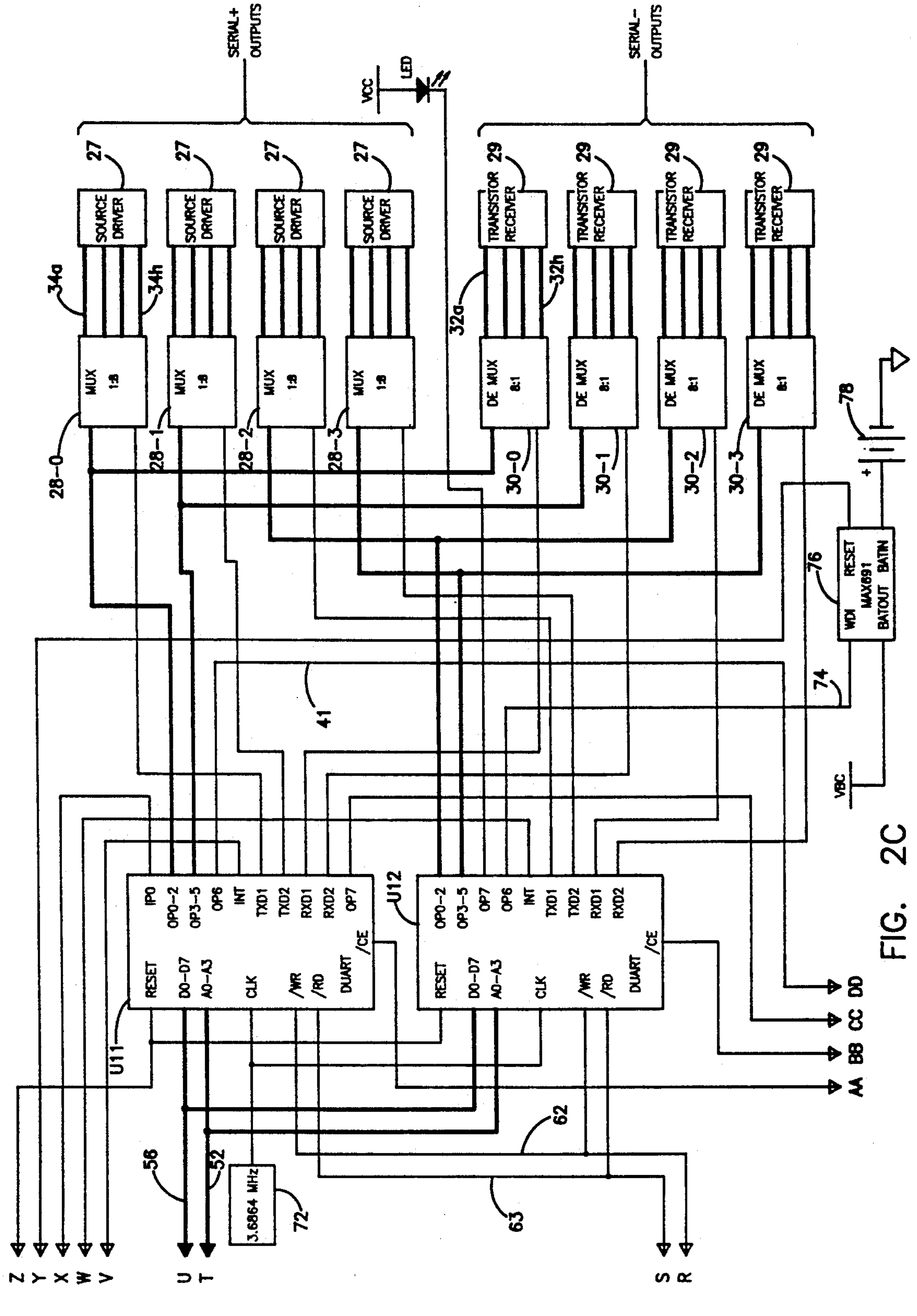

A pair of dual universal asynchronous receiver/transmitters (DUARTs) U11 and U12 interface directly to microprocessor buses 56 and 52 (FIG. 2C). A clock 72 drives the internal circuitry of the DUARTs and determines the BAUD rates used by the DUARTs for communicating with fuel pumps 18. DUARTs U11 and U12 are driven directly from RD and WR signal lines 62 and 63. DUART U11 resides at peripheral chip-select 0 (PCS0) and DUART U12 resides at peripheral chip-select 1 (PCS1) of microprocessor U6. Output pins OP0-OP5 of DUART U11 select the pump loops 1 through 16 to communicate with and output pins QP0-OP5 of DUART U12 select the pump loops 17 through 32 to communicate with. Output pin OP6 of DUART U11 is provided on line 41 as the tri-state control signal for the operation of memory control 42. Output pin OP6 of DUART U12 is supplied as a watchdog timer reset bit on line 74 to battery backup circuit 76. Backup circuit 76 is a maxim model MAX690 supervisory circuit marketed by Maxim and includes a 3.6V lithium cell 78 to provide optional backup power to memory devices U8-U10.

DUARTs U11 and U12 interface with up to 32 fuel pumps 18 utilizing 32 separate current loops, each including an output line 32*a*-32*h* and an input line 34*a*-34*h*. Each driver portion of the current loop is formed with a high current source driver 29, such as a unit marketed by Sprague under Model No. UDN2982A, through a 180 ohms, ½ watt series current limiting resistor. The inputs to the source drivers are provided by outputs of the corresponding de-multiplexers 30. In the illustrated embodiment, de-multiplexers 30 are provided as standard Model No. 74HCT138 integrated circuits. Each receiving portion 27 of the current loop is formed with a 56 ohm series current limiting resistor, an 82 ohm pull-down resistor and an open-collector transistor, such as supplied under Sprague Model No. ULN2081. The outputs of the open collector transistor are pulled high with a 15K ohm pull-up resistor and provided to the input channel of the corresponding multiplexer 28. In the illustrated embodiment, multiplexers 28 are industry-standard Model No. 74HC151 integrated circuits. Each dispenser 19*a* and credit card acceptor includes an optically coupled transistor 99*a* for transmitting to the interface unit and an optically coupled transistor 99*b* for receiving from the interface unit (FIG. 16).

Transmit channel A of DUART U11 drives the input of the associated de-multiplexer 30-0. The de-multiplexer selectively applies a signal to eight output channels 32*a*-32*h*. The inputs of this de-multiplexer are controlled by the output port bytes OP0-OP2 (SEL-0-SEL2) of DUART U11. Transmit channel B of DUART U11 drives the input of de-multiplexer 30-1 which separates the single output channel out to eight output channels. The select inputs of this de-multiplexer are controlled by the output port bytes OP3-OP5 (SEL3-SEL5) of DUART U11. The receive channel A of DUART U11 is driven by the output of multiplexer 28-0. This multiplexer combines eight channels received on lines 34*a*-34*h* into one channel. The select inputs of this multiplexer are controlled by the output port bytes OP0-OP2 (SEL0-SEL2) of DUART U11. Receive channel B of DUART U11 is driven by the output of multiplexer 28-1. The select inputs are controlled by the output port bytes OP3-OP5 (SEL3-SEL5) of DUART U11.

DUART U12, having channels A and B and associated multiplexers and de-multiplexers are arranged in the same fashion as DUART U11 in order to service the other 16 of the 32 pumps in dispensing system 15. In the illustrated embodiment, DUARTs U11 and U12 are industry standard Model No. 88C681 integrated circuits. De-multiplexers 30 are industry standard 74HCT138 integrated circuits and multiplexers 28 are industry standard 74HC151 integrated circuits. The communications current loop is powered from the 12V DC power supply of computer 16. The 12V DC supply is filtered and the communications current loop ground is isolated from the ground of the 12V DC supply of PC 16.

II. Software

Figure 3:
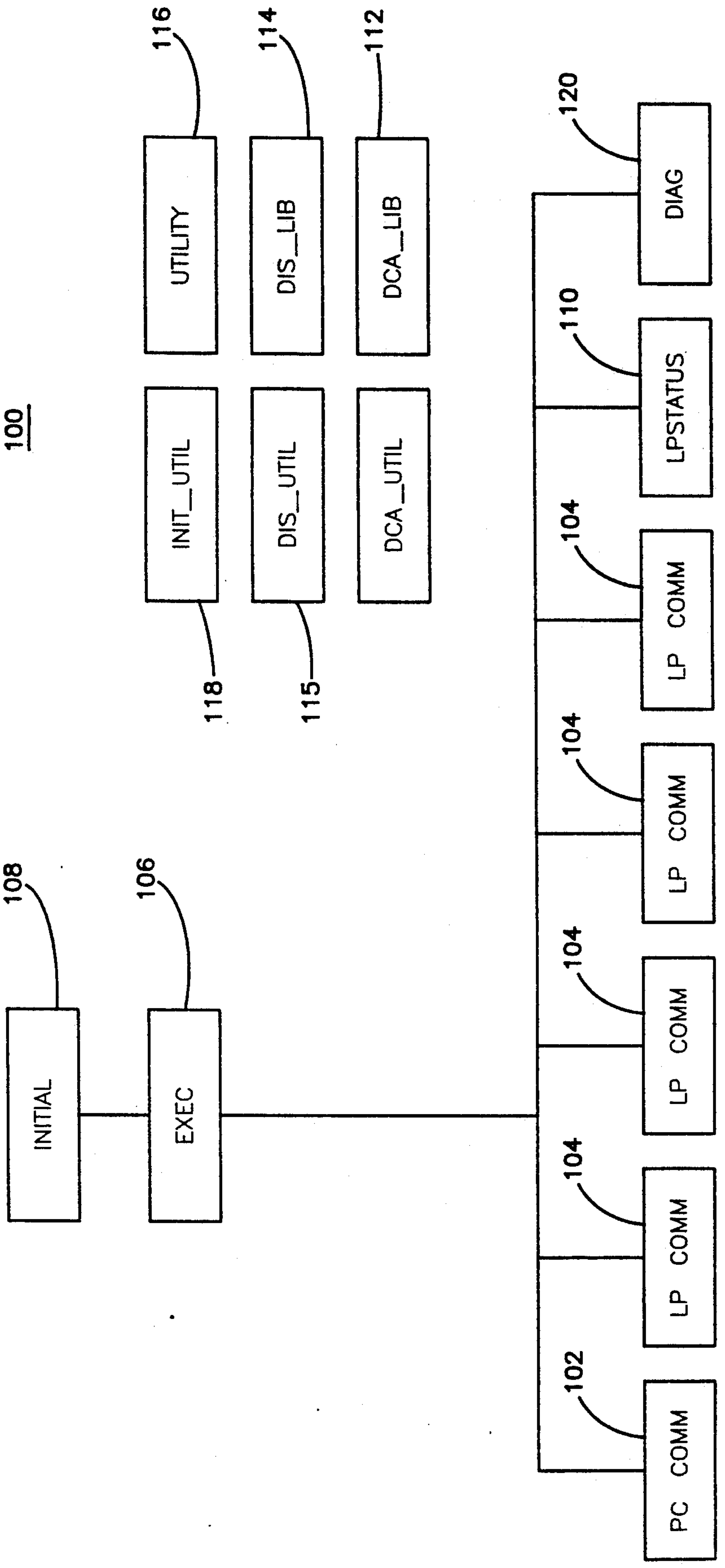
FIG. 3 is a block diagram of a control program according to the invention.

A software control program 100 used in interface unit 20 includes a PC communication module (PC-COMM) 102 to handle communications with the PC bus and a plurality of pump-loop communication modules (LP-COMM) 104, each to handle communications with the fuel pumps associated with a single UART (FIG. 3). LP-COMM module 104 will be duplicated four times, once for each UART in the system. The UART specific data, such as UART port addresses can then be incorporated by having a unique header file for each LP-COMM Module 104. All modules are called by an executive routine (EXEC) 106, which is the mainline control of program 100. The EXEC routine 106 first calls an initialize routine 108 and then goes into an infinite loop to call all of the remaining modules. No data is handled by the EXEC routine.

Program 100 additionally includes an LP-STATUS module 110 for the purpose of checking the status bytes of a fuel pump to determine if there has been any change. If a change has occurred, this module will then decide what, if any, action is necessary. DCA-LIB module 112 and DIS-LIB module 114 contain the support routines for communicating respectively with card readers and dispensers associated with each fuel pump 18. A general utility module 116 holds utility procedures that other modules use. An INT-UTIL module 118 contains interrupt routines that are not associated with the LP-COMM module 104. This includes the internal timer interrupts, interrupts from the PC and non-maskable interrupts and window access control. A DIAG module 120 is provided to handle any problems encountered during normal operations of program 100 and to initiate diagnostic routines where necessary. In the illustrated embodiment, all modules are implemented with the C language.

The PC-COMM module 102 handles communications with PC bus 17 including communication of commands and data between the module and PC system software. This module communicates with all other modules through a mailbox system or the database internal to interface unit 20. This module acts as a go-between for the internal data and mailbox structure to the PC system software. PC-COMM module 102 will be called from executive routine 106. The PC-COMM module 102 uses a shared block of memory accessed by both the internal bus 44 and external bus 46. Before the module will continue its execution, the access to the shared memory is checked. If the memory is under PC control, PC-COMM will exit back to EXEC routine 106.

Figure 4:
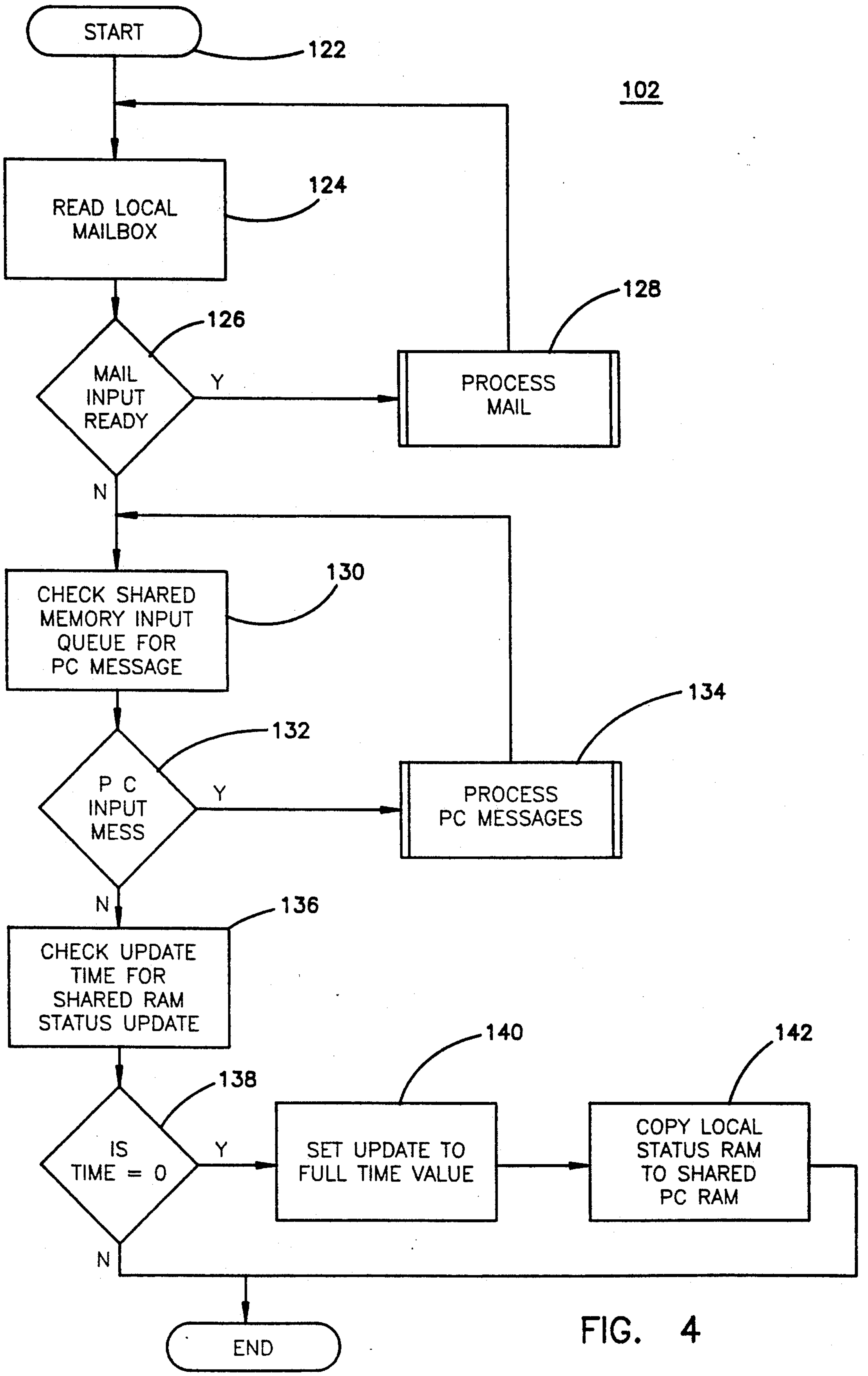
FIG. 4 is a program flow chart of a PC communications module.

After being called at 122, the PC-COMM program checks its input mailbox at 124 to see if any requests are coming from other modules (FIG. 4). If it is determined at 126 that the mailbox has a message, the message will be processed at 128. If there is no input mail, the program will check the shared memory buffer read pointers at 130 to determine at 132 whether any messages are ready for input from the PC. If there is a message, it will be processed at 134, which could include updating the database, returning data back to the PC, or passing commands to the communications mailboxes.

If it is determined at 132 that there is no PC message to be processed, the program passes to 136 where the timer that tracks the time remaining in the update cycle is examined and to 138 where it is determined whether the time has been reduced to zero. If so, control passes to 140 where the update value is increased to its maximum value and to 142 where the local status RAM is copied to the memory that is shared with the PC. If the update timer has not timed out at 138, control exits this module to resume the EXEC routine 106.

Figure 5:
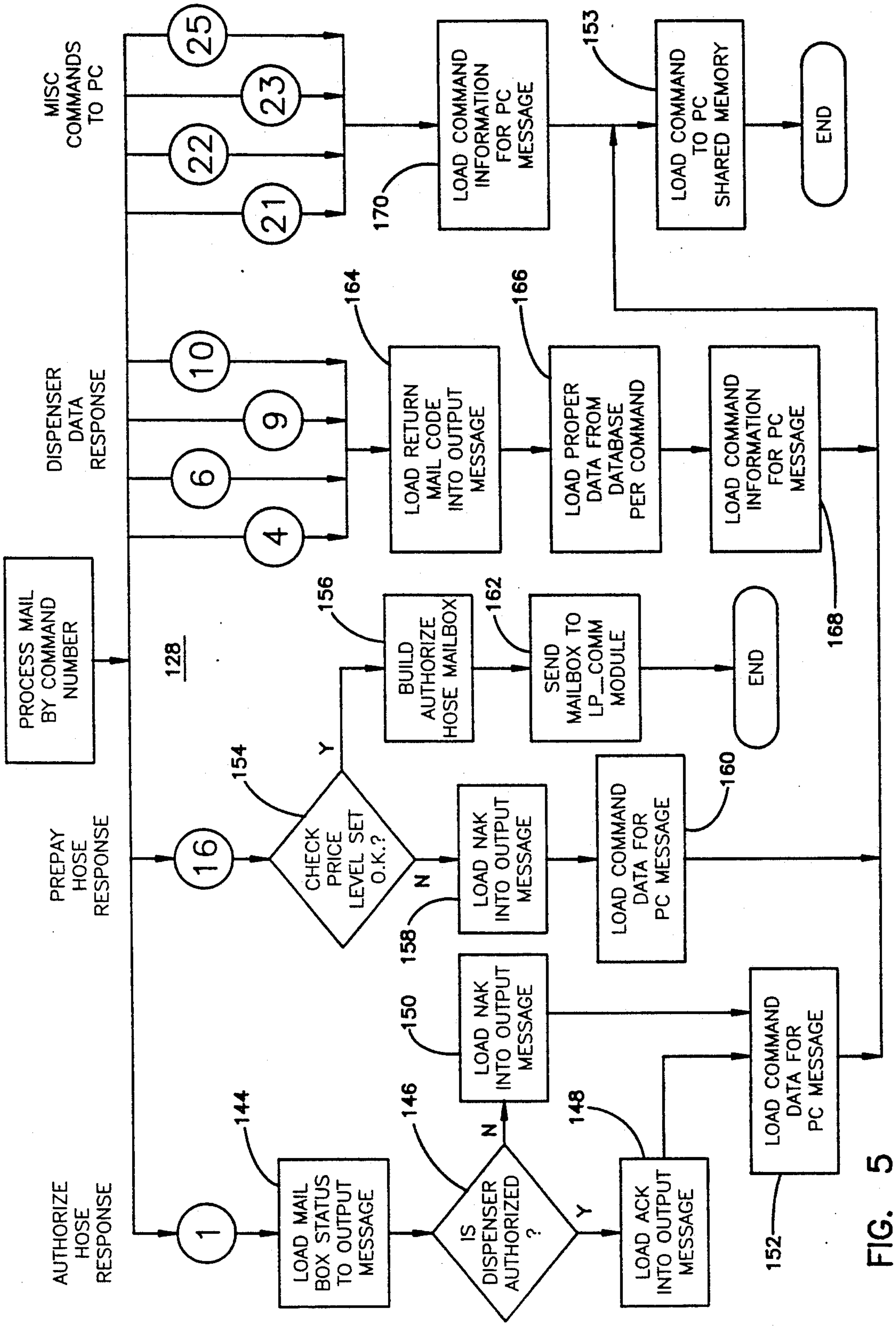
FIG. 5 is a program flow chart of a mail processing function.

The process mail function 128 examines commands in mail received from other modules (FIG. 5). Listing of these commands is set forth in APPENDIX B. If the command #1 is received (Authorize Hoze Response) then control passes to 144 where the status of the associated fuel pump is outputted and to 146 where it is determined whether a transaction with that pump has been authorized. If so, an acknowledgement word (ACK) is loaded into an output register at 148. If not, a not-authorized message (NAK) is loaded to the output register at 150. Control then passes to 152 where a PC message is formed from the data word and to 153 where the message is written to the memory shared with the PC. If command #16 is received, the control determines whether a price level has been set at 154. If so, an authorize hose message is provided to the appropriate mailbox at 156. From 156, control passes to 162 where the authorization is passed to the dispenser module. If an authorize hose message is not received, the not-acknowledge message (NAK) is loaded to the mailbox at 158. From 158 control passes to 160 where the data is formatted as a PC message and to 153 where the command is written to the shared memory.

If one of commands #4, #6, #9 or #10 is received, control passes to 164 where an appropriate return mail code is loaded into the output mailbox and 166 where the appropriate data from the database is loaded into the output mailbox. Control passes to 168 where the command is formatted to a PC message and to 153 where the message is written to the shared memory. If one of commands #21, #22, #23 or #25 is received, control passes to 170 where the requested information is retrieved and to 153 where the requested information is written to the shared memory.

Figure 6A:
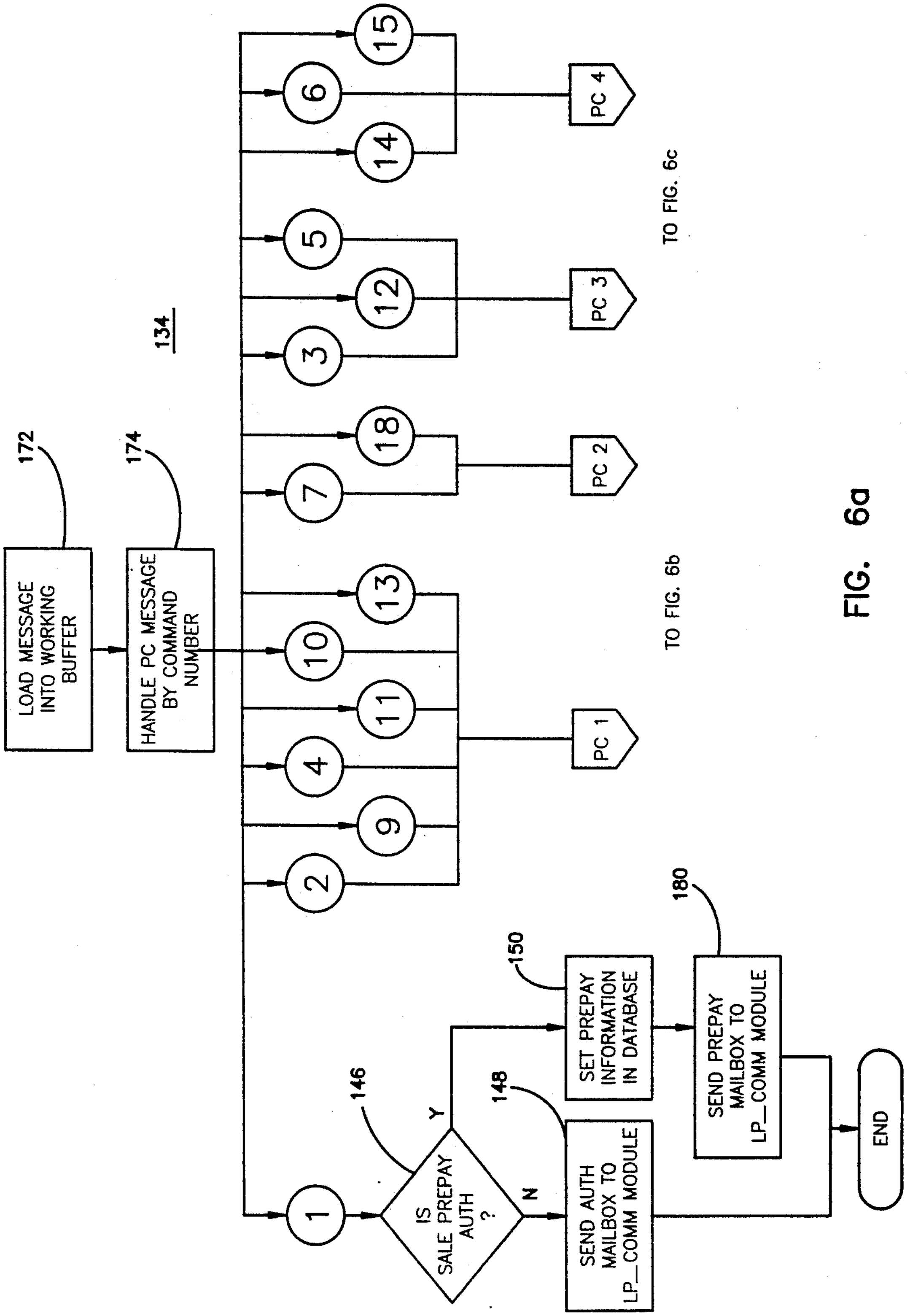
FIGS. 6A, 6B and 6C are program flow charts of a PC message processing function.
Figure 6B:
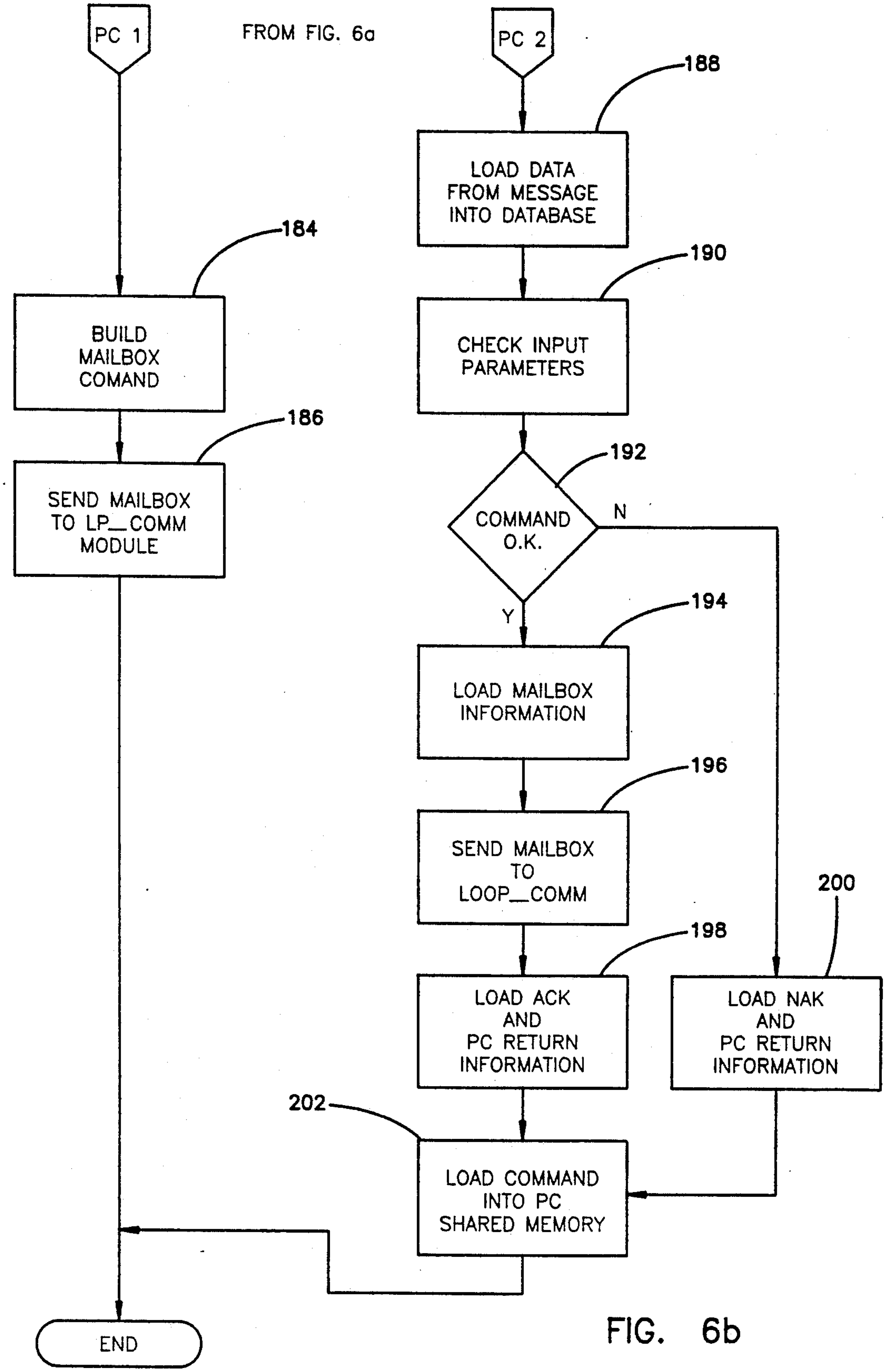

Function 134, which processes messages from the PC, loads the message into a temporary store at 172 and processes the retrieved messages at 174 by reference to the command numbers listed in APPENDIX C (FIG. 6A). If command #1 is the PC message, then the request that a particular fuel pump be armed is processed by determining at 176 whether the sale is a prepay sale. If so, control passes to 178 where the prepaid amount is loaded into the database and to 180 where the message is transferred to the mailbox of the appropriate dispenser communication module (LP-COMM) 104. If the sale is not a prepay sale, then an authorization command is provided at 182 to the appropriate dispenser communication module. If one of commands #2, #9, #4, #11, #10 or #13 is received, then control passes to 184 where an appropriate mailbox command is developed and to 186 where the message is transferred to the appropriate dispenser communication module (FIG. 6B). If PC command #7 or #18 is received, control passes to 188 where the PC message is loaded into the database and to 190 where its parameters are checked for validity. If it is determined at 192 that it is a valid command, then control passes to 194 where the command is loaded into the output mailbox and 196 where the command is transferred to the appropriate dispenser communication module. An acknowledge message is built at 198 and returned to the shared memory at 202. If the command is determined at 192 to be not valid, then a not-acknowledged (NAK) message is built at 200 and returned to the shared memory at 202.

Figure 6C:
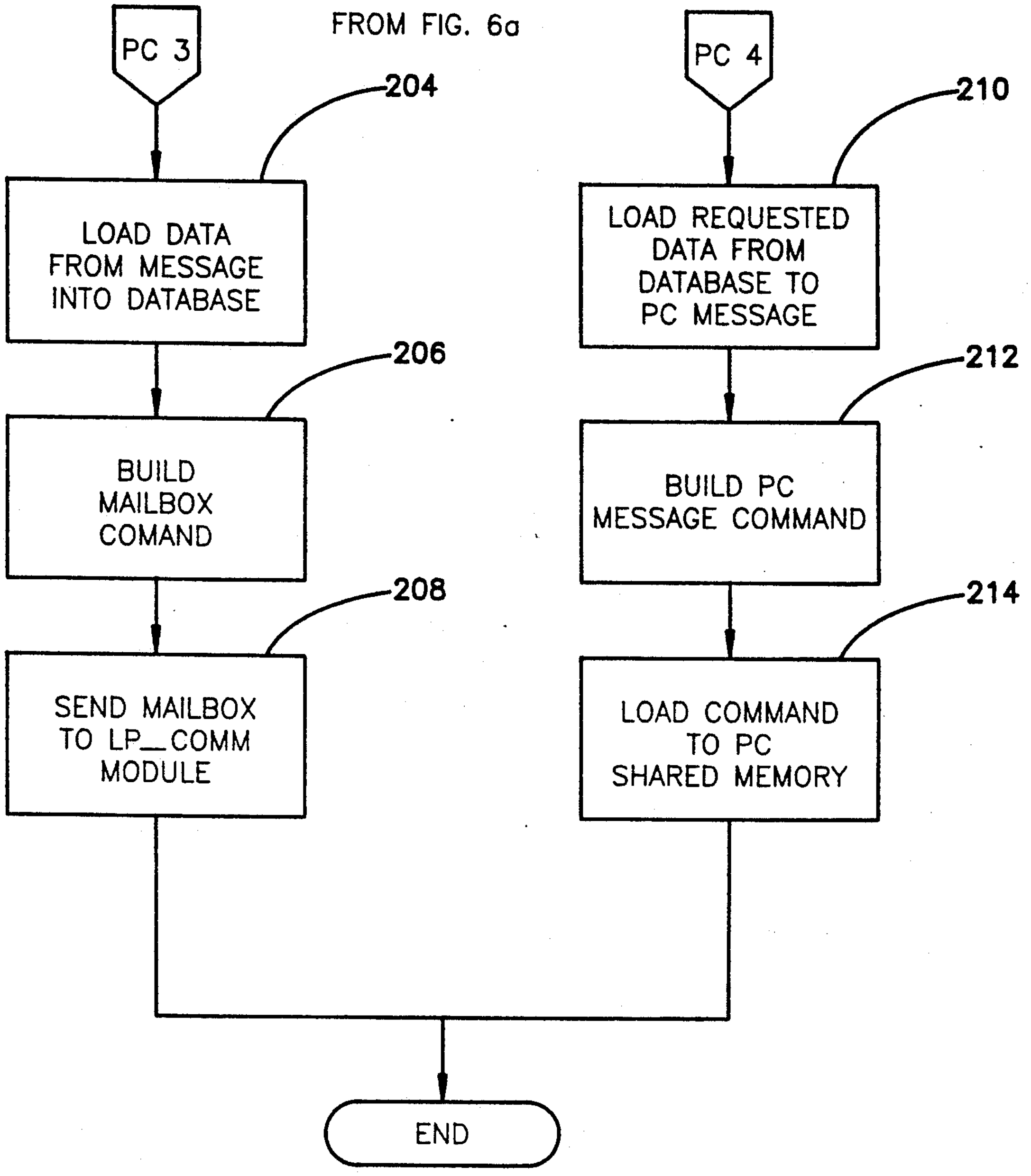

If one of PC commands #3, #12 or #5 is received, then the command message is loaded into the database at 204 (FIG. 6C). An appropriate mailbox command is built at 206 and transferred to the appropriate dispenser communication module 104 at 208. If one of commands #14, #6 or #15 is received, then the data requested in the command is transferred from the database at 210 and a PC message is constructed at 212 which is loaded to the shared memory at 214.

Because of the unique arrangement of the program 100, system priority is given to the PC bus. While this architecture could slow down the polling of the fuel pumps and responses received therefrom during periods of extensive updating, any detrimental effect is more than offset by the freedom of the interface unit from slowing down operation of the PC. In the PC-COMM module, all commands to the PC are loaded into the window memory and all internal commands are issued in the mailbox system. Once a command is issued to update data to the loop devices, the loop communication modules will handle the logic of verifying that all devices are updated and report back any problems by indicating a down device. Any data required to execute the PC commands is communicated through the database. Microprocessor U6 is not multi-tasking and interrupts can only fill or empty reserve buffers. Therefore, a reading or writing from the database will always complete its task before another process accessing the database can begin. If the PC requests a series of data elements, the system gets the data from the database without requesting the data from the loop communication modules. This avoids overloading of the loop controls and the PC is presented with valid data which is updated on a continual basis.

Figure 7A:
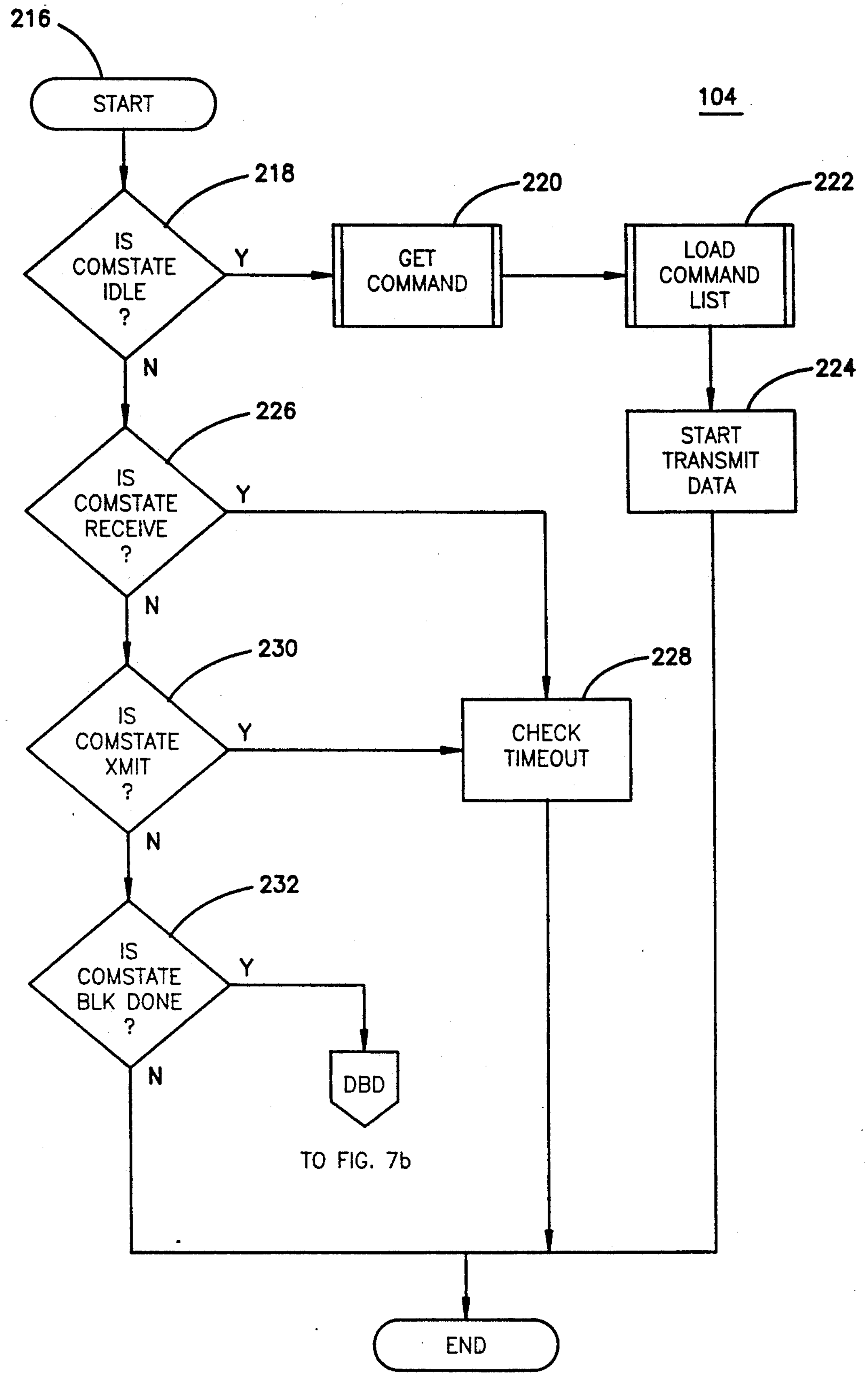
FIGS. 7A and 7B are program flow charts of a dispenser control module.

The dispenser control, or loop communication module (LP-COMM) 104 handles communications with the dispensers and, if provided, the card acceptor devices associated with a single UART (FIG. 7A). The LP-COMM module handles commands present in the associated mailbox or, if no commands are present, then a poll routine is called to keep the pump face and status data up to date in the database. Additionally, the card acceptors will be polled for service requests. When called at 216 the module examines the COMSTATE register at 218 to determine the status of the communication loop. If it is idle, then control passes to 220 where a command is obtained either from the mailbox system or the polling routine by the "get command" function and to 222 where the command is added to a command list used by the LP-COMM module to send to the fuel pump. Control then passes to 224 where the data is transmitted on the appropriate communications loop.

Figure 7B:
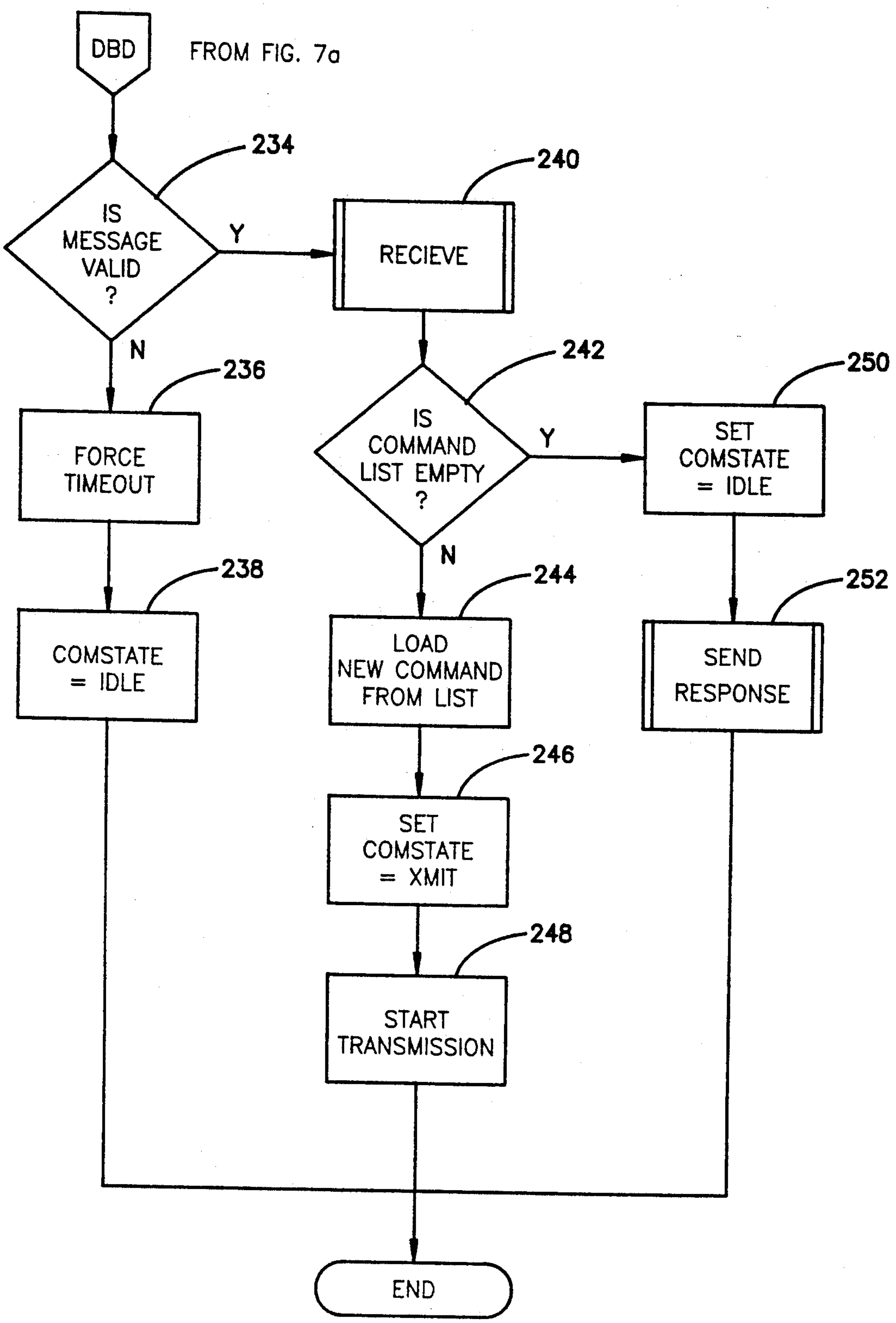

If it is determined at 218 that the particular loop is not idle, then the COMSTATE register is checked at 226 to determined whether the loop is in a receive mode. If it is, then the status of a time-out timer is checked at 228 to determine if it has timed out. If the loop is not in a received mode, then it is determined at 230 whether it is in a transmit mode. If so, then the time-out timer is again checked at 228 to determined if it has timed-out. If it is determined at 230 that the particular communication loop is not in a transmit state, then it is determined at 232 whether any receive buffer full condition has been cleared. If so, then it is determined at 234 whether the just received message is valid (FIG. 7B). If not, the time-out timer is set to a time-out state at 236 and the COMSTATE register for the communication loop is set to a idle state at 238. If the message received is determined at 234 to be valid, then control passes to a receive routine 240 for loading the dispenser receive buffer to the database. Control then passes to 242 where it is determined whether any commands remain to be executed. If so, then a new command is obtained from the list at 244 and the COMSTATE register is set to a transmit state at 246. The command is then transmitted to the fuel pump at 248. If the command list is empty at 242, then the COMSTATE register is set to idle at 250 and a response is sent to the appropriate module 102 at 252.

Figure 8:
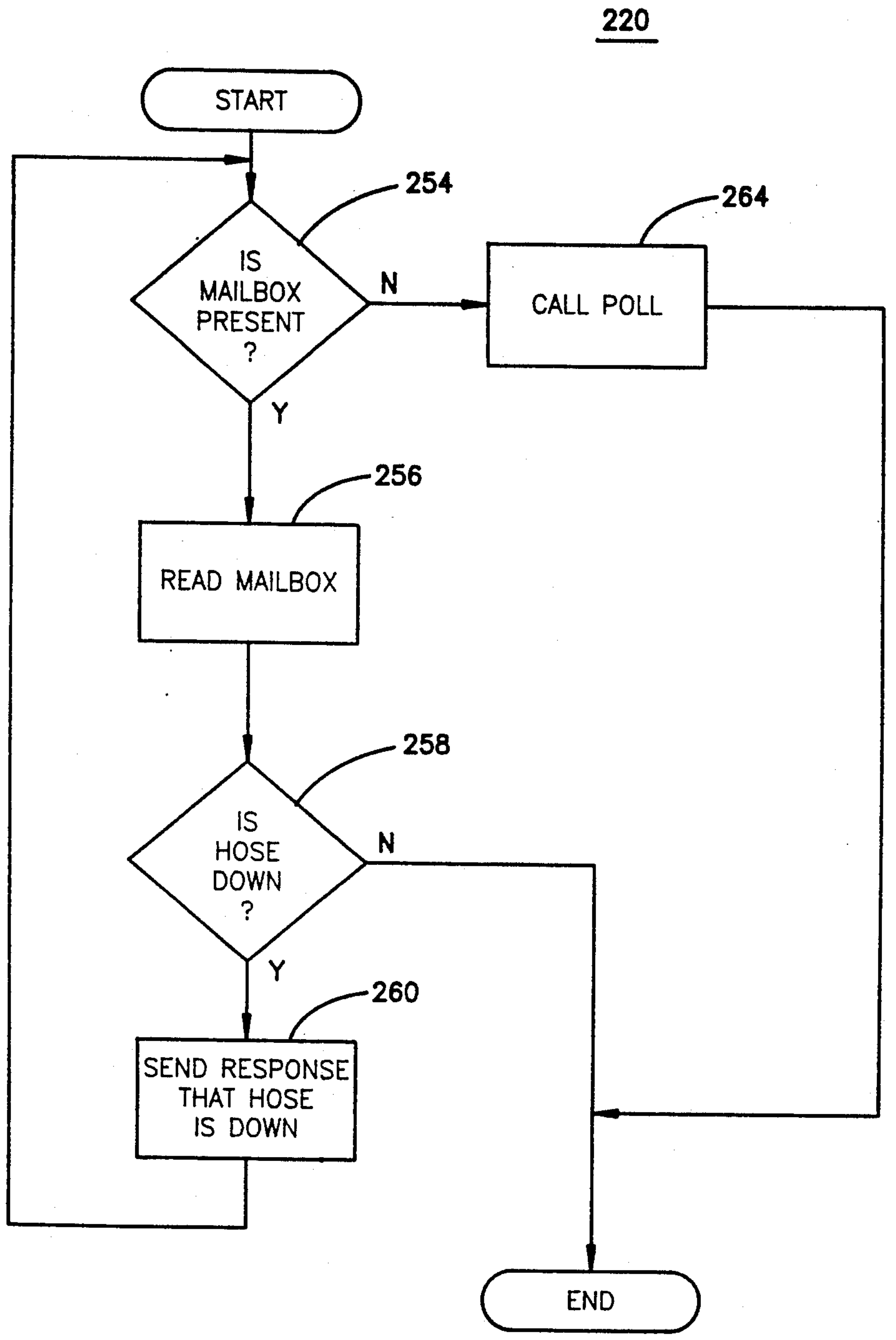
FIG. 8 is a program flow chart of a get command function.

The "get command" function 220 begins by determining whether incoming mail is present at 254 (FIG. 8). If so, the message is read at 256 and the status of the particular fuel dispenser is checked at 258 to determine if the fueling position is in the "down" state. If it is down, then a response is sent to the PC at 260 and control goes back to 254 to get another command. If it is determined at 254 that there is not incoming message, then control passes to 264 where the poll function is called to get a status request command or price set command for the next dispenser in the poll list.

Figure 9:
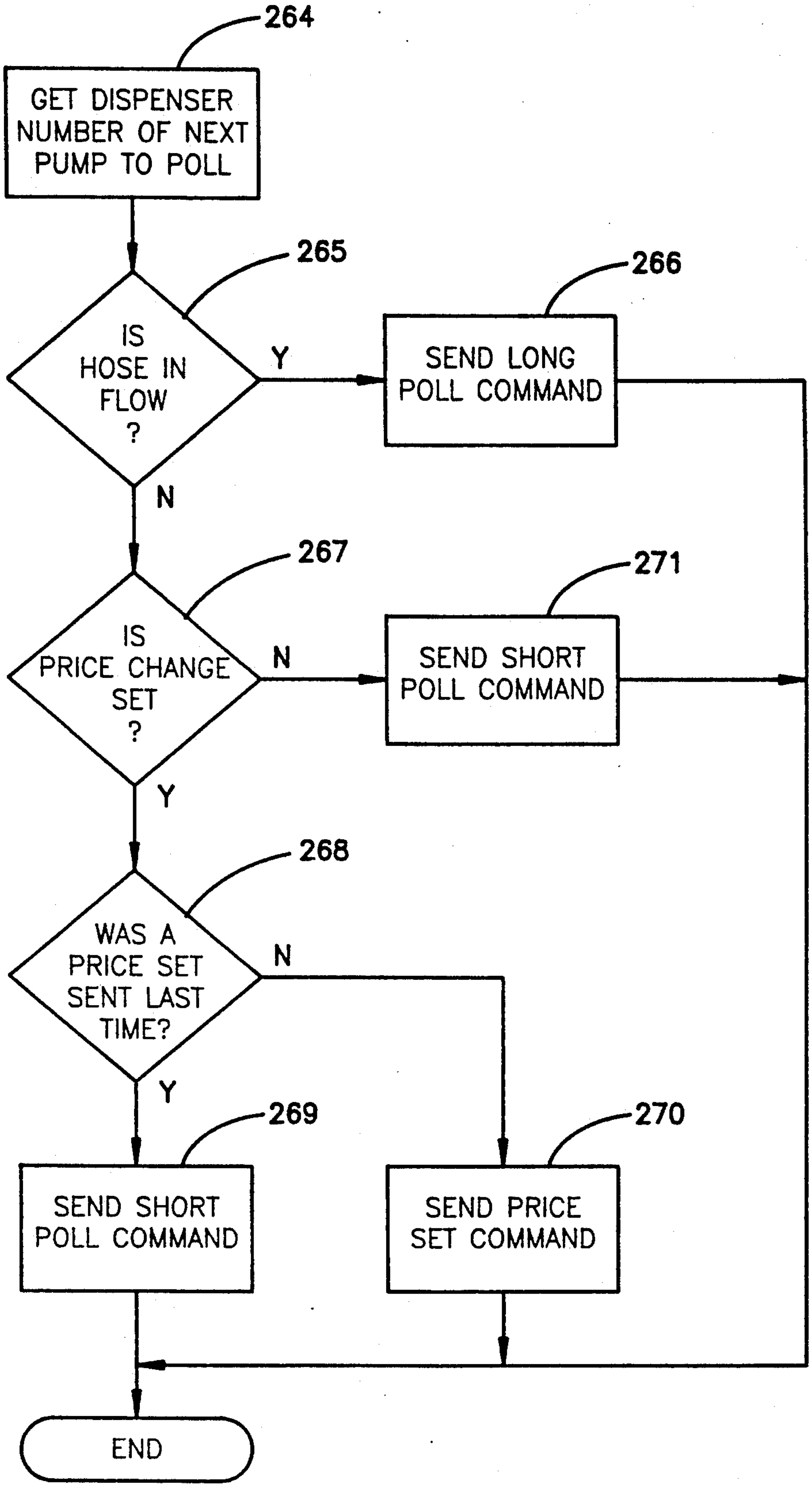
FIG. 9 is a program flow chart of a poll function.
Figure 10:
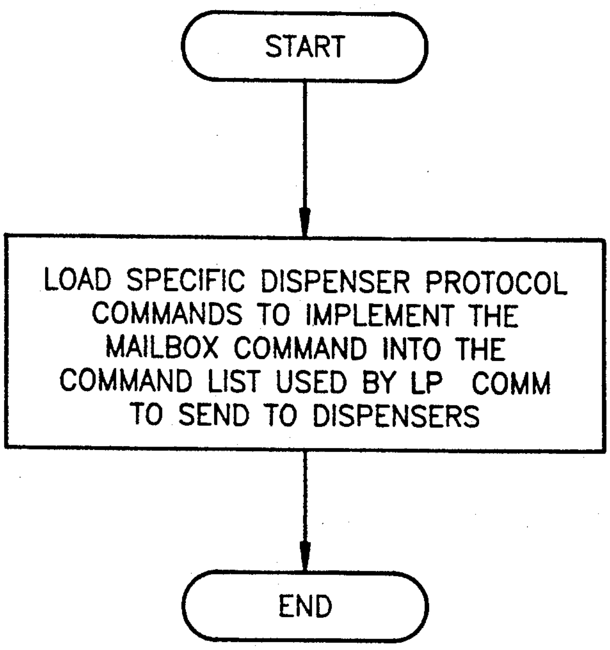
FIG. 10 is a program flow chart of a load command function.
Figure 11:
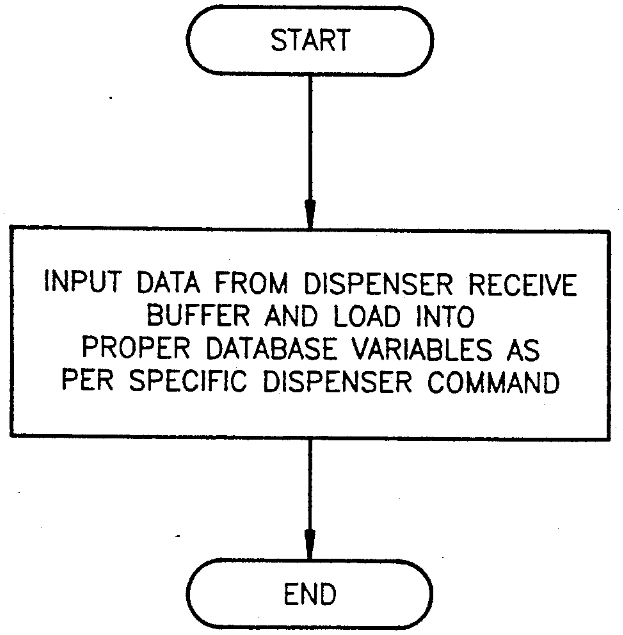
FIG. 11 is program flow chart of a message receive function.

The "poll function" is responsible for coordinating what command should be sent on a particular dispensers poll cycle (FIG. 9). The dispenser whose turn it is to be polled is determined at 264. The dispenser is checked at 265 to determine if the hose is in "flow" or not. If the dispenser is in flow, then control goes to 266 where a long poll command is selected to be sent to the dispenser. The long poll command requests status and pump-face information. If it is determined at 265 that the hose is not in flow, then control goes to 267, where the dispensers "price change" flag is checked. If it is set, then control goes to 268 to determine if a "price set" was sent during the dispensers last poll cycle. If it was, then control goes to 269 and a short status poll is sent. Otherwise, the control goes to 270 and a "price set" command is sent. If the "price change" flag is not set at 267 then control goes to 271 and a short status command is sent.

The LP-COMM module calls the "get command" function to initiate communication in response to commands in either the dispenser, or the card acceptor, mailbox. If there are no messages waiting then the "get command" function will call the "poll function" to get a status command.

Figure 13:
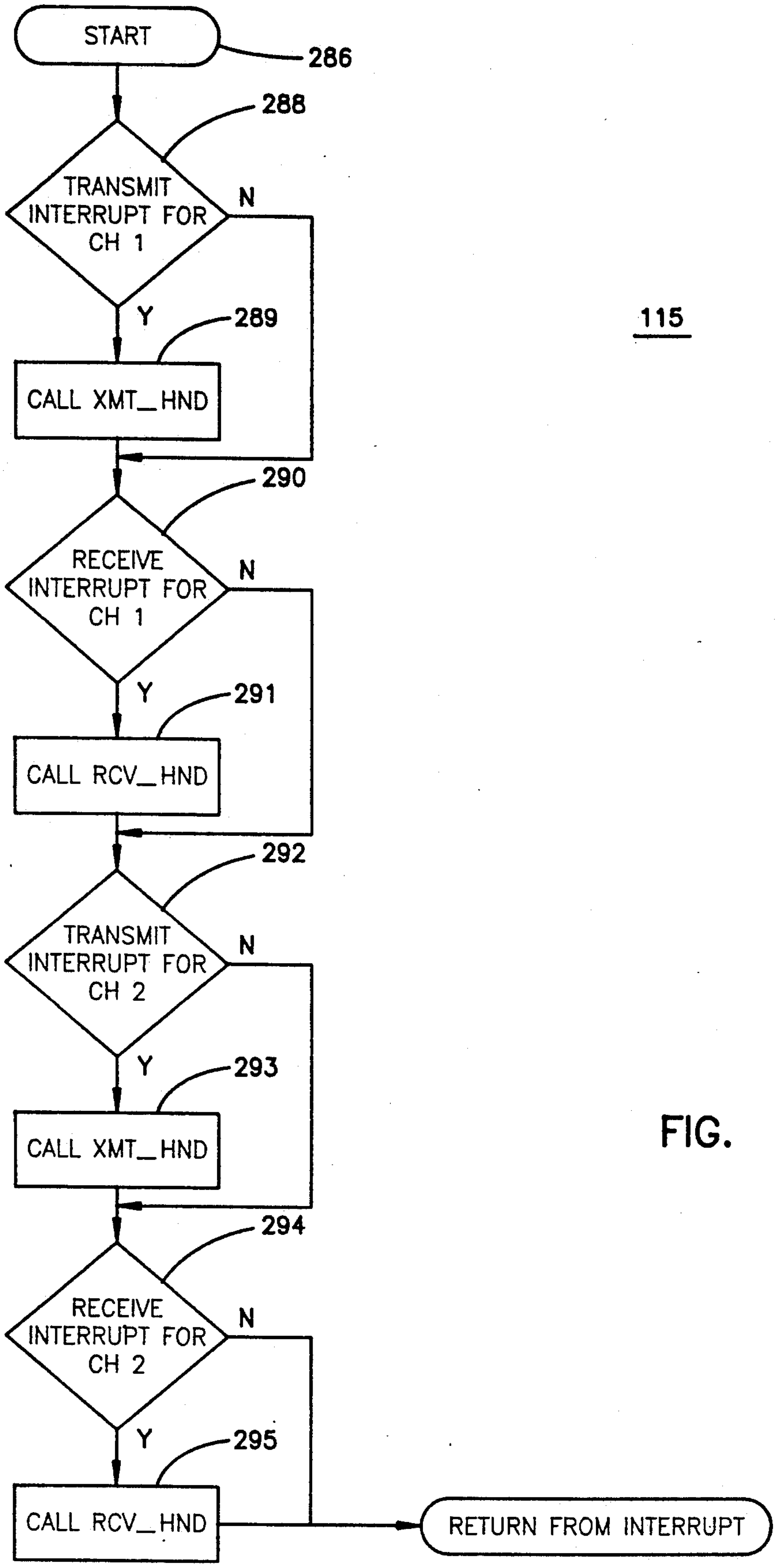
FIG. 13 is a program flow chart of a dispenser data input/output interrupt handler function.

The DIS-UTIL 115 module contains the actual interrupt service routines for responding to the DUART interrupts (FIG. 13). Each DUART has one interrupt and when it becomes active the program must poll the individual status registers to determine what handler to call. When the interrupt service routine is called at 286 the status register for channel 1 is checked at 288 to see if the transmitter has a character waiting. If a character is waiting, then control is transferred to 289, which calls the routine in the LP-COMM to handle the processing of the character to be read. Next the program control goes to 290 where the status register for channel 1 is checked to see if a received character needs to be processed. If one does, then control goes to 291 to call the receive handler. Next, program control goes to 292 where the status register for channel 2 is checked to see if the transmit buffer needs servicing. If it does then control goes to 293 to call the transmit handler routine. Next, control goes to 294 to check the status register of channel 2 to see if the receive handler needs to be called. If it does, control transfers to 295 where the receive handler routine is called.

Figure 14:
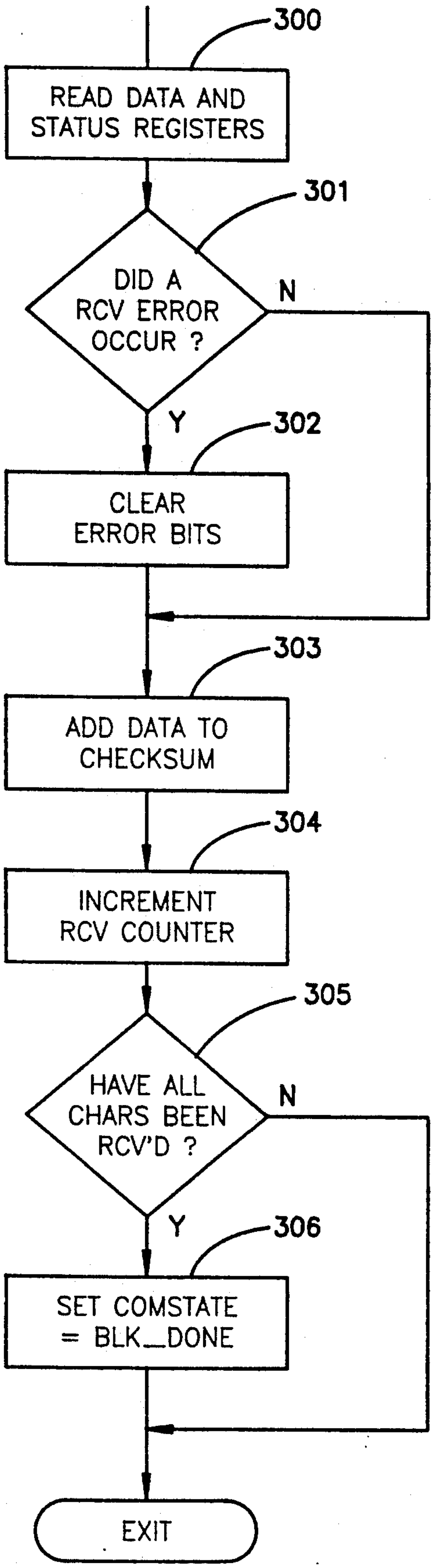
FIG. 14 is a program flow chart of a receive interrupt handler function.

The receive handler routine is entered at 300 (FIG. 14) and the data character and the associated error bits are read. If an error condition is discovered at 301 then control does to 302 before going to 303, otherwise control goes directly to 303. At 302 the error bits are cleared in the UART. The CHECKSUM is next updated at 303 on character by character basis. Next, control goes to 304 where the RCV counter is updated. At 305, the RCV counter is compared to the message length to see if a complete message has been received. If a complete message has been received then control goes to 306 where the COMSTATE register is set to BLK DONE.

Figure 15:
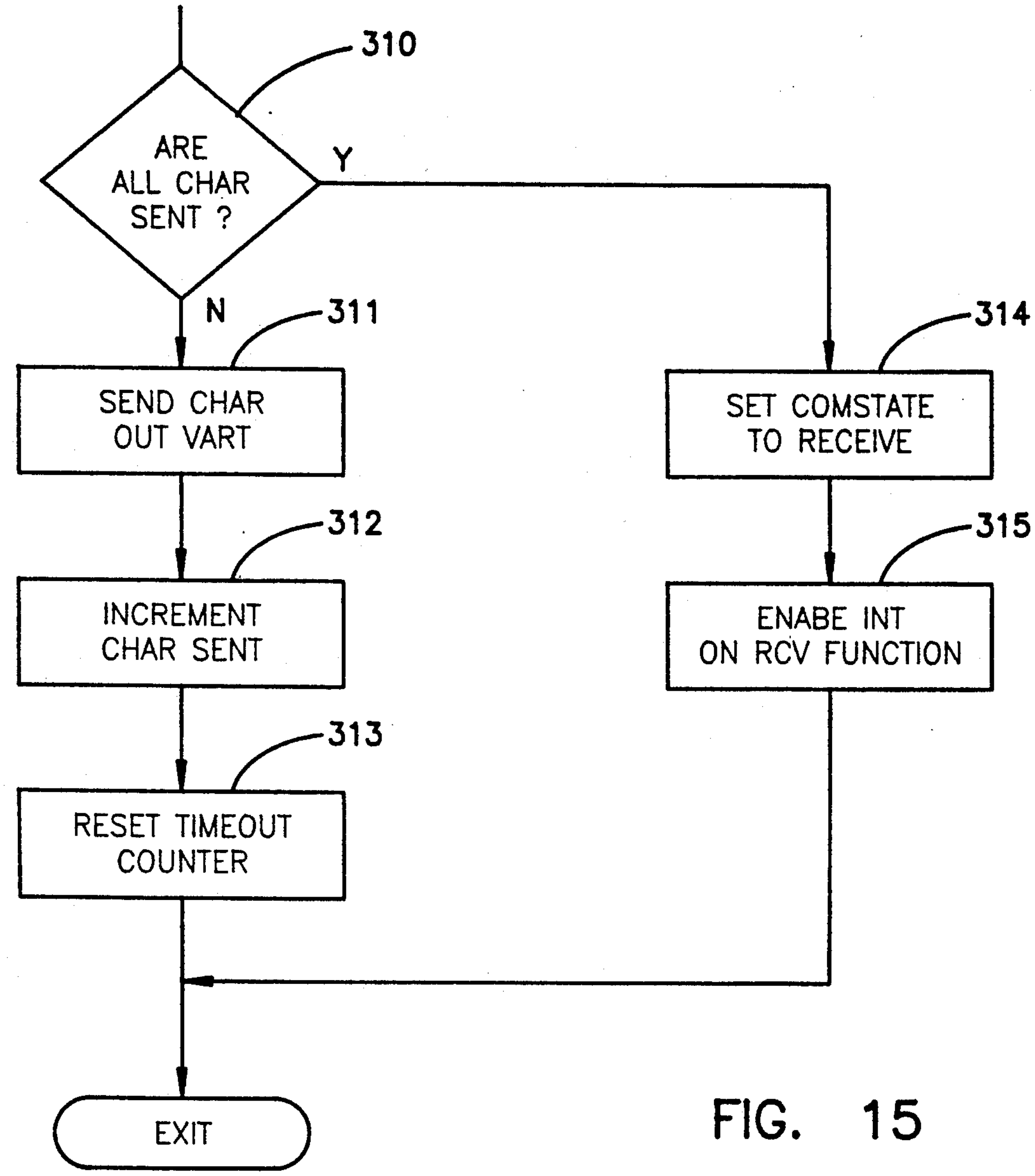
FIG. 15 is a program flow chart of a transmitt interrupt handler function.

The transmit handler is entered at 310 (FIG. 15). If a complete message has been received, then control transfers to 314 and 315, which change the COMSTATE to "receive" and enable the UART to interrupt on received characters, in order to reverse the direction of communication for the half duplex dispenser current loop. If it is determined at 310 that a complete message has not been received, control goes to 311 where the next character in the message string is sent out of the UART. At 312 the character counter is incremented and at 313 the time out counter is reloaded.

Figure 12:
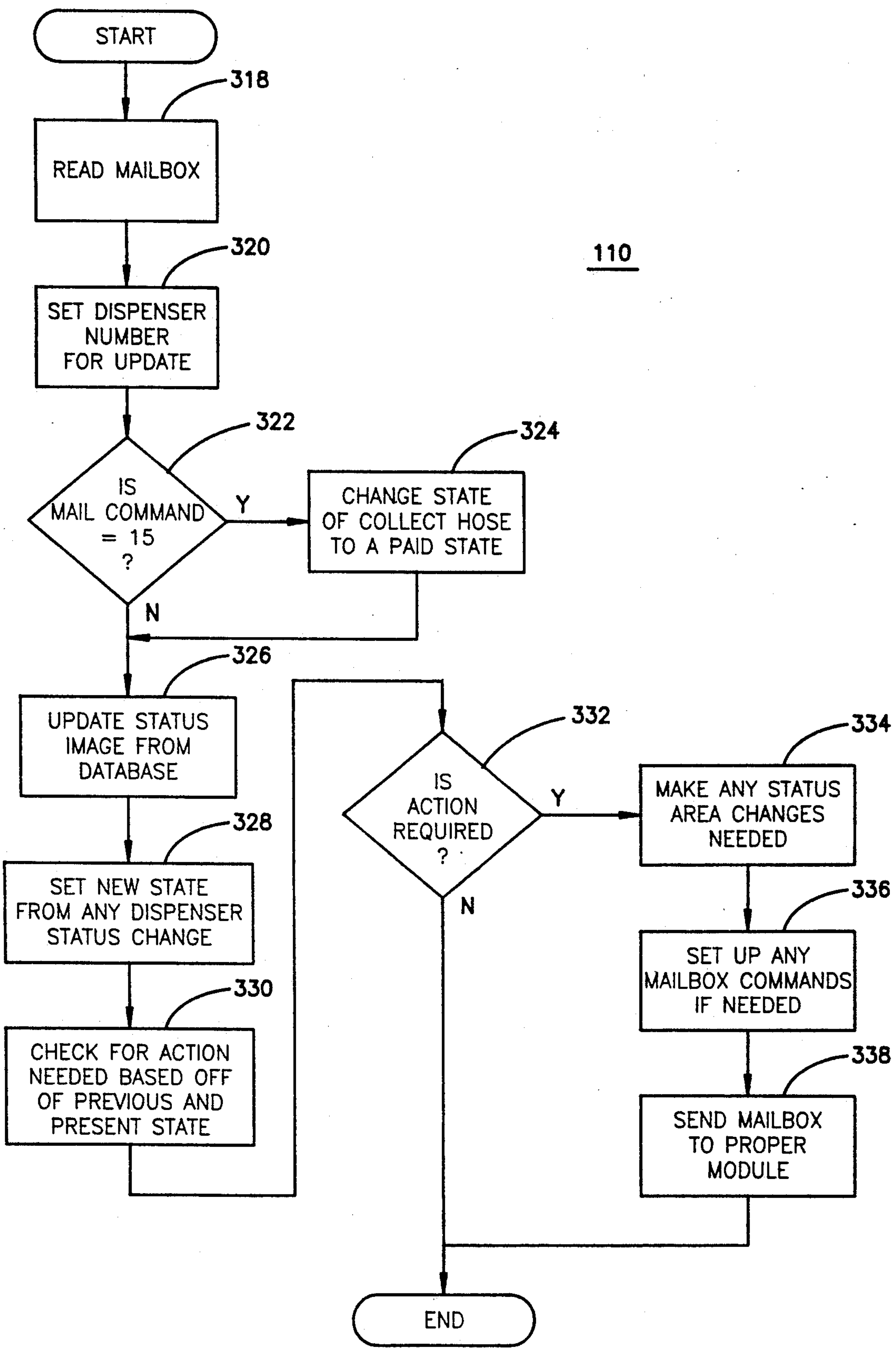
FIG. 12 is a program flow chart of a memory-image-status handler module.

The LP-STATUS module 110 is provided for the purpose of checking the status bytes of a loop device and determining if there has been any change (FIG. 12). If a change has occurred, the module will then decide what, if any, action is necessary. Separate status check modules are provided for the dispenser and any card acceptor device that is used. When the LP status module 110 is called, the mail-in box is read at 318 and the dispenser or card reader whose status is being checked is set at 320. Then it is determined at 322 whether the command received in the mailbox is command #15. If so, a change of state of the associated dispenser is requested and is carried out at 324. If not, then the status image in the internal memory is updated at 326 including any change of state from any dispenser at 328. The control then compares the previous and present states at 330 to determine whether action is required at 332. If action is determined to be required at 332 then any area status changes are carried out at 334 and any associated mailbox commands are constructed at 336. The mailbox commands are then sent to the proper software module at 338. Any necessary status changes are updated in the the image of the status memory stored in internal memory. This will allow the status update modules access to change the status at any time regardless of whether the internal bus or the PC bus has access to the shared memory. The internal memory status image is then copied to the shared memory status area, which resides in window memory 50, on a periodic basis.

Thus, it is seen that the present invention provides a direct interface for a fuel pump which is slot-compatible with a personal computer, PC bus. A microprocessor based controller included in the interface unit handles the exchange of information with the dispensing units and card acceptor units which make up a fuel pump. Data is exchanged with the PC through a window memory having a single port which is accessed by either a bus internal to the interface or the PC bus. Access to the window memory is controlled by the interface unit microprocessor which frees the PC of this supervisory responsibility to avoid slowing down other multitasking functions of the PC performed in the convenience store environment. Although the microprocessor determines which bus has control over the window memory, the personal computer has priority. A database of fuel pump information is kept up to date by the interface unit so that the commands by the personal computer will be fulfilled with accurate information. A listing of hardware and software interface specifications is set forth in APPENDIX C.

The invention provides a direct interface unit which is more adaptable to variations in PC bus format than dual-ported direct memory access interfaces. Furthermore, updates in program modules may be transferred through the memory window in a bucket-brigade fashion to allow system upgrades without the requirement for field modifications. In fact, no requirement exists for a field technician to access the hardware in order to implement upgrades. The direct interface uses power supplied by the PC bus and thus eliminates the cost and cabling required for separate interface power supplies.

Changes and modifications in the specifically described embodiments can be carried out without departing from the principles of the invention which is intended to be limited only by the scope of the appended claims, as interpreted according to the principles of patent law, including the Doctrine of Equivalents.

APPENDIX A

BEST AVAILABLE COPY

All equations contained in this document are in ORCAD PLD notation. Where.

// = rising edge clock
& = Boolean "and"
# = Boolean "or"
' = Boolean "not"
?? = Tri-State enable
~ or .. = Range delimiter

BEST AVAILABLE COPY

Data window base address decoding

INPUT 80 is used to select the data windows base address.

Equation 1:

```
WINCS = ((SA19 & SA18 & SA17' &      | Base = CC000H
        SA16' & SA15 & SA14 &
        SA13' & SEL0 &
        SEL1 & AEN') #
        (SA19 & SA18 & SA17' &       | Base = D0000H
        SA16 & SA15' & SA14' &
        SA13' & SEL0' &
        SEL1 & AEN') #

        (SA19 & SA18 & SA17' &       | Base = DE000H
        SA16 & SA15 & SA14 &
        SA13 & SEL0 &
        SEL1' & AEN'))'
```

Control port base address decoding

INPUT 82 is used to select the control ports base address.

Equation 2:

```
CONCS =  ((SA9 & SA8' & SA7 & SA6' & SA5 &     | Base = 2B0H
         SA4 & SA3' & SA2' & SA1' & SA0' &
         SEL0 & SEL1) #

         (SA9 & SA8 & SA7' & SA6 & SA5 &       | Base = 360H
         SA4' & SA3' & SA2' & SA1' & SA0' &
         SEL0' & SEL1) #

         (SA9 & SA8 & SA7 & SA6' & SA5' &      | Base = 390H
         SA4 & SA3' & SA2' & SA1' & SA0' &
         SEL0 & SEL1') #

         (SA9 & SA8 & SA7 & SA6 & SA5' &       | Base = 3C0H
         SA4' & SA3' & SA2' & SA1' & SA0' &
         SEL0' & SEL1') #

         (SA9 & SA8' & SA7 & SA6' & SA5 &      | Base=2B0H+2
         SA4 & SA3' & SA2' & SA1 & SA0' &
         SEL0 & SEL1) #

         (SA9 & SA8 & SA7' & SA6 & SA5 &       | Base=360H+2
         SA4' & SA3' & SA2' & SA1 & SA0' &
         SEL0' & SEL1) #
```

BEST AVAILABLE COPY

```
        (SA9 & SA8 & SA7 & SA6' & SA5' &          | Base=390H+2
        SA4 & SA3' & SA2' & SA1 & SA0' &
        SEL0 & SEL1') #

        (SA9 & SA8 & SA7 & SA6 & SA5'             | Base=3C0H+2
        SA4' & SA3' & SA2' & SA1 & SA0' &
        SEL0' & SEL1'))'

CON2CS = ((SA9 & SA8' & SA7 & SA6' & SA5 &        | Base=2B0H+2
        SA4 & SA3' & SA2' & SA1 & SA0' &
        SEL0 & SEL1) #

        (SA9 & SA8 & SA7' & SA6 & SA5 &           | Base=360H+2
        SA4' & SA3' & SA2' & SA1 & SA0' &
        SEL0' & SEL1) #

        (SA9 & SA8 & SA7 & SA6' & SA5' &          | Base=390H+2
        SA4 & SA3' & SA2' & SA1 & SA0' &
        SEL0 & SEL1') #

        (SA9 & SA8 & SA7 & SA6 & SA5' &           | Base=3C0H+2
        SA4' & SA3' & SA2' & SA1 & SA0' &
        SEL0' & SEL1'))'

SETNMICS = ((SA9 & SA8' & SA7 & SA6' & SA5 &      | Base=2B0H+5
        SA4 & SA3' & SA2 & SA1' & SA0 &
        SEL0 & SEL1) #

        (SA9 & SA8 & SA7' & SA6 & SA5 &           | Base=360H+5
        SA4' & SA3' & SA2 & SA1' & SA0 &
        SEL0' & SEL1) #

        (SA9 & SA8 & SA7 & SA6' & SA5' &          | Base=390H+5
        SA4 & SA3' & SA2 & SA1' & SA0 &
        SEL0 & SEL1') #

        (SA9 & SA8 & SA7 & SA6 & SA5' &           | Base=3C0H+5
        SA4' & SA3' & SA2 & SA1' & SA0 &
        SEL0' & SEL1'))'

CLKNMICS = ((SA9 & SA8' & SA7 & SA6' & SA5 &      | Base=2B0H+A
        SA4 & SA3 & SA2' & SA1 & SA0' &
        SEL0 & SEL1) #

        (SA9 & SA8 & SA7' & SA6 & SA5 &           | Base=360H+A
        SA4' & SA3 & SA2' & SA1 & SA0' &
        SEL0' & SEL1) #

        (SA9 & SA8 & SA7 & SA6' & SA5' &          | Base=390H+A
        SA4 & SA3 & SA2' & SA1 & SA0' &
        SEL0 & SEL1') #

        (SA9 & SA8 & SA7 & SA6 & SA5' &           | Base=3C0H+A
        SA4' & SA3 & SA2' & SA1 & SA0' &
        SEL0' & SEL1'))'
```

BEST AVAILABLE COPY

```
BASECS = ((SA9 & SA8' & SA7 & SA6' & SA5 &      | Base = 28XH
          SA4 &
          SEL0 & SEL1) #

          (SA9 & SA8 & SA7' & SA6 & SA5 &       | Base = 36XH
          SA4' &
          SEL0' & SEL1) #

          (SA9 & SA8 & SA7 & SA6' & SA5' &      | Base = 39XH
          SA4 &
          SEL0 & SEL1') #

          (SA9 & SA8 & SA7 & SA6 & SA5' &       | Base = 3CXH
          SA4' &
          SEL0' & SEL1'))'

GARBCS = (BASECS' & SETNMICS & CLKNMICS)'
```

CONCS: CONCS is the chip select that becomes valid when the control port is read or written at the actual base address (base address + 0h offset). This is a straight control port read or write without any interrupts being issued to the dispenser interface board.

CON2CS: CON2CS becomes valid when the control port is accessed at the base address + 02h offset. This CS is used to interrupt the dispenser interface board when an interrupt is required during a control port write from the PC. CONCS also becomes valid at this offset.

SETNMICS: SETNMICS becomes valid at the control port base address + 05h offset. This CS is used to set the NMISET bit in the NMI logic during an NMI sequence.

CLKNMICS: CLKNMICS becomes valid at the control port base address + 0Ah offset. This CS is used to clock the NMISET bit through to the microprocessor during an NMI sequence.

GARBCS: GARBCS becomes valid at any invalid base address offset (i.e. base addresses other than base, base + 02h, base + 05h, and base + 0Ah). This CS is used to clear the NMI logic during any invalid NMI write sequence.

<u>Interrupt generation</u>

INTOUT: PCINTOUT is generated by the setting of a set/reset flip-flop with the PCINT signal output from DUART U11 output bit OP6. This flip-flop is reset when the PC reads the control port at the base address + 02h offset or a system reset occurs. Equation 3 shows this flip-flop equation.

Equation 3:

```
PCINTOUT = (PCINT' # (PCINTOUT' & ((CON2CS' & IORD' & AEN') #
           RESET)'))'
```

PCINTOUT is further buffered by U44A (7406, open collector) and supplied to shunt header JP10. This shunt header allows the selection of PC interrupt IRQ3, IRQ5, and IRQ7 (8 bit bus connector pins 25, 23, and 21 respectively). See appendix B for PC interrupt selection.

IFINT: IFINT is also generated by the setting of a set/reset flip-flop with the writing of the control port at base address + 02h offset. This flip-flop is reset when the dispenser interface board performs a dummy read at peripheral chip select 5 (PCS5) or a system reset occurs. Equation 14 shows this flip-flop equation.

Equation 4:

IFINT = (CON2CS' & IOWR' & AEN') # (IFINT & ((IFIORD' & PCS5') # RESET)')

IFINT is supplied to the microprocessors INT2 interrupt input (U6 pin 42).

NMI: NMI is generated when the PC writes at a sequence of control port base addresses. This sequence is a write at base + 05h offset followed by a write at ~~write~~ at base + 0Ah offset. Any other control port writes that do not follow this sequence will reset the NMI sequence (with the exception of a sequence of base + 0Ah offsets being written out). This interrupt is generated by the clocking of a one bit counter. When the NMISET and RSTNMI bits are false this counter will clock NMI true with a CLKNMI pulse. These three signals are generated in PLD 76 and will be explained after equation 15. Equation 5 shows the generation NMI with this one bit counter.

Equation 5:

i=0: n=0~1: NMI[i] = CLKNMI // (RSTNMI # NMISET' # RESET)' & NMI[i]==n & (n+1) [i]

PLD 76generate the NMI interrupt signals that control the NMI one bit counter contained in . NMI is supplied to the microprocessors NMI interrupt input (U6 pin 46).

NMISET: NMISET is generated by a set/reset flip-flop. This flip-flop is set by the SETNMI signal which is also generated in this PLD SETNMI goes true during a write at the control port base + 05h offset. This flip-flop is reset by the RSTNMI signal which is also generated in this PLD RSTNMI goes true any time any valid or non valid control port base address is read or written at the control port other than control port base address +0Ah offset.
Equations 6a, 6b, and 6c show the generation of the above signals.

BEST AVAILABLE COPY

Equation 6a:

NMISET = SETNMI # (NMISET & (RSTNMI' & RESET'))

Equation 6b:

SETNMI = SETNMICS' & IOWR' & AEN'

Equation 6c:

RSTNMI = (CONCS' # GARBCS') & AEN' & (IORD' # IOWR')

Ready/wait state logic

Ready/wait state generation is initiated in PLD 76 Any time the PC accesses the data window or the PC and dispenser interface board have simultaneous accesses to the control port the PC must be slowed down to accommodate the data window access time or must be held off to prevent simultaneous accesses of the control port.

RDYCS: RDYCS goes true any time the PC accesses the control port with a read or write. Equation 7 generates this RDYCS. This equation "ands" PC I/O reads and writes, control port chip enables, and address enables to produce this RDYCS signal.

Equation 7:

RDYCS = ((IORD' & CONCS' & AEN') # (IOWR' & CONCS' & AEN') # (IORD' & CON2CS' & AEN') # (IOWR' & CON2CS' & AEN'))'

WAITCS: WAITCS goes true any time the PC accesses the data window with a read or write. Equation 8 generates this RDYCS. This equation "ands" PC memory reads and writes, data window chip selects, and address enable to produce this WAITCS signal.

Equation 8:

WAITCS = ((MEMRD' & AEN' & WINCS') # (MEMWR' & AEN' & WINCS'))'

The remainder of the ready/wait state generation is performed in PAL PL2.

IFRDY: IFRDY is the ready output supplied to the 80C188 microprocessor. This signal is input on the microprocessors (U6) asynchronous ready pin (ARDY, pin 55).

Equation 9 is the IFRDY set/reset flip-flop equation. IFRDY is set not ready by the RDYCS signal supplied by PLD 60 and the IFCONCS signal supplied by PLD 60 This flip flop will only be set with simultaneous RDYCS and IFCONCS signals. Signal IFRST resets this flip-flop ready again.

Equation .9:

```
IFRDY = ((RDYCS' & IFCONCS' & PCRDY') #
        (IFRDY' & (IFRST1 # RESET)'))'
```

IFRST: IFRST is generated by the two bit counter, equation 20, contained in PLD 60 This counter is reset at the same time the IFRDY flip-flop is set. After 2 to 4 IFCLK cycles (100nS each) this counter will overflow and reset the IFRDY flip-flop back to the ready condition. Equation 9 describes this counter equation.

Equation |0:

```
i=1~0: n=0~3: IFRST[i] = IFCLK // (((RDYCS' & IFRDY &
IFRST0) # (RDYCS' & IFRDY & IFRST1)) # RESET)' &
IFRST[1~0]==n & (n+1) [i]
```

PCRDY: PCRDY is the signal used to generate a not ready condition at the PC any time the PC and dispenser interface have a simultaneous access to the control port. Signals RDYCS and IFCONCS must happen simultaneously to set this flip-flop not ready. Signal PCRST will reset this flip-flop ready again. Equation |1 is the set/reset flip-flop equation that generates this signal.

Equation |1:

```
PCRDY = (IFCONCS' & RDYCS' & IFRDY) #
        (PCRDY & (PCRST1 # RESET)')
```

PCRST: PCRST is generated by the two bit counter, equation |2, contained in PAL PL2. This counter is reset at the same time the PCRDY flip-flop is set. After 2 to 4 IFCLK cycles (100nS each) this counter will overflow and reset the PCRDY flip-flop back to the ready condition. Equation 21 describes this counter equation.

Equation |2:

```
i=1~0: n=0~3: PCRST[i] = IFCLK // (((IFCONCS' & PCRDY' &
PCRST0) # (IFCONCS' & PCRDY' & PCRST1)) # RESET)' &
PCRST[1~0]==n & (n+1) [i]
```

PCWAIT: PCWAIT is the signal used to generate a not ready condition any time the PC accesses the data window. PCWAIT is generated by a set/reset flip-flop. This flip-flop is set not ready by the WAITCS signal generated in PAL PL4 and is reset ready again by the WAITRST signal. Equation /3 describes this PCWAIT flip-flop.

Equation /3:

```
PCWAIT = (WAITCS' & RESDIS) # (PCWAIT & (WAITRST1 #
        RESET)')
```

WAITCS: WAITCS goes true any time the PC makes a read or write access to the data window. Equation 4 describes the generation of this signal. WAITCS is produced by "anding" the PC memory reads and writes, data window chip select, and PC address enable.

Equation #4:

```
WAITCS = ((MEMRD' & AEN' & WINCS') # (MEMWR' & AEN' &
          WINCS'))'
```

WAITRST: WAITRST is generated by the two bit counter, equation #5, contained in PLD 60. This counter is reset at the same time the PCWAIT flip-flop is set. After 2 to 4 IFCLK cycles (100nS each) this counter will overflow and reset the PCWAIT flip-flop back to the ready condition. Equation #4 describes this counter equation.

Equation #5:

```
i=1~0: n=0~3: WAITRST[i] = IFCLK // ((WAITCS' & RESDIS) #
RESET)' & WAITRST[1~0]==n & (n+1) [i]
```

APPENDIX B

```
/*********************************************************************
mailbox_cmd.header
!paths!
Pump Interface Board\Modules\PC_COMM\Functions\mailbox_cmd
!1!
=====================================================================
Title : mailbox_cmd                                Author : CLH
Module : !./MDL!
Creation Date   : 04/25/90
Last Update Date : !./FDT!              Last Scan Date   ./DT!
Last Update Time : !./FTM!                Last Scan Time : !./TM!

Description :

 This function handles the processing of the system mailbox
 commands. A pointer to a structure containing the mailbox is
 passed and the command is decoded through a switch statement.

Data

   Variable                Type   Description

Input :

   Pointer to pc_comm input mailbox of type sys_command

Output :

 Database update items as shown in system command descriptions
```

```
Calls :
   PROCEDURE NAMES GO  HERE
```
BEST AVAILABLE COPY

```
Revisions :
    Date     Initials    Description
  XX/XX/XX     XXX       DESCRIPTION OF CHANGE GOES HERE

****************************************************************
/* !0! */


mailbox_cmd  pseudo

  switch on input mailbox command number
   case 00:  Break
   case 01:  break
     ((O_CMD01_PTR)buf_ptr)->cmd = 1
     ((O_CMD01_PTR)buf_ptr)->sequence_num = mail_ptr->seq_num
     ((O_CMD01_PTR)buf_ptr)->ret_stat = mail_ptr->error
     ((O_CMD01_PTR)buf_ptr)->length = 2
     ((O_CMD01_PTR)buf_ptr)->dis = dis_num

    set acknopwledge to ack for defualt
    if ( mail_ptr->error != 0 )
         ((O_CMD01_PTR)buf_ptr)->ack_nak =  NAK;
    switch on current status
        case 2: arm case 4: ready  case 5:flow
             break;   these cases are ok, dont set nak
        default :     any other status is a NAK
           set pc_out_message.ack_nak =  NAK;
    }
    if hose sale is prpay do more checks

      switch ( sale pricelevel ) {
        case 1:  credit
          if (lp_stat_i[dis_num].op_status.price_tier != 2)
            set pc_output_message.ack_nak = NAK
          break;
        case 2:  cash
          if (lp_stat_i[dis_num].op_status.price_tier != 0)
            set pc_output_message.ack_nak =  NAK
          break;
        case 3:  debit
          if (lp_stat_i[dis_num].op_status.price_tier != 3)
             set pc_output_message.ack_nak =  NAK
          break;
        default :
             set pc_output_message.ack_nak =  NAK

    force status memory update

    pc_cmd_pend = pc_mess_out
    break

   case 02:  break
   case 03:  break
```

BEST AVAILABLE COPY

```
case 04:  {   prepay amount request response }
          set pc_output_mess.cmd = 4
          set pc_output_mess.sequence_num = sys_command.seq_num
          set pc_output_mess.len = 3
          set pc_output_mess.dis = sys_command.loop_num
          set pc_output_mess.pr_mon = hose[x].prepay_amount
          pc_cmd_pend = pc_mess_out

case 05:  break

case 06:  {   allocation limit request response }
          set pc_output_mess.cmd = 6
          set pc_output_mess.sequence_num = sys_command.seq_num
          set pc_output_mess.len = 3
          set pc_output_mess.dis = sys_command.loop_num
          set pc_output_mess.alloc = hose[x]. alloc_limit
          pc_cmd_pend = pc_mess_out

case 07:  break
case 08:  break

case 09:  {   Dispenser PPV request response }
          set hose_ppv_ptr to start of hose[dis].ppv structure
          set pc_output_mess.cmd = 09
          set pc_output_mess.sequence_num = sys_command.seq_num
          set pc_output_mess.len = number of hoses * # of tiers
                                 * number of bytes per price
          set pc_output_mess.dis = sys_command.loop_num
          for 1 to number of hoses at dispensers
             output_buf++.level = credit
             output_buf++.grade = grade of hose number
             output_buf++.ppv   = data at hose_ppv_ptr ++
         end for
         set hose_ppv_ptr to start of hose[dis].ppv cash prices
         in structure
         for 1 to number of hoses at dispenser
             output_buf++.level = cash
             output_buf++.grade = grade of hose number
             output_buf++.ppv   = data at hose_ppv_ptr ++
          end for
          pc_cmd_pend = pc_mess_out

case 10:  {   Dispenser diagnostic code request response }
          set pc_output_mess.cmd = 10
          set pc_output_mess.sequence_num = sys_command.seq_num
          set pc_output_mess.dis = sys_command.loop_num
          set pc_output_mess.rev_l = hose[x].rev_level
          if hose is not MP II then
           set pc_output_mess.len = 5
           set pc_output_mess.diag_code = hose[x].diag_code[1]
          else
           set pc_output_mess.len = 14
           for i = 1 to 10
            set pc_output_mess.diag_code = hose[x].diag_code[i]
          end if then else

          pc_cmd_pend = pc_mess_out
```

```
case 11 :  {  acknowledge of hose paid }
          set pc_output_mess.cmd = 11
          set pc_output_mess.sequence_num = sys_command.seq_num
          set pc_output_mess.len = 1
          set pc_output_mess.error = sys_command.errir
          set pc_output_mess.dis = sys_command.loop_num
          pc_cmd_pend = pc_mess_out

case 16  :  { acknowledge prepayment of dispenser }
    set pc_output_mess.ack_nak  = ACK

    if ( mail_ptr->error != 0 )
         set pc_output_mess.ack_nak  = NAK
   switch on sale price level of dispenser
       case 1:
         if (lp_stat_i[dis_num].op_status.price_tier != 2)
           set pc_output_mess.ack_nak  = NAK
         break;
       case 2:
         if (lp_stat_i[dis_num].op_status.price_tier != 0)
            set pc_output_mess.ack_nak  = NAK
         break;
       case 3:
         if (lp_stat_i[dis_num].op_status.price_tier != 3)
            set pc_output_mess.ack_nak  = NAK
         break;
       default :
            set pc_output_mess.ack_nak  = NAK
   } end switch
 if  set pc_output_mess.ack_nak  = NAK
     set pc_output_mess.cmd = 1
     set pc_output_mess.sequence_num = mail_ptr.seq_num
     set pc_output_mess.ret_stat = mail_ptr.error
     set pc_output_mess.length = 2
     set pc_output_mess.dis = dis_num
     force status memory update
     pc_cmd_pend = pc_mess_out
   }
   else{
     write_mail.sys_cmd = 1 to   Arm dispenser
     write_mail.loop_num = dis_num;
     write_mail.seq_num = mail_ptr.seq_num;
     dis_mail_out(write_mail,1,dis_num,mail_ptr->seq_num);
   }
   break;

 case 18:

 case 19:  {   Set up fueling position for mixing }
          set pc_output_mess.cmd = 19
          set pc_output_mess.sequence_num = sys_command.seq_num
          set pc_output_mess.len = 1
          put ack or nak into pc_output_mess.data
          pc_cmd_pend = pc_mess_out
```

```
case 21:  {  request for site set up information to PC}
          set pc_output_mess.cmd = 21
          set pc_output_mess.sequence_num = 0;
          set pc_output_mess.len = 0
          pc_cmd_pend = pc_mess_out


case 22:  {  request for date and time update from PC }
          set pc_output_mess.cmd = 22
          set pc_output_mess.sequence_num = 0
          set pc_output_mess.len = 0
          pc_cmd_pend = pc_mess_out

case 23:  {  acknowledge of diag counters reset }
          set pc_output_mess.cmd = 23
          set pc_output_mess.sequence_num = sys_command.seq_num
          set pc_output_mess.len = 0
          pc_cmd_pend = pc_mess_out

case 24:  {   send diagnostic counters rewponse from diag }
          set pc_output_mess.cmd = 24
          set pc_output_mess.sequence_num = sys_command.seq_num
          set pc_output_mess.len = ?
          set dispneser diagnostics structure in output message
          set mailbox_ow structure to box.ow_count of each
          mailbox
          pc_cmd_pend = pc_mess_out

case 50:  {   send memory zeroed message to PC }
          set pc_output_mess.cmd = 50
          set pc_output_mess.sequence_num = 0
          set pc_output_mess.len = 0
          pc_cmd_pend = pc_mess_out
```

<u>APPENDIX C</u>

HARDWARE INTERFACE SPECIFICATIONS

INTRODUCTION

This document will explain the hardware / software interface between the Bennett dispenser communication board and the PC AT bus. The information of memory addressing, I/O addressing, and interrupt level will be detailed for hardware interfacing. The memory information and I/O port definitions will be described to explain the interface methodology. The Bennett board will plug into a 8 bit socket of any PC or AT compatible mother board.

1.0 HARDWARE

The Bennett board is a embedded 80188 design with its own internal bus isolated from the PC bus. The board will have a

BEST AVAILABLE COPY memory window that will be multiplexed between the 80188 bus and the PC bus. An application program running on the 80188 will collect data for all dispenser and credit card acceptors hooked up to a proprietary current loop interface.

1.1 MEMORY

There will be a 8K x 8 window of memory for shared access between the Bennett 80188 CPU bus and the AT bus. The memory used for this window will be a static RAM with ready logic to control bus access time. The bus selection of the RAM will be controlled by the Bennett board. The PC will always have to receive a memory grant interrupt before using the memory. Wait states will be inserted to the AT bus to account for any problems with access time. The parity error system normally used for the PC board dynamic memory will not be used by the Bennett board. No connection will be made to the AT bus IOCHCK line. The memory will be logically divided into 3 parts, two 3.5K buffers for command and data input / output, and a 1K section for dispenser / DCA status. This will be detailed in the "Interface Operation" section 2.0.

SELECTION OPTIONS FOR MEMORY BASE ADDRESS

| PC ADDRESS | JUMPER | POSITION |
|---|---|---|
| C8000h | JP - 12 | both shunts in |
| CC000h | JP - 12 | no shunts |
| D0000h | JP - 12 | left shunt in |
| DD000h | JP - 12 | right shunt in |

MEMORY MAP:

The memory will use 8K of space at:

PC address base = 0 --> PC address base + 2000H 1.2 I/O PORT HARDWARE DESCRIPTION There will be a 8 bit port on the board. This port has access by both the Bennett 80188 and by an I/O address on the AT bus. This port will be used by the system for:

1. Memory access handshake bits.
2. Interrupt type identification for the interrupts to the PC.
3. Generation of interrupts to the Bennett board.

Each side of the port will have a separate read and write port. A 74ALS646 type of device will be used to implement the port.

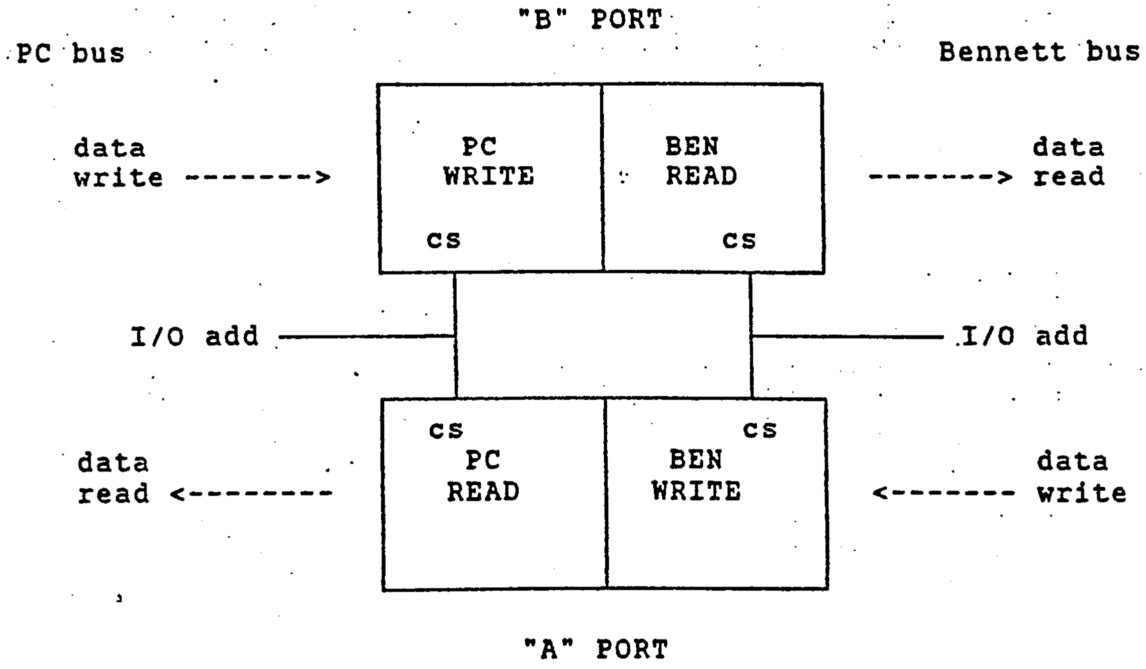

fig 1.

Using a 646 device for implementation means that each read port is viewed as read only, and each write port is viewed as write only from either process, see fig. 1. If the value of a write port needs to be known by the writing process a port image will have to be maintained in local memory.

The ports will be accessible by either processor at any time with no bus contention. Processor ready logic will be used to handle accesses made at the same time. The PC will take priority over the Bennett interface board if both systems access the port at the same time. This would cause a delay in the bus cycle of the Bennett board. The IOCHRDY signal will be used to delay the PC bus if it becomes necessary. The port select will access one paragraph (16 bytes /words) of address I/O space.

SELECTION OPTIONS FOR I/O PORT ADDRESS

| PC PORT BASE ADDRESS | JUMPER POSITION |
|---|---|
| 2B0 | JP - 11 no shunts in |
| 360 | JP - 11 left shunt in |
| 390 | JP - 11 right shunt in |
| 3C0 | JP - 11 both shunts in |

PC PORT ADDRESS FUNCTIONS

BEST AVAILABLE COPY

| ADDRESS | | FUNCTION |
|---|---|---|
| Base + 0 | read | read from port |
| Base + 0 | write | write to port |
| Base + 2 | read | read from port, and clear incoming interrupt line |
| Base + 2 | write | write to port causing interrupt to Bennett board |

1.3 PC INTERRUPT LEVEL

The Bennett board will have the ability to request service from the PC by issuing an interrupt request. This will be done for a memory access grant, errors, and other service requests. The PC will identify the type of interrupt by reading a value from the I/O port. This will be covered in more detail in the software section. The PC bus interrupt level is jumper selectable.

| PC INTERRUPT LEVEL OPTIONS | JUMPER POSITION |
|---|---|
| 3 | JP - 10 right shunt in |
| 5 | JP - 10 middle shunt in |
| 7 | JP - 10 left shunt in |

1.4 INTERRUPT FROM PC TO BENNETT BOARD

For the PC to interrupt the Bennett board, a write to a specific port address will accomplish this. This type of interrupt is an indication to the Bennett to check the memory request line and take action if a change is seen from the last known state. This will be fully explained in the interface operation section.

1.5 NON MASKABLE INTERRUPT

The PC will have the ability to cause a NMI (non maskable interrupt) at the 80188 of the Bennett board. This is intended to be used for a normal code download. The NMI can also be used to reset the board in case the PC determines that communication loss or other catastrophic errors have occurred. The NMI will be accomplished by writing to two different I/O port addresses one after the other. The data written is irrelevant. The port write sequence will be:

Port base address + 05H
Port base address + 0AH

BEST AVAILABLE COPY

Internal logic will decode this sequence and issue a NMI to the 80188. A port read or write that can be decoded by the board, to an address other than 0AH after the write to 05H will abort the sequence.

During normal operation this interrupt will cause the Bennett software clear out all communication in progress to the PC bus, zero the data base and request a code download. During the application code download process a NMI will cause a soft reset and begin the application code download process over.

2.0 INTERFACE OPERATION

This section will describe in detail how the memory, I/O port and interrupts are used. The interface consists of two basic parts. All data and commands are communicated through a shared memory window that both the Bennett board bus and the PC bus can access. The status information will be updated on a continual basis in this memory by the Bennett software. This allows the PC to determine the state of a dispenser simply by reading the information. The second part of this interface is the manipulation of an I/O port for memory control handshaking and interrupt type identification.

2.1 MEMORY

The memory will be divided into three sections while the application code is running the standard interface. If an application code download is taking place the entire 8 K will be used for download.
The normal interface memory allocation is:

0K - 3.5K (base + 0 to base + DFFh)
Command buffer for the PC to write commands and associated data.

3.5K - 7.0K (base + E00H to base + 1 BFFH)
Command buffer for the Bennett interface board to write commands and associated data.

7.0K - 8.0K (base + 1C00h to base + 1FFFH)
Status area for the dispensers and DCA's. This will hold status and display information. The PC software will only read this memory area.

Figure 2 shows the read and write options for the different parts of the memory. The direction arrows show the direction of control allowed. Areas shown read only should never be written to by the indicated process. Section 2.1.1 gives a full explanation of the memory use.

BEST AVAILABLE COPY

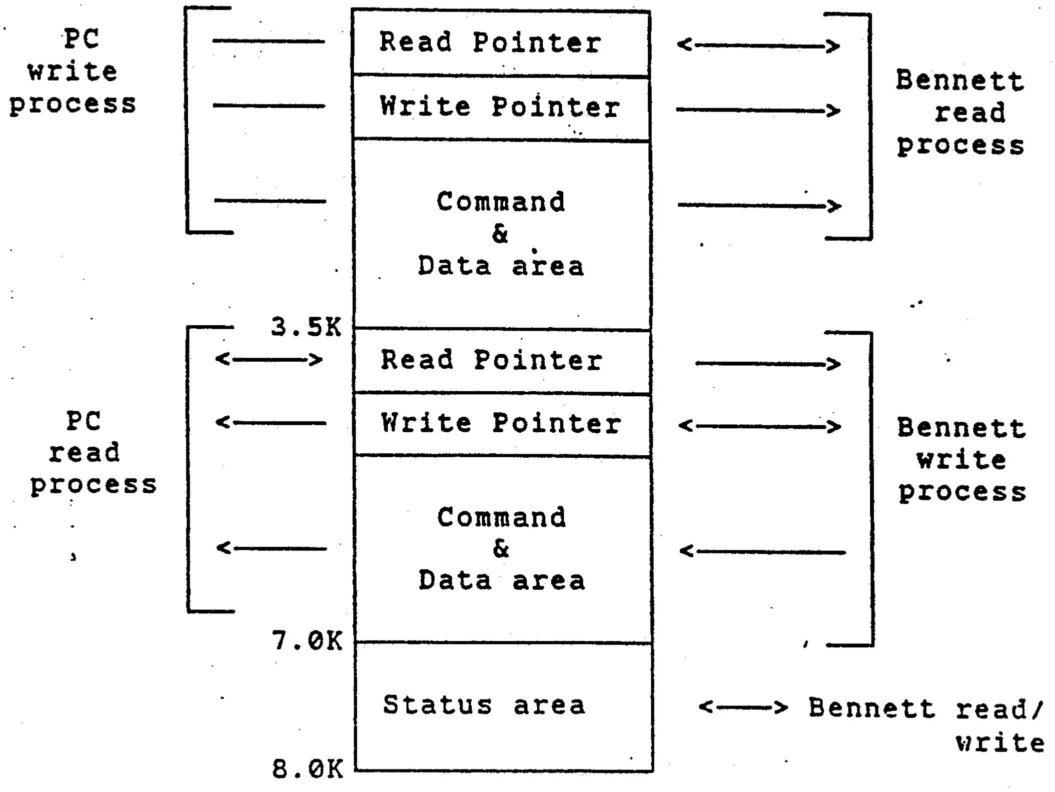

fig. 2

2.1.1 COMMAND BUFFERS

Each bus has one read buffer and one write buffer. Both command buffers will be organized the same. The structure will be as follows:

READ POINTER - 1 word - Contains the offset from the start of the associated command buffer data area as to where the receiving side should start to read. This is read only for the reading side.

WRITE POINTER - 1 word - Contains the offset from the start of the associated command buffer data area as to where transmitting side last wrote.

COMMAND AND DATA AREA - The rest of the 3.5K will be used to contain the commands and data.

The command buffer will be implemented in a ring buffer configuration. As the end of the buffer is reached, the data being written will continue back at the beginning of the same buffer. The application code using the buffer will be responsible for keeping track of the boundaries and handling the wrap function. Before a message is put into the buffer, the pointer must be checked to make sure that enough room is in the buffer + 1 extra byte. This will insure that the only time the read and write pointers are pointing to the same

BEST AVAILABLE COPY location is when the buffer is empty. The pointers will have a range of 0 to 0DFBH or 0 to 3579 decimal while pointing to the data area.

The steps to write a message into a command buffer are:

1. Check the buffer pointers to see if there is enough room in the ring buffer to hold the message plus one extra byte.

2. Write data to the location that the current write pointer is pointing to.

3. Increment the write pointer. (Pointer could be updated at the end of transmission rather than incremented for every byte.)

4. Continue write process steps 2 and 3 until message is complete.

The steps to read a message from the command buffer:

1. Check the read and write pointers to see if there is a message in the buffer to be read. If the pointers do not point to the same location there is a message.

2. Read a byte from the read pointer location.

3. Increment the read pointer. (Pointer could be updated at the end of reception rather than incremented for every byte.)

4. Check for end of message using the length read in for the current message.

5. Continue read data process steps 2, 3, and 4 until message is complete.

6. Compare read and write pointers. If equal all messages have been read from buffer.

Messages from PC to Bennett board -.

The PC will have to request access from the Bennett board before using the common memory window. Once access has been granted the complete message should be put into the buffer before memory control is released. The Bennett board will check for read and write pointer differences to determine if a message is ready for input. no partial messages should ever be in the command / data area with memory access returned to the Bennett board. To handle an error condition the write pointer could be reset back to the value at the time of the

BEST AVAILABLE COPY last memory grant. If a severe error occurs the read and write pointers could be set equal, effectively erasing what is currently in the command buffer.

Messages from the Bennett board to the PC -

When a message is complete and ready for the PC to read an interrupt will be issued to the PC. The same rule used for the PC to Bennett messages of no partial messages in the buffer area will apply to the Bennett board so if a message build is taking place it will be completed before memory will be released to the PC. This will allow the same pointer comparison scheme to be used for checking if a message is present by either bus accessing the memory. When the Bennett puts a message in the shared memory area and issues a memory grant interrupt to the PC, the PC use this grant to take the memory without issuing a request.

2.1.2 STATUS AREA

There is a 1K area reserved for dispenser and DCA interface status information. There will be memory allocated to store information for up to 36 fueling positions. The memory will be organized with each hose will have 24 bytes allocated. This means each hose information area will start on 24 byte boundaries. Hose 1 will be at the status area memory base + 0, hose 2 status area memory base + 24, ect. The status area will not be defined in RAM during application code downloads to the Bennett board.
Each hose will have the following information for its status:

| | | |
|---|---|---|
| Byte 1 | - | Dispenser current status |
| Byte 2 | - | Dispenser sale grade |
| Byte 3 | - | Dispenser selected grade |
| Byte 4 | - | Dispenser operational status |
| Byte 5 | - | Future expansion (undefined) |
| Byte 6 - 9 | - | Long integer value of dispenser face money |
| Byte 10 - 13 | - | Long integer value of dispenser face volume |
| Byte 14 - 17 | - | Long integer value of current display PPV |
| Byte 18 | - | Current status of dispenser card acceptor |
| Byte 19 | - | Current diagnostic code of DCA |
| Byte 20 - 24 | - | Future expansion |

The information in the status area will be updated at a periodic rate of .5 seconds between updates. The polling rate will be no more that 1 second between polls for any dispenser in a fully loaded system. The definitions for status, grade, and dispenser face byte values are in the software interface section 3.1. The integer numbers for the PPV, money, and volume will have an assumed decimal point.

The DCA status area information will be determined at a later time when the full DCA is specified.

BEST AVAILABLE COPY 2.2 I/O PORT OPERATION DESCRIPTION

There will be an I/O byte accessible by both the Bennett bus and the PC bus. Each side of the port will have its own read and write function. The read and write control lines handle differentiation between port input and port output since both actions are at the same address.

The bit definitions for port A are :
(Bennett write / PC read)

Bit 0 though bit 5 - Interrupt type designator or application code ack / nak.

Bit 6 - Used during application download,
0 During normal operation.
1 For application code ack or nak Bit 7 - Memory "access grant" bit
1 Memory control by the PC bus
0 Memory control by the Bennett board.

The bits 0 through 5 will be written with a value by the Bennett board before an interrupt is issued to the PC. The PC will read the value to determine the reason for the interrupt. The action of the PC reading the port will signal an interrupt acknowledge to the Bennett board. The interrupt line will then be reset back to zero.

The bit definitions for port B are:
(Bennett read / PC write)

Bit 0 though bit 5 - Unused during normal operation.

Bit 6 - Used during application download,
0 During normal operation.
1 For application code ack or nak Bit 7 - Memory "request" by PC
1 Memory being requested by PC
0 No memory request by PC Bit 7 will be used by the PC to request access to the common memory. Once the Bennett board has recognized the request it will set its bit 7 to a logic high for the access grant.

The following steps are a description of how the PC would request and obtain access to the common memory window :

1. The PC must check the memory grant ( port A.7) line by reading from the base port address + 0 location. The action will be as follows :
   A. If the grant line is 0, the PC can request the memory.

BEST AVAILABLE COPY

B. If the grant line is still 1 from the last request, and the request bit was never set to zero. The PC must wait for a memory return acknowledge interrupt before making another request.

C. If the grant line is 1 from the last request, and the request bit was set to zero, the PC must wait for the memory grant line to go to zero and the memory return acknowledge interrupt before issuing another request.

2. The PC will set the request bit ( port B.7 ) to 1 with a write to port base address + 2 causing a interrupt to the Bennett software.

3. The Bennett software will recognize the memory request and set the access grant bit ( port A.7 ) to a 1, write in the interrupt type "memory access grant" to the I/O port (port A.0 -A.5), and issue an interrupt to the PC.

4. The PC will receive the memory access grant interrupt and confirm a 1 at port A.7. The port read must be done at port base address + 2 to clear the interrupt line.

5. When the PC is complete with the memory access and is ready to relinquish control of the memory, the memory request bit is set back to zero.(port B.7) The port address base + 2 must be used to generate an interrupt to the Bennett software.

6. The Bennett will read the I/O port and see the "memory request bit" as zero then set the access grant bit (port A.7) back to a zero. An interrupt will be generated for this reset of the access grant bit.

This table below will gives all combinations of the memory control bits and the action the memory access control software will take as a result:

| PC memory request port B.7 | Bennett memory access grant port A.7 | RESULT |
|---|---|---|
| 0 | 0 | no action, Bennett has memory |
| 0 | 1 | clear memory access grant bit |
| 1 | 0 | set memory access grant bit |
| 1 | 1 | no action, PC has memory |

The basic rules for the PC to follow are :

1. Do not request memory if the memory access grant bit is set to 1.
2. Use port write with interrupt generation when changing the memory request bit of the I/O port .

3. Use port read that does not clear the incoming interrupt line when checking the state of the memory access grant bit before doing a request.
4. Use the interrupt clear type of port read after receiving a memory grant interrupt.

3.0 SOFTWARE INTERFACE

This section will describe the command formats and data definitions contained in the communications between the Bennett board and the PC system software during normal operation.

3.1 DISPENSER STATUS DEFINITIONS

This section details the definition of the information in the status area for the dispensers. This information is part of the 1K area of the shared memory window described in 2.1.2. The information is kept up to date on a continual basis.

Each hose will have the following information for its status:

Byte 1 - Dispenser current status value and

| VALUE | | | DEFINITION |
|---|---|---|---|
| 0 | - | Down, | No communication from dispenser |
| 1 | - | Idle, | Dispenser ready for new sale, no pump handle or authorization. |
| 2 | - | Authorized, | Dispenser is pre-armed, no pump handles are active. |
| 3 | - | Customer, | Dispenser has a pump handle active, and is not authorized . |
| 4 | - | Ready, | Dispenser has a handle up and is authorized for flow. Flow has not been started. |
| 5 | - | Dispensing, | Fuel is being dispensed |
| 6 | - | Suspend, | A fuel sale in progress was stopped by de-authorizing the hose. Pump handle is still active. |
| 7 | - | Collect, | Fuel dispensing has been completed, no new handle. The sale needs to be collected. |
| 8 | - | Sale pending, | A pump handle has been raised while the previous sale is still waiting to be collected. |

BEST AVAILABLE COPY

9 - Error, The dispenser is not operational due to a error condition.

10 - Error collect, The error collect is used when the a dispenser that is in collect is also in an error state.

Byte 2 - Dispenser sale grade

The dispenser grade byte will hold a numeric value of the fuel grade. If a sale is in flow the grade will be that of the current sale. If the sale is waiting to be collected the grade byte will indicate the fuel grade of the sale for collection. This value will remain until the sale is no longer being displayed on the dispenser face.

Byte 3 - Dispenser selected grade

This byte will hold a numeric value for the fuel grade selected. This could be selected by a raised handle for a multiple hose dispenser or by a grade select button on a blender. This value will be used if it is necessary to know in advance what grade a customer has sected before arming the dispenser.

Byte 4 - Dispenser operational status

This byte will be divided into bit fields.

Bit 0 Prepay
0 - The current sale is not a prepay sale.
1 - The current sale in flow or the sale to be collected is a prepay sale.

Bit 1,2 Price tier
00 - The price currently displayed on the pump face is the cash price.
01 - The price currently displayed on the pump face is the credit price. ( bit 1 = 0, bit 2 = 1 )
10 - The price currently displayed on the pump face is the debit price. ( bit 1 = 1, bit 2 = 0 )
11 - Future use for fourth level of price.

Bit 3 Stand alone
0 - The dispenser is in console operation.
1 - The dispenser is in stand alone operation
( stand alone operation means dispenser is automatically self armed )

Bit 4 Error
0 - There is no current error at the dispenser
1 - There is currently an error at the dispenser Bit 5 Gallons
- 0 - The dispenser is operating in the liters mode
- 1 - The dispenser is operating in the gallons mode Bit 6 Price set in progress
- 0 - Prices displayed at the dispenser are up to date.
- 1 - There is a new price waiting to be set. If a hose is down this bit will not be set.

Bit 7
Future expansion, unused at this time

| | | |
|---|---|---|
| Byte 5 | | Unused |
| Byte 6 - 9 | - | Long integer value of dispenser face money |
| Byte 10 - 13 | - | Long integer value of dispenser face volume |
| Byte 14 - 17 | - | Long integer value of current display PPV |

These bytes will contain numeric value of what is currently on the dispenser face for the designated information.

The assumed decimal for money and volume is:

XXXXXX.XXX

The dispenser money and volume displays have six digits therefore the range of values is 000000.000 to 999999.000

The assumed decimal for PPV is:

XXXX.XXX

The dispenser PPV display has four digits therefore the range of values is 0000.001 to 9999.000

The money, volume, and PPV integer values must be divided by 1000 to obtain the correct numeric value. Using this method of assumed decimal point will allow for future use of other countries monetary systems with no change to the data protocol between the Bennett and PC software. All dispenser face decimal adjustments will automatically be accounted for by a decimal mode programed at the dispenser.

The dispensers may be in gallon or liters mode of operation. The gallons or liters decision will be based off of the dispenser CPU board setting of the individual fueling positions. The dispenser operational status byte will indicate what the selection is. Decimal point location of data sent over to the PC will remain the same, the Bennett software will handle all numeric adjustments.

3.2 DISPENSER CARD ACCEPTOR STATUS DEFINITIONS

The DCA status field will have a single ascii letter to indicate the current status. If the letter is lower case this indicates that the DCA has not been initialized by the console since its last power down. Once the DCA has been initialized the status letters will always be upper case.

BEST AVAILABLE COPY

The definitions of the letters are as follows:

STATUS LETTERS (UPPER/LOWER CASE)

- A - IDLE
- B - INFORMATION AVAILABLE
- C - REQUEST KEY (FOR DATA ENCRYPTION UNIT)
- D - REQUEST RECEIPT
- E - OUT OF PAPER OR PRINTER FAULT
- F - DIAGNOSTIC FAULTS
- G - DISABLED
- H - REQUEST TO SEE IF PIN REQUIRED
- I - REQUEST PUMP STATUS UPDATE ('L' COMMAND)
- J - REQUEST PUMP SALE CANCELLATION ('L' COMMAND)

The 'B' status will be used whenever a sale needs to be processed (when there is sales information available).

The 'H' status will be used when the DCA needs to determine if a PIN is required for a sale. For example, when the device is a CCA and the sale type cannot be selected.

The 'I' status will be used whenever the DCA needs to know of console changes such as post-pay, pre-pay, network down, etc. The console will initiate the 'L' command.

The 'J' status will be used when the DCA cannot cancel a sales transaction without console approval. An example would be when the customer has been approved for fuel dispensing but wished to cancel the sale. Since the DCA does not know the real-time status of the dispenser it cannot cancel the sale. It will request a cancellation and the console will notify the DCA (see the 'L' command) if it is approved or disapproved.

Upon cold power-up, the ICA continuously responds with the 'c' status. If the ICA does not receive an encryption KEY ('B' command) then it will continue to send the 'c' STATUS.

3.3 INTERRUPT TYPE DEFINITION

This is a list of the interrupt types that are found in the six bit register of the I/O port that is read by the PC.

| TYPE NUMBER | DESCRIPTION |
|---|---|
| 00 | Idle, no uncleared interrupts |
| 01 | Memory request grant to the PC |
| 02 | Command request from Bennett board |
| 03 | Application code download request |

special numbers used for application code acknowledgment, details are coved in section 4.0

| | |
|---|---|
| 46 | application code block ack |

55 application code block nak

3.4 COMMAND PROTOCOL PC TO BENNETT BOARD

This section will outline the command structure and protocol of messages sent from the PC to the Bennett board.

3.4.1 Format

The format of command or response is :

| COMMAND | SEQUENCE LOW | SEQUENCE HIGH | LENGTH LOW | LENGTH HIGH | RETURN STATUS | DATA |
|---|---|---|---|---|---|---|

Command : One byte command to indicate the type of message. This is referred to as a numeric value.

Sequence low : The low order byte of the sequence number integer representation assigned by the PC.

Sequence high: The high order byte of the sequence number integer representation assigned by the PC.

Length low : The low order byte of the of the integer representation for the message data length.

Length high : The high order byte of the integer representation for the message data length.

Return status : One byte status indicating the results of the message send.

Data : The data associated with the command. The number of bytes is indicated by the length.

Sequence number - The sequence number is a number that comes in with every message from the PC. This number will be passed back to the PC with the Bennett message that is in response to the PC message. If a message is being originated by the Bennett board the sequence number will always be 0.

BEST AVAILABLE COPY

Length - The length number will include only the data part of the message. If the message has a checksum, this will be included in the length .

The sequence and length numbers will be represented as integers in the C language used to read and write the information.

If a command gets a response, the response will be in the same format as a command.

Return status - The return status is used in the response to commands to let the sender know is a problem occurred in the process of sending a command. This is used to designate problems related to the system, not to the success of the operation requested by the command. The return status for the Bennett board to the PC is :

0 - Success
1 - Command issued for is that is down
2 - Bennett internal mailbox failure
3 - Command issued for hose that has not been programed
4 - Invalid data found in command 3.4.2 COMMAND PROTOCOL How to read the protocol:

Command - This field gives the command number used at the beginning of the message in memory to identify the type of command.

description - Briefly describes what the command is data format - will give letter designations indicating the order and size of the data fields in the command or response. The description of the fields are given in the data definition area. The number of bytes the data field uses is indicated by the number of letters. (ie. "mm" would indicate that a field described took two bytes to represent, "d" indicates a one byte field.)

data definitions -
each data field in the data format is completely described in the definition area. example :
mm - integer , The field in the data format "mm" is a two byte integer representation. It should be read in as a ansi standard C language integer.

response - Gives the type and description of the response expected by the sender as a result of the command. The response may only be indicated by a change in the pre-defined status area, or could be a complete message response that will have the same type of format as a command.

response data format and data definitions are same as above.

Command - 01 description - Authorize a dispenser for a sale data format - dtgpmmmm data definitions -

```
d     1 byte dispenser number
t     1 byte sale type
        0 postpay sale
        1 prepay sale
g     1 byte grade number
         0  Authorize not hose specific
         1  grade 1
         2  grade 2
         3  grade 3
         4  grade 4
         5  grade 5
g     1 byte price level for sale
         1  credit price
         2  cash price
         3  debit price
mmmm  Unsigned long integer value of preset money
      amount Decimal point assumed as amount / 1000
                  XXXXXX.XXX
      The dispenser display has six digits so the
      range of acceptable values is 0.0 to 999999.000
      This field will be ignored is the sale type is
      postpay.
```

response -
number in command field - 1 data format -da data definitions -

```
d     1 byte fueling position number
a     1 byte ack or nak. A nak will be issued if the
      fueling position is not authorized.
```

```
Command - 02

    description - De-authorize a dispenser

    data format - d

    data definitions -
      d     1 byte dispenser number

  response - Not armed condition will be indicated in status


Command - 03

    description - Set preset money limit

    data format - dmmmm

    data definitions -
      d     1 byte dispenser number
      mmmm  Long integer value of preset money amount
            Decimal point assumed as amount / 1000
                   XXXXXX.XXX

   response - information in status


Command - 04

    description - Request preset money amount for a
                  dispenser

    data format - d

    data definitions -
      d     1 byte fueling position number

  response -

    number in command field - 04

    data format - dpppp

    data definitions -
       d     1 byte dispenser number
       pppp  Unsigned long integer of preset money amount.
             Decimal point assumed as amount / 1000
                   XXXXXX.XXX
```

Command - 05 description - Set allocation limit data format - dll data definitions -
d 1 byte dispenser number
ll Integer number of allocation amount in whole gallons or liters.

response - none

Command - 06 description - Request allocation limit for a hose data format - d data definitions -
d 1 byte dispenser number response - number in command field - 06 data format - dll
data definitions -
d 1 byte dispenser number
ll Integer whole gallon / liter amount for allocation limit Command - 07 description - Set new prices to be sent out to a fueling position. ( only one fueling position per command)

data format - dtnuuuu...

data definitions -
d 1 byte dispenser number

The following data is repeated as many times as necessary to set all prices at a fueling position.
t 1 byte price level
1 - credit
2 - cash
3 - debit

BEST AVAILABLE COPY

```
n      1 byte grade number
         1 - hose A
         2 - hose B
         3 - hose C
         4 - hose D
uuuu   Long integer value of price to be set.  The
       decimal point is assumed at (XXXX.XXX).
       The range of valid number to be sent is
               0000.010 to 9999.000

response -
  number in command field - 7

  data format -da

  data definitions -
    d     1 byte fueling position number


Command  - 08

    description - Request dispenser counters

    data format - dt

    data definitions -
       d      1 byte dispenser number
       t      1 byte requested counter type
                0 - sales counters by hoses
                1 - price change counters by hose

response -

    Number in command field - 08

    data format - dt...

    data definitions -
       d    1 byte dispenser number

       t    1 byte counter type

       Each type has its own format, the types and there
       formats are defined separately below :

        Type  - 0  sales counter by hose
         format  iccccicccciccc...

         data definitions
         i    - index for hose number, 1 to 5
         cccc - long integer counter for number of sales

         This is repeated for each hose programed for the
```

dispenser. The length field of the command response will indicate the total message length Type - 1 price change counters by hose
format icccciccccicccc...

data definitions
i - index for hose number, 1 to 5
cccc - long integer counter for number of price changes This is repeated for each hose programed for the dispenser. The length field of the command response will indicate the total message length Command - 09 description - Request prices from a dispenser data format - d data definitions -
d 1 byte dispenser number response -

Number in command field - 09 data format - dtnuuuu...

data definitions -
d 1 byte dispenser number

The following data is repeated as many times as necessary to set all prices at a fueling position.
t 1 byte price level
1 - credit
2 - cash
3 - debit
n 1 byte grade number
1 - hose A
2 - hose B
3 - hose C
4 - hose D
uuuu Long integer value of price per volume from dispenser. The decimal point is assumed at (XXXX.XXX). Range of return values is 0000.010 to 9999.000

BEST AVAILABLE COPY

Command - 10 description - Request diagnostic code from dispenser data format - d data definitions -
d 1 byte dispenser number
byte = 0 for all dispensers programed request response -
number in command field - 10 data format - drrrrc...

data definitions -
d 1 byte dispenser number
rrrr 4 byte acsii revision level of fueling position CPU board software. Revision level is read as follows:
first r is dispenser type
0 - standard USA 6000/8000
1 - world software 6000/8000
2 - mechanical type dispenser
3 - MPII type dispenser
last three "r" is the software rev level read as rr.r
c One byte numeric code for dispenser diagnostic. This field would be a single byte for 6000 / 8000 type dispensers, a 10 byte field for 7000 / 9000 type dispensers. Use the length field to determine the number of error code bytes.

Command - 11 description - Signal dispenser sale paid / reset dispenser display to programed mode data format - d data definitions -
d 1 byte dispenser response -
number in command field - 11 data format.-da data definitions -
d 1 byte fueling position number

BEST AVAILABLE COPY

Command - 12 description - Enable or Disable dispenser feature.

data format - dfe data definitions -
d 1 byte dispenser number
f 1 byte feature designator
1 - Cash / credit buttons
2 - Local preset keypad
e 1 byte control code
0 - Disable operation of feature
1 - Enable operation of feature response - none Command - 13 description - Set price level to be displayed at dispenser data format - dl data definitions - d 1 byte dispenser number
l 1 byte price level number
1 - credit
2 - cash
3 - debit response - change shown in operation status area of shared memory Command - 14 description - Request dispenser money totals by hose data format - dt data definitions -
d 1 byte dispenser number
t 1 byte totals type
1 - current dispenser electronic totals
2 - Previous period dispenser electronic totals recorded at the last price change.

BEST AVAILABLE COPY response -
number in command field - 14 data format - dtaaaabbbbccccdddd....

data definitions -

- d 1 byte dispenser number
- t 1 byte total type ( same as send type )
- aaaa Unsigned long integer representation of total for hose a
- bbbb Unsigned long integer representation of total for hose b
- cccc Unsigned long integer representation of total for hose c
- dddd Unsigned long integer representation of total for hose d
- .... additional totals added as needed. The length will indicate the size of the response, only the programed hoses will be sent.

The long integers are unsigned numbers with an assumed decimal point of : XXXXXXX.XX Command - 15 description - Request dispenser electronic volume totals by hose data format - dt data definitions -

- d 1 byte dispenser number
- t 1 byte totals type
  - 1 - current dispenser electronic totals
  - 2 - Previous period dispenser electronic totals recorded at the last price change.

response -
number in command field - 15 data format - dtaaaabbbbccccdddd data definitions -

- d 1 byte dispenser number
- t 1 byte totals type ( sale as send type )
- aaaa Unsigned long integer representation of total for hose a
- bbbb Unsigned long integer representation of total for hose b

BEST AVAILABLE COPY cccc Unsigned long integer representation of total for hose c dddd Unsigned long integer representation of total for hose d .... additional totals added as needed. The length will indicate the size of the response, only the programed hoses will be sent.

The long integers are unsigned numbers with an assumed decimal point of : XXXXXXX.XX Command - 16 description - request dispenser electronic volume totals by grade. This gives total grade volume, and separate totals for the amount of each base product used to make up the mix grade.

data format - d data definitions
d - 1 byte dispenser number response number in command field - 16 data format - dgttttaaaabbbbgttttaaaabbbb data definitions
d 1 byte dispenser number repeat field for as many grades as the dispenser has programed :

g 1 byte number of the mix grade, could be a tank or mix product.

tttt Unsigned long integer representation of total amount dispensed of the designated grade.

aaaa Unsigned long integer representation of the total amount dispensed of the first base product that is used to make up the mixed product of the designated grade.

bbbb Unsigned long integer representation of the total amount dispensed of the second base product that is used to make up the mixed product of the designated grade.

The length field will be used to determine the end of message. If the grade is not a mixture, the second number will be zero. The products that make up the mix are determined at site set up. The A and B totals are only of the fuel that is dispensed for the grade that totals are being requested for.

BEST AVAILABLE COPY aaaa + bbbb = tttt for each grade
The long integers are unsigned numbers with an assumed decimal point of XXXXXXX.XX Command - 17

Description - Request dispenser electronic volume totals by base fuel product. (Products used that make up the mix.) This is the total amount delivered to the dispenser.

Data format - d

Data definitions - d 1 byte dispenser number response - number in command field - 17 data format - dgvvvv data definitions - d 1 byte dispenser number

The following information is repeated for all fuel products going to the dispenser:

(products used for mixing at the dispenser)

g Grade number for tank product total vvvv Unsigned long integer representation of amount for total of tank product dispensed for all grades at this dispenser.

The long integers are unsigned numbers with an assumed decimal point of : XXXXXXX.XX Command - 18 description - Send set up information to program a

BEST AVAILABLE COPY fueling position data format - dn data definitions - d 1 byte fueling position number n 1 byte number of hoses at fueling position, a hose number of 0 will turn the dispenser communications off.

response - number in command field -18 data format -da data definitions - d 1 byte fueling position number a 1 byte ack or nak. A nak will be issued if the fueling position or number of hoses data is out of a valid range.

Command - 19 description - Send set up information to program a fueling position for mixing data format - dhgabphgabp ...

data definitions - d 1 byte dispenser number to assign a number to the fueling position.

The following data is repeated for each hose at the dispenser :

h 1 byte hose number to assign a grade and mix ratio g 1 byte number of grade for the hose a 1 byte grade number of the first base product to be used for the mix b 1 byte grade number or the second base product to be used for the mix.

p Integer value for the percentage of the first base product that is used for this grade.

For non mix products the "a" would be the same as "g", and "p" would be 100. If the dispenser is a one hose mixer, the hose number will be the a grade button numbered from left to right.

response - number in command field - 19 data format - da data definitions -
d 1 byte fueling position number
a 1 byte ack or nak Command - 20 description - Future data format - none data definitions - response -

Command - 23 description - Zero resetable diagnostic counters data format - none data definitions - response - none

Command - 24 description - Request diagnostic information data format - none data definitions - response -
number in command field - 24 data format - ASCII character stream with information data definitions -
The data will have the following type of information inside the text steam sent to the PC.

BEST AVAILABLE COPY ss Number of dispensers diagnostic information is being sent for.

The following data is repeated for the number of dispensers programed at the site.

cc Count of number of communication re-trys for a dispenser since last memory zero.

rr Count of number of communication re-trys for a dispenser since last counter reset.

dd Count of number of times a dispenser went down since last memory zero xx Count of number of times a dispenser went down since last counter reset.
end of repeated dispenser data nn Number of mailboxes that data is being sent for.

The following information is repeated for each mailbox in the interface software.

oo Number of overflows for the appropriate mailbox

Command - 25 description - Set dispenser features ( MP - II )

data format - dmmmmaassttpprhbbifexlyz data definitions -

- d - 1 byte dispenser number
- mmmm - four byte ascii managers security access code
- aa - integer value of allocation limit
- ss - 2 byte numeric slow flow start point at end of preset sale. Data is in volume unit and read as s.s
- tt - integer value of no flow time out in seconds
- pp - integer value of submerged pump pre-start time in seconds.
- r - 1 byte numeric value of number of price tiers.
- h - 1 byte numeric value of number of hoses
- bb - integer value of sales display blanking time in seconds.
- i - 1 byte ippv blanking mode, see MP-II specification.
- f - 1 byte ippv flashing mode, see MP-II specification.

BEST AVAILABLE COPY e - 1 byte beeper mode, see MP-II specification.
x - 1 byte tier button mode, see MP-II specification.
l - 1 byte local preset mode, see MP-II specification.
y - 1 byte total calculation method, see MP-II specification.
z - 1 byte decimal mode, see MP-II specification response -
none Command - 26 description - Send programed features information from dispenser. ( MP -II )

data format - d data definitions -
d - 1 byte dispenser number response - number in command field - 26 data format - dmmmmaassttpprhbbifpxlyz data definitions -

See command 25, this is a command to retrieve the information set by command 25.

Command - 27 description - Set hose status by type for individual dispenser.

data format - dts data definitions -
d - 1 byte dispenser number
t - 1 byte status type
s - 1 byte status value definitions of status types and associated value
status type = 0 : status value = 0 or 1
0 = arm bit is cleared
1 = arm bit is set status type = 1 : status value = 0 or 1

BEST AVAILABLE COPY

0 = prepay bit is cleared
1 = prepay bit is set status type = 2 : status value = 0, 1 ,2 or 3
0 = all prices displayed
1 = credit price displayed
2 = cash price displayed
3 = debit price displayed status type = 3 : status value = 0 or 1
0 = tier buttons disabled
1 = tier buttons enabled status type = 4 : status value = 0 or 1
0 = dispenser lights are off
1 = dispenser lights are on status type = 5 : status value = 0 or 1
0 = sale not paid out by console
1 = sale paid out by console status type = 6 : status value = 0, 1, 2, 3 or 4
0 = entire fueling position is armed
1 = hose one of fueling position is armed
2 = hose two of fueling position is armed
3 = hose three of fueling position is armed
4 = hose four of fueling position is armed response
none Command - 28 description - Send hose status by type for individual dispenser.

data format - dt data definitions -
d - 1 byte dispenser number
t - 1 byte status type requested for definitions of status types and associated value see command 27.

response
data format - dts

BEST AVAILABLE COPY data definitions
data format and definitions are the same as command 27.

Command - 30 description - Set up printer header and trailer for dispenser card acceptor customer receipts.

data format - f ascii data field data definitions -
f - header or trailer field selector
1 - data is for header
2 - data is for trailer acsii data field
The data field can hold up to 255 ascii characters for the header or trailer. If a zero is encountered in the data the rest of the field will be filled by blanks.

response none

Command - 31 description - Set data encryption key for DCA.

data format - deeeeeeee data definitions
d - 1 byte dispenser number for DCA
eeeeeeee - 8 character encryption key response none Command - 32 description - Send custom messages that are displayed on DCA. There are two groups of messages that can be programed. If these are not set the default messages group 1 are used by the DCA.

data format - mgaaaa.... 40 character ascii message

```
data definitions
     m -  message number 1 to 31

     g -  message group number
          1 - message group 1, default
          2 - message group 2

     aaaa...  -  40 character ascii message that will
                 displayed as 2 lines of twenty characters.
                 If any non ascii characters are in the
                 string the rest of the message will be
                 filled with blanks.

  The following message table is to be used as a guide
  for changing messages

MESSAGE TABLE:

NUMBER                 DEFAULT  TEXT
------   ----------------------------------------------
 00      ('                    ','                    ')
 01      ('WELCOME, PLEASE PUSH','PAYMENT OR RECEIPT  ')
 02      ('PLEASE PAY ATTENDANT',' BEFORE DISPENSING  ')
 03      ('FUNCTION UNAVAILABLE','SELECT CREDIT INSIDE')
 04      ('FUNCTION UNAVAILABLE','SELECT  DEBIT INSIDE')
 05      ('FUNCTION UNAVAILABLE','SELECT OTHER METHOD ')
 06      ('    PLEASE INSERT   ',' AND WITHDRAW CARD  ')
 07      ('   ERROR, PLEASE    ',' REINSERT YOUR CARD ')
 08      ('   ERROR, PLEASE    ','   SEE ATTENDANT    ')
 09      ('  ENTER PIN NUMBER  ','____________ & ENTER')
 10      (' WANT TO FILL UP?   ',' PRESS  YES OR NO   ')
 11      ('MONEY LIMIT $    .  ','LIMIT OK?  YES OR NO')
 12      ('  ENTER NEW LIMIT   ','$    .   PRESS ENTER ')
 13      (' CARD LIMIT $    .  ','LIMIT OK?  YES OR NO')
 14      ('  NEED A RECEIPT?   ','  PRESS  YES OR NO  ')
 15      ('  PRINTING RECEIPT  ','                    ')
 16      ('    PLEASE WAIT     ','  PROCESSING CARD   ')
 17      ('PROCESSING PROBLEM, ','PLEASE SEE ATTENDANT')
 18      ('SELECT 'PAY' INSIDE ',' METHOD OF PAYMENT  ')
 19      ('SELECT OTHER METHOD ','  OR SEE ATTENDANT  ')
 20      ('PLEASE RE-ENTER PIN ',' NUMBER  OR CANCEL  ')
 21      ('PIN NUMBER INCORRECT','PLEASE SEE ATTENDANT')
 22      ('DAILY LIMIT REACHED ','PLEASE SEE ATTENDANT')
 23      ('  DEBIT CARD ERROR ','PLEASE SEE ATTENDANT ')
 24      ('NETWORK DOWN / ERROR','PLEASE SEE ATTENDANT')
 25      ('PLEASE DISPENSE FUEL',' MAXIMUM  $    .    ')
 26      ('DISPENSING COMPLETE ','PLEASE PAY ATTENDANT')
 27      ('  NEED MORE TIME?   ','  PRESS  YES OR NO  ')
 28      ('TRANSACTION VOIDED, ','PLEASE SEE ATTENDANT')
 29      ('TRANSACTION VOIDED, ','     THANK YOU      ')
 30      ('  PRINTING RECEIPT  ','  FOR CANCELLATION  ')
 31      (' RECEIPT NOT FOUND ','PLEASE SEE ATTENDANT ')
```

response -
none

BEST AVAILABLE COPY

Command - 33 description - Set the message group to be displayed on the DCA. The messages are programed by command 32.

data format - dg data definitions -
d - 1 byte dispenser number for the DCA
g - message group to be used on display
1 - display message group # 1
2 - display message group # 2
3 - Alternating display message groups on messages requiring this feature. Use message group # 1 on other messages.
4 - Alternating display message groups on messages requiring this feature. Use message group # 2 on other messages.

response -
current group in use will be indicated the DCA status area

Command - 34
description - request complete sale information from a dispenser card acceptor. This will give the complete information for the most recent card entry at the DCA.

data format - d data definitions
d - 1 byte dispenser number response
data format - daaaaaaaaaaaaaaaaaaaeeee
11111111111111111111111111111
22222222222222222ppppppppppppplt
mmmmmnnnnnnnnnnnnnnnnnnnnnnnnnnr data definitions -
d - 1 byte Dispenser number a... Account number - A 19 character ascii field

BEST AVAILABLE COPY is allotted for the card account number. Account numbers will be left justified in the field.

eeee - Expiration date - This is the card's expiration date. This is a 4 digit ascii field with 2 digits each for month and year. Formatted as follows: Month / Year.

1... DISCRETIONARY TRACK 1 - Track 1 data. This is a 29 character field holding data that the card issuer determines discretionary.

2... DISCRETIONARY TRACK 2 - Track 2 data. This is a 17 character field holding data that the card issuer determines discretionary.

p... PIN number - This is the Personal Identification Number which the customer enters in on the keypad. 12 characters are allotted and numbers will be left justified in this field. Data in this field is the ASCII representation of the encrypted form per "DES" definition.

l - PIN LENGTH - This is a numeric field indicating the number of characters that the customer entered for the PIN. This does not effect the length of the PIN field.

t - CARD TYPE - A 1 character numeric field that informs the console of the card type selected.

0 = Debit Inside
1 = Debit Outside
2 = Credit Inside
3 = Credit Outside
4 = Cash (Inside)

mmmmm - Money amount - This is a 5 character numeric field indicating the amount of money the customer has chosen as prepay option. The maximum amount is $999.99 n... Name - This is a 26 character ascii field which represents the name of the card holder (on track 1 only).

r - Receipt at end of sale - A 1 digit field indicating that the console should or should not print a receipt at the end of the sale.

1 - print receipt at end of sale
0 - do not print sale at end of sale

```
Command  -  35
     description - Request specific card information of the
                   DCA, current sale's customer card.

     data format - dt

     data definition -
                   d - 1 byte dispenser number
                   t - type of data being requested
                        1 - complete track 1 data
                        2 - complete track 2 data
                        3 - customer account number

   response
     data format - dti...

     data definitions -
                  d - 1 byte dispenser number
                  t - type of data ( see above )
                  i...  information being returned
                      for data type 1
                        79 bytes of numeric data direct from
                        track 1
                      for data type 2
                        40 bytes of numeric data direct from
                        track 2
                      for data type 3
                        customer account number in field of
                        19 bytes of ascii data left justified


Command  -  36
     description -  Send receipt body information to be
                    printed by DCA receipt printer. The
                    receipt header and trailer information
                    will automatically be added to the
                    receipt.


     data format - daaaaaaaaaaaaaaaaaaar...

     data definitions -
                   d -  1 byte dispenser number
                   a... customer account number left
                        justified in 19 ascii character field
                   r... Receipt information, ascii data up to
                        maximum 256 characters.  A hex 0 in
                        the string will end the receipt
                        before the full amount of characters
                        is read in.  An ascii horizontal tab
                        (09h) followed by a numeric 1 through
                        9 will insert the indicated number of
```

BEST AVAILABLE COPY spaces on the receipt. A "cr" (0dh) character will put a carriage return and a line feed to the printer.

response -
data format - da data definitions
d - 1 byte dispenser number
a - ack or nak acknowledgment. If the dispenser card reader is able to print the receipt a ack will be returned, if not a nak will be returned.

Command - 37
description - Print a twenty character line directly to the printer. The receipt header and trailer will not be printed.

data format - diiiiiiiiiiiiiiiiiiii data definitions -
d - 1 byte dispenser number
i... 20 character ascii data to be printed Command - 38
description - Send back disposition of a DCA sale request.

data format - draaaaaaaaaaaaaaaaaa data definitions -
d - 1 byte dispenser number
r - ascii byte disposition response
A - CREDIT CHECK OK
B - NON-VALID ACCOUNT
C - CARD EXPIRED
D - BAD PIN NUMBER
E - REJECTED CREDIT CHECK
F - PICKUP CARD
G - PUMP SELECTION REJECTED
H - NO RECEIPT AVAILABLE
I - DISABLE PERIPHERAL
J - ENABLE PERIPHERAL
K - PIN REQUIRED
L - MUST HAVE VOICE AUTHORIZATION
M - PAY INSIDE (SPECIAL CONDITIONS)
N - PIN RE-ENTRY LIMIT REACHED
O - DAILY LIMIT REACHED

P - CARD ERROR (USUALLY DEBIT)
Q - NETWORK ERROR OR DEBIT-LINK DOWN

NOTE: in case of 'I' or 'J' disposition, the account number may be blanks or zeros.

a - 19 ascii character customer account number left justified in field.

response - none

Command - 39 description - Input DCA status information to set up or change operation. This command should be sent from the console whenever any of the listed status's change (except for dispensing status in which only states 'pump is dispensing' and 'pump has completed sale'). It should also be sent whenever the 'I' status is returned the 'A' command.

data format - dnttmllso data definition - d - 1 byte dispenser number.

n - NETWORK STATUS - A 1 byte numeric field which shows the status of the host network system. 0 = host down, 1 = host up.

tt - TIME OUT - This is an unsigned integer field indicating the number of seconds after which the DCA will timeout if the authorization response has not been returned.

m - DISPENSER MODE - A 1 byte numeric field showing the mode of the associated dispenser. 0 = pre-pay, 1 = post-pay.

ll - MONEY LIMIT - This is an unsigned integer field indicating the maximum amount of money in cents the customer may select as a preset option. The absolute maximum is $999.99 or 99999 cents .

s - DISPENSING STATUS - A 1 byte numeric field showing the current status of the

BEST AVAILABLE COPY associated dispenser. 0 = pump not authorized, 1 = pump authorized, 2 = pump is dispensing, 3 = pump has completed sale, 4 = pump not available.

o - PRESET LIMIT OPTION - A 1 byte numeric field specifying whether or not the pump will allow the customer to enter a preset money amount. 0 = cannot enter limit, 1 = can enter limit.

response - none

Command - 40
description - Request diagnostic and software level information from the DCA.

data format - d data definition -
d - dispenser number response
data format - dcllllss data definition -
d - dispenser number
c - current diagnostic code
llll - 4 ascii character software revision level, read as xx.xx
ss - 2 byte hexadecimal EPROM checksum code 3.5 COMMAND PROTOCOL BENNETT BOARD TO PC This section will contain the format and protocol of the messages sent from the Bennett board to the PC.

The status, current sale, and handle information will be kept up to date in the memory status area. The PC software will be responsible for reading this information and recognizing customers, flow, sale end, and other activity from the information stored in this area. The Bennett software does not send out commands to indicate these activities.

3.5.1 FORMAT

The message format is the same as described in section 3.4.1

3.5.2 COMMAND PROTOCOL

BEST AVAILABLE COPY

Command - 21 description - Send complete site set up information data format - none data definitions - none response - for this command should be that the PC will issue a command 18 and or command 19.

Command - 22 description - Send current date and time data format - none data definitions - none response -
number in command field - 22 data format - hhmmMMddyy data definitions -

| | | |
|---|---|---|
| hh | two byte ascii hours | |
| mm | two byte ascii minutes | |
| MM | two byte ascii month | |
| dd | two byte ascii day | |
| yy | two byte ascii year, last two digits | |

Command - 50 description - Memory zeroed message. This message will be sent after a code download. The message will also be sent in the case of a

BEST AVAILABLE COPY board reset to indicate to the PC that information in the 8K window could be lost.

data format - none data definitions - none response - none

4.0 APPLICATION CODE DOWNLOAD OPERATION

The process of loading the application code across the PC interface will follow the same interface rules described in the previous sections for I/O port and memory control. The difference in this mode of operation is the memory usage. The entire 8K of shared memory will be used for the application code download rather than the memory being divided up by interface function. The application code will always be downloaded at power up but can also be downloaded at the request of either the PC system or the Bennett board at any time.

4.1 APPLICATION CODE FILE SPECIFICATION

The application code file will be stored in the PC in INTEL 8086 compatible hexadecimal format. The complete specifications for this format are in appendix A. The file is divided up into records of the following types:

| record type | record type code |
|---|---|
| Data record | 00 |
| End of file record | 01 |
| Extended address record | 02 |
| Start address record | 03 |

The sender of the file is expected to recognize the beginning and end of the records within the file as the file is loaded into the 8K interface memory. No partial records should be loaded to the Bennett board, if there is not enough room to load the entire record the into the 8K area the unused portion of the 8K block should be loaded with 00 and the interrupt to read the block sent to the Bennett board. The Bennett board will read the data, decode the record

BEST AVAILABLE COPY information and check the checksum. If any record checksum is not correct the entire 8K block will be rejected. Carriage returns and line feeds that may be in a hex file are ignored by the PC download program so sending them is optional.

4.2 LOAD AT POWER UP

When the Bennett board powers up it will run a series of tests and setup procedures. If all tests pass the board will request an application code download by issuing an interrupt to the PC of type 03. The entire 8K of shared memory will be used to transfer application code. The I/O port and interrupt system will be used to control the memory access and flow of the data transfer. Each block of data sent by the PC will be acknowledged by an interrupt and an ack or nak.

The complete bit definitions of the I/O port during application code download are:

The bit definitions for port A are :
(Bennett write / PC read)

```
  Bit 0 though bit 5 - Interrupt type designator
            During application code acknowledges (bit 6 = 1)
            these bits will contain an ack or nak of
             successful reception
                     06  =  ack
                     15  =  nak

  Bit 6     - Used during application download,
            1    Set to 1 when sending a ack or nak of a
                 application code block.
            0    During normal operation.

  Bit 7     - Memory "access grant" bit
            1    Memory control by the PC bus
            0    Memory control by the Bennett board.
```

The bit definitions for port B are:
(Bennett read / PC write)

```
  Bit 0 though bit 5 -  Unused during normal operation.

  Bit 6     - Application code in memory indication.
```

BEST AVAILABLE COPY

1 Application code in shared memory
0 For all other operations including memory requests.

Bit 7 - Memory "request" by PC
1 Memory being requested by PC
0 No memory request by PC Process -

When the PC receives a interrupt 03 it will go into the mode of sending application code blocks. The Bennett board will acknowledge these block transfers with interrupts in response to each block of application code sent. There will be no sequence numbers used for these transfers since the entire 8K is used for application code.
The PC will request memory before each use of the memory. The only addition to this process from the normal operation is that bit 6 of the I/O port must be set to a 1 with the interrupt that releases memory back to the Bennett board when application code is in the memory. Bit 6 must only be set as an indication that a application code block is in the buffer and should be read by the PC board. This will insure differentiation from normal operation. This block of data is responded to with an interrupt from the Bennett board and an ack or nak will be in the first five bits of the I/O byte instead of a interrupt type number. Bit 6 is set to a 1 to indicate an application code download response. The process will continue with the PC requesting memory again. This process will repeat until the Bennett board encounters an end of file record in the data. If the block with the end of file record is found to be error free an interrupt with an ack will be sent to the PC and the Bennett board will start the application code.

When the application code starts the sequence of events will be:

1. Zero out the 8K memory window.
2. Send a memory zeroed message #50 to the PC.
3. Send a site set up request message #21 to the PC.
4. Send a date and time request message #22 to the PC.

Time out -

While waiting for an interrupt from the PC the Bennett board will be running a timer. If more than 90 seconds elapse from the time that the last interrupt was issued to the PC till the next application code interrupt is received, the software will reset and start the process over again. This will result in a standard interrupt 03 with bit 6 of the I/O port set to 0 being issued. The application code download must be started from the beginning.

Responses to the PC -

BEST AVAILABLE COPY

From the PC point of view there are three possible inputs that can be seen at any point in the download process.

1. An standard interrupt type 03 with bit 6 set to 0. This tells the PC to restart the download process for the beginning.

2. A block reception interrupt with bit 7 and bit 6 of the I/O port set to 1 and a "06" ack in the first 5 bits to signal a good reception. The PC should request memory and continue the transfer.

3. A block reception interrupt with bit 7 and bit 6 of the I/O port set to 1 and a "15" nak in the first five bits to signal a error in the block. The PC should request memory and re-send the block.

NMI -

If a NMI is received at the Bennett board during the course of the application code download the board will do a soft reset and start the download over again.

Summary of steps for a code download;

1. Bennett board issues a interrupt 03 to PC to request the application code download to start.

2. The PC will send a standard memory request interrupt.

3. The Bennett software will respond with a standard memory grant interrupt.

4. PC loads block of application code in 8K of shared memory.

5. PC sets bit 6 of the I/O port and issues an interrupt to the Bennett board.

BEST AVAILABLE COPY

6. Bennett responds to interrupt by unloading the information from the shared memory into application code memory space.

7. The Bennett software sets bit 6 of the I/O port to 1, puts a ack or nak into the first five bits, and issues an interrupt to the PC.

8. Repeat steps 2 through 7 until an end of record is seen in the data being sent from the PC 9. When the end of file is found without error in the transmitted block, an acknowledge interrupt is sent and the Bennett will start running the application code.

4.3 LOAD FROM BENNETT BOARD REQUEST

The description covered in 4.1 will be the same as for the case when the application code is already running. All contents of the memory will be assumed lost.

4.3 LOAD FROM PC REQUEST

For the PC to initiate a application code download a NMI will be issued to the Bennett board by the port write sequence explained in section 1.5. The process described in section 4.1 will be the same from this point.

The embodiments of the invention in which an exclusive property or privilege is claimed are defined as follows:

1. A dispenser system for dispensing a material comprising:

a plurality of material dispensers;

a computer system having a peripheral bus that is adapted to bidirectionally exchanging code with a peripheral device connected wit said peripheral bus;

a controller and an internal bus connected with said controller, said internal bus adapted to bidirectionally exchanging code between said controller and another device connected with said internal bus;

first communication means for providing communication between said controller and said material dispensers; and second communication means connected with said internal bus and said peripheral bus for providing bidirectional communication between said controller and said peripheral bus, said second communication means including a memory means for storing code and access means for allowing each of said internal bus and said peripheral bus access to said memory means such that said controller and said computer system can write code to said memory means and retrieve code from said memory means, said access means determining which of said internal bus and said peripheral bus has access to said memory means.

2. The dispenser system in claim 1 wherein said access means also allows only one of said internal bus and said peripheral bus access to said memory means at a time.

3. The dispenser system in claim 2 wherein said memory means is a single-ported memory device.

4. The dispenser system in claim 3 wherein said memory device is capable of storing at least 5 kilobytes.

5. The dispenser system in claim 2 wherein said access means is controlled by said controller whereby said controller determines which of said internal bus and said peripheral bus have access to said memory means.

6. A dispenser system for dispensing a material comprising:

a plurality of material dispensers;

a computer system having a peripheral bus that is adapted to bidirectionally exchanging code with a peripheral device connected with said peripheral bus;

a controller and an internal bus connected with said controller, said internal bus adapted to bidirectionally exchanging code between said controller and another device connected with said internal bus;

first communication means for providing communication between said controller and said material dispensers;

a memory device;

memory control means connected with said memory device, said internal bus and said peripheral bus for granting access of one of said internal bus and said peripheral bus to said memory device, said memory control means adapted to determining which of said internal bus and said peripheral bus has access to said memory means; and a control port connected with said internal bus and said peripheral bus for communicating access codes between said internal bus and said peripheral bus.

7. The dispenser system in claim 6 wherein said controller grants access to said peripheral bus in response to an interrupt signal generated by said computer system and provided to said control port.

8. The dispenser system in claim 6 wherein said memory device has only a single port for access thereto and wherein said access control means provides access to said single port to only one of said internal bus and said peripheral bus at a time.

9. The dispenser system in claim 6 wherein said controller includes a clock means for determining the rate of operation of said controller and further wherein said rate of operation of said controller is independent of said computer system.

10. The dispenser system in claim 9 wherein said controller further includes another clock means for determining the rate of communication of said first communication means, wherein said rate of communication of said first communication means is independent of said rate of operation of said controller and of said computer system.

11. In a dispensing system for dispensing a material including a plurality of dispensing means, each for controlling the dispensing of the material being dispensed, a computer system having a peripheral bus that is adapted to bidirectionally exchanging code with a peripheral device connected with the peripheral bus, and an interface unit interconnecting said plurality of dispensing means with said computer system, said interface unit comprising:

a controller;

first communication means for bidirectionally exchanging code between said controller and said dispensing means; and second communication means for bidirectionally exchanging code between said controller and said peripheral bus including a window memory means for storing code and a bus interface, said bus interface including an access control port for communicating access codes between said peripheral bus and said controller and a memory control adapted to selectively connecting one of said controller and said peripheral bus with said window memory means in a manner that only one of said controller and said peripheral bus may access said window memory means at a time.

12. The interface unit in claim 11 wherein said memory control is responsive to said controller and is adapted to selectively connecting one of said controller means and said peripheral bus with said window memory means.

13. The interface unit in claim 12 wherein said controller is responsive to said access codes in order to grant access by said peripheral bus to said window memory means.

14. The interface unit in claim 11 wherein said controller includes clock means for establishing the rate of execution of commands by said controller, and wherein said rate of execution of commands is independent of said computer system.

15. The interface unit in claim 11 wherein said controller includes a random access memory means for controlling operation of said controller and down-loading means for down-loading data and operating code from said peripheral bus to said random access memory means.

16. The interface unit in claim 15 wherein said down-loading means is defined at least in part by said window memory means.

17. The interface unit in claim 11 wherein said controller further includes a database, means for writing data from said dispensing means to said database and means for accessing data from said database and providing said data to said computer system.

18. In a dispensing system for dispensing a material including a plurality of dispensing means, each for controlling the dispensing of the material being dispensed, a computer system having a peripheral bus, and an interface unit interconnecting said plurality of dispensing means with said computer system peripheral bus, said interface unit comprising:

a first communication means for communicating with more than one of said dispensing means;

a controller and an internal bus for exchanging data within said interface unit including the exchange of data between said controller and said first communication means; and a second communication means for exchanging data between said internal bus and said peripheral bus; said second communication means including a control port interconnected with said internal bus and said peripheral bus for communicating access codes between said peripheral bus and said internal bus, a window memory including an access port for writing code to and retrieving code from said window memory, and a memory control interconnected with said access port, said internal bus and said peripheral bus for selectively enabling one of said internal bus and said peripheral bus with said access port; wherein, said control port and said memory control isolate said internal bus from said peripheral bus.

19. The interface unit in claim 18 wherein said memory control selectively enables one of said internal bus and said peripheral bus with said access port in response to said controller.

20. The interface unit in claim 19 including selection means for causing said memory control to selectively enable one of said internal bus and said peripheral bus with said access port.

21. The interface unit of claim 18 wherein said access port includes an address bus, a data bus and control lines and wherein said memory control includes first circuit means for selectively isolating and enabling said peripheral bus to said access port data bus and for selectively isolating and driving said access port address bus and control lines with said peripheral bus.

22. The interface unit of claim 21 wherein said memory control includes second circuit means for selectively isolating and enabling said internal bus to said access port data bus and for selectively isolating and driving said access port address bus and control lines with said internal bus.

23. The interface unit of claim 18 wherein said access port includes an address bus, a data bus and control lines, and wherein said memory control includes circuit means for selectively isolating and enabling said internal bus to said access port data bus and for selectively isolating and driving said access port address bus and control lines with said internal bus.

24. The interface unit in claim 18 wherein said controller includes an internal clock for establishing the rate of execution of commands by said controller means, said rate of execution of commands being independent of said computer system.

25. In a fuel dispensing system for dispensing fuel including a plurality of remote units including at least one fuel pump for controlling the dispensing of fuel, said remote units being capable of receiving commands from a computer, retaining remote data at the remote units, and providing remote data to a computer in response to a polling command, said fuel dispensing system further including a computer having a peripheral bus, and an interface unit interconnecting said plurality of remote units with said computer, said interface unit comprising:

a controller including a memory and a database defined in said memory of remote data derived from said plurality of remote units;

a first communication channel between said controller and said plurality of remote units for communicating polling commands from said controller to said remote units and remote data from said remote units to said controller;

said controller being programmed to repetitively generated polling commands for said remote units and to update said database with resulting remote data from said remote units;

a second communication channel for communicating inquiry commands from said computer system to said database and for retrieving data from said database that is responsive to the inquiry commands from said computer system without converting said inquiry commands and said retrieved data between serial and parallel formats; and wherein said controller is programmed to be non-multi-tasking.

26. The interface unit in claim 25 wherein said controller is programmed to complete said updating of said database following the generating of a polling command without interruption.

27. The interface unit in claim 25 wherein said second communication channel includes a shared memory device and means for selectively interconnecting said memory device with only one of said controller and said computer system peripheral bus.

28. The interface unit in claim 27 wherein said means for selectively interconnecting is responsive to said controller to selectively interconnect said memory device with only one of said controller and said computer system peripheral bus.

29. The interface unit in claim 8 wherein said second communication channel includes means for allowing said computer system to request access to said shared memory device.

30. The interface unit in claim 25 wherein said memory includes a first memory portion accessible by said controller and a second memory portion accessible by both said controller and said second communication channel and wherein said controller is programmed to repetitively copy at least a portion of the data in said first memory portion to said second memory portion, such that remote data are applied to said first memory portion and computer system inquiry commands are served on said second memory portion.

31. The interface unit in claim 25 wherein said controller is programmed to include at least one remote unit communication module for controlling communication with at least one of said remote units and a remote unit mailbox associated with said remote unit communication module, wherein said remote unit communication module is responsive to a command in the remote unit mailbox by serving that command on said remote unit and is responsive to the absence of a command in the remote unit mailbox associated therewith by serving a polling command on the remote unit associated therewith and serving the data received in response to the polling command on the database.

32. The interface unit in claim 31 wherein said controller is further programmed to include a computer communication module for controlling communication with said computer and a computer message mailbox accessible by said computer communication module and said computer, wherein said computer communication module serves commands from said computer message mailbox to said remote unit mailbox and serves data requests from the computer message mailbox to the database, and further wherein said computer communication module serves data retrieved from said database to said computer communication module.

33. The interface unit in claim 32 wherein said computer message mailbox includes a memory device and an access control device for allowing each of said peripheral bus and said controller access to said memory device.

34. The interface unit in claim 32 wherein said database further includes data accompanying a command from said computer and wherein said computer communication module serves said data accompanying a command on said database and said remote unit communication module unit retrieves said data accompanying a command from said database and serves said data accompanying a command on said at least one of said remote units.

35. The interface unit in claim 31 wherein said remote unit communication module completes said serving data following serving a poll without interruption.

36. The interface unit in claim 25 wherein said at least one fuel pump includes a card acceptor.

37. The interface unit in claim 25 wherein said at least one fuel pump includes a fuel dispenser.

38. A fuel dispensing terminal comprising:

a plurality of intelligent remote units wherein said plurality of remote units include at least one fuel pump, each of said remote units capable of at least one of receiving commands from a computer and providing data to a computer;

a computer having a multiple-byte peripheral bus that is adapted to bidirectionally exchange multiple-byte code words with peripheral devices connected with said peripheral bus;

a direct interface unit including a processor, said processor being connected with said plurality of intelligent remote units for transferring commands to said remote units and receiving data from said remote units, said processor being connected with said peripheral bus to communicate commands from said computer to said processor and to communicate data received from said plurality of remote units from said processor to said computer, wherein said direct interface unit interacts with said computer as a peripheral device of said computer; and an access control regulating which of said processor and said computer is communicating at a particular moment.

39. The fuel dispensing terminal in claim 38 wherein said fuel pump includes a card acceptor.

40. The fuel dispensing terminal in claim 38 wherein said fuel pump includes a fuel dispenser.

41. The fuel dispensing terminal in claim 38 wherein said processor is programmed to be non-multi-tasking.

42. The fuel dispensing terminal in claim 38 wherein said processor is connected with said peripheral bus by a multiple-byte communication channel that is able to communicate simultaneously entire multiple-byte command words from said computer to said processor and to communicate simultaneously entire multiple-byte data words received from said plurality of remote units by said processor to said computer.

43. The fuel dispensing terminal in claim 38 wherein said peripheral bus is electrically connected with an electrical connector within said computer and wherein said direct interface unit includes a circuit board that physically connects directly with said electrical connector.

44. In a fuel dispensing system for dispensing fuel including a plurality of remote units, at least one remote unit for controlling the dispensing of fuel, said remote units being capable of receiving commands from a computer, retaining remote data at the remote units, and providing remote data to a computer in response to a polling command, said fuel dispensing system further including a computer having a peripheral bus, and an interface unit interconnecting said plurality of remote units with said computer, said interface unit comprising:

a controller including a memory and a database defined in said memory of remote data derived from said plurality of remote units;

a first communication channel between said controller and said plurality of remote units for communicating polling commands from said controller to said remote units and remote data from said remote units to said controller;

said controller being programmed to repetitively generated polling commands for said remote units and to update said database with resulting remote data from said remote units;

a second communication channel for communicating inquiry commands from said computer system to said database and for retrieving data from said database that is responsive to the inquiry commands from said computer system; and wherein said memory includes a first memory portion accessible by said controller and a second memory portion accessible by both said controller and said second communication channel and wherein said controller is programmed to repetitively copy at least a portion of the data in said first memory portion to said second memory portion, such that remote data are applied to said first memory portion and computer system inquiry commands are served on said second memory portion.

45. The interface unit in claim 44 wherein said second communication channel includes a shared memory device and means for selectively interconnecting said memory device with only one of said controller and said computer system peripheral bus.

46. The interface unit in claim 45 wherein said second communication channel includes means for allowing said computer system to request access to said memory device.

47. The interface unit in claim 45 wherein said second memory portion is defined in said shared memory device.

48. A fuel dispensing terminal comprising:

a plurality of remote units including at least one fuel pump each of said remote units capable of at least one of receiving commands from a computer system and providing data to a computer system;

a computer system having a peripheral bus that is adapted to bidirectionally exchanging code with a peripheral device connected with said peripheral bus;

a controller, an internal bus connected with said controller and a random access memory addressable by said controller for storing operating code to control said controller, said internal bus adapted to bidirectionally exchanging code between said controller and another device connected with said internal bus;

a first communication channel for providing communication between said controller and said remote units; and a second communication channel connected with said internal bus and said peripheral bus for providing bidirectional communication between said controller and said peripheral bus and adapted to downloading operating code from said computer system to said controller.

49. The fuel dispensing terminal in claim 48 wherein said second communication channel includes a shared memory for storing code and an access control for allowing each of said internal bus and said peripheral bus access to said shared memory such that said controller and said computer system can write code to said shared memory and retrieve code from said shared memory, wherein said access control determines which of said internal bus and said peripheral bus has access to said memory and wherein operating code may be downloaded through said shared memory.

50. The fuel dispensing terminal in claim 49 wherein said access control allows only one of said internal bus and said peripheral bus access to said shared memory at a time.

51. The fuel dispensing terminal in claim 49 wherein said shared memory is capable of storing at least 0.5 kilobyte of code.

52. The fuel dispensing terminal in claim 48 wherein said at least one fuel pump includes at least one of a fuel dispenser and a card acceptor.

53. The fuel dispensing terminal in claim 48 wherein said controller further includes a database, means for writing data from said remote units to said database and means for retrieving data from said database and providing the retrieved data to said computer system.

54. A fuel dispensing terminal comprising:

a plurality of remote units including at least one fuel pump each of said remote units capable of at least one of receiving commands from a computer system and providing data to a computer system;

a computer system having a peripheral bus that is adapted to bidirectionally exchanging code with a peripheral device connected with said peripheral bus;

a controller and an internal bus connected with said controller, said internal bus adapted to bidirectionally exchanging code between said controller and another device connected with said internal bus;

a first communication channel for providing communication between said controller and said remote units; and a second communication channel connected with said internal bus and said peripheral bus for providing bidirectional communication between said controller and said peripheral bus, said second communication channel including a shared memory for storing code and an access control for allowing each of said internal bus and said peripheral bus access to said shared memory such that said controller and said computer system can write code to said shared memory and retrieve code from said shared memory, wherein said access control determines which of said internal bus and said peripheral bus has access to said shared memory.

55. The fuel dispensing terminal in claim 54 wherein said at least one fuel pump includes at least one of a fuel dispenser and a card acceptor.

56. The fuel dispensing terminal in claim 54 wherein said access control allows only one of said internal bus and said peripheral bus access to said shared memory at a time.

57. The fuel dispensing terminal in claim 56 wherein said shared memory is a single-ported memory device.

58. The dispenser system in claim 56 wherein said access control is controlled by said controller whereby said controller determines which of said internal bus and said peripheral bus have access to said shared memory.

59. The dispenser system in claim 54 wherein said shared memory is capable of storing at least about 0.5 kilobyte.

60. The fuel dispensing terminal in claim 54 wherein said controller includes a random access memory for controlling operation of said controller and wherein said second communication channel is adapted to down-loading data and operating code from said peripheral bus to said random access memory.

61. The fuel dispensing terminal in claim 60 wherein said data and operating code are down-loaded through said shared memory.

62. In a fuel dispensing terminal for dispensing fuel and having a plurality of remote units including at least one fuel pump, a computer system having a peripheral bus that is adapted to bidirectionally exchanging code with a peripheral device connected with the peripheral bus, and an interface unit interconnecting said plurality of dispensing means with said computer system, each of said remote units capable of at least one of receiving commands from said computer system and providing data to said computer system, said interface unit comprising:

a controller;

a first communication channel for bidirectionally exchanging code between said controller and the remote units; and a second communication channel for bidirectionally exchanging code between said controller and the peripheral bus including a shared memory for storing code and a bus interface, said bus interface including an access control port for communicating access codes between said peripheral bus and said controller and a memory control adapted to selectively connecting said controller and said peripheral bus with said shared memory.

63. The interface unit in claim 62 wherein said memory control is responsive to said controller and is adapted to selectively connecting one of said controller means and said peripheral bus with said shared memory.

64. The interface unit in claim 62 wherein said controller is responsive to said access codes in order to grant access by said peripheral bus to said shared memory.

65. The interface unit in claim 62 wherein said controller includes a random access memory for controlling operation of said controller and wherein said second communication channel is adapted to down-loading data and operating code from said peripheral bus to said random access memory.

66. The interface unit in claim 65 wherein said data and operating code are down-loaded through said shared memory.

67. A fuel dispensing terminal control, wherein the fuel dispensing terminal has a plurality of remote units, including at least one fuel pump, and each of said remote units capable of at least one of receiving commands and providing data, said control comprising:

a computer having a multiple-byte peripheral bus that is adapted to bidirectionally exchanging multiple-byte code words with peripheral devices connected with said peripheral bus;

a direct interface unit including a processor, a first communication channel, and a second communication channel, said first communication channel transferring commands from said processor to remote units and data from remote units to said processor, said second communication channel between said processor and said peripheral bus to communicate commands from said computer to said processor and to communicate data received from remote units from said processor to said computer, wherein said direct interface unit interacts with said computer as a peripheral device of said computer; and an access control regulating which of said processor and said computer is communicating on said second communication channel.

68. An interface between a plurality of fuel dispensing terminal remote units and a computer having a peripheral bus that is adapted to bidirectionally exchanging code with a peripheral device connected with the peripheral bus, said remote units including at least one fuel pump, each of the remote units capable of at least one of receiving commands and providing data, said interface comprising:

a processor, a first communication channel for bidirectionally exchanging code between said processor and remote units, and a second communication channel between said processor and a peripheral bus of a computer to communicate commands from said computer to said processor and to communicate data received from remote units from said processor to said computer; wherein said interface interacts with said computer as a peripheral device of said computer; and an access control regulating which of said processor and said computer is communicating on said second communication channel.

* * * * *

UNITED STATES PATENT AND TRADEMARK OFFICE

CERTIFICATE OF CORRECTION

PATENT NO. : 5,299,135

DATED : March 29, 1994

INVENTOR(S) : Gregory S. Lieto, William O. Richardson, Thomas A. Kyle and Craig L. Hockman It is certified that error appears in the above-indentified patent and that said Letters Patent is hereby corrected as shown below:

Column 6, line 39:
"(MC 0)" should be --(MCS 0)--.

Column 7, line 53:
"8K3X8" should be --8K X 8--.

Column 8, line 2:
"QP0-OP5" should be --OP0-OP5--.

Column 128, claim 29, line 11:
"claim 8" should be --claim 28--.

Column 129, claim 42, line 42:
"by" should be --from--.

Signed and Sealed this

Fifteenth Day of August, 1995

Attest:

BRUCE LEHMAN

*Attesting Officer* *Commissioner of Patents and Trademarks*